United States Patent [19]
Bowler et al.

[11] Patent Number: 5,335,540
[45] Date of Patent: Aug. 9, 1994

[54] TIRE MONITORING APPARATUS AND METHOD

[75] Inventors: Paul R. Bowler, Surrey, Canada; John Mackay, South Durham, England; Shawn D. Lammers, Delta; Robert H. Fulton, North Delta, both of Canada

[73] Assignee: TTC Truck Tech Corp., Richmond, Canada

[21] Appl. No.: 64,597

[22] Filed: May 21, 1993

Related U.S. Application Data

[62] Division of Ser. No. 658,025, Feb. 21, 1991, Pat. No. 5,231,872.

[51] Int. Cl.$^5$ ............................................. B60C 23/02
[52] U.S. Cl. .................................. 73/146.5; 73/146.8; 340/447; 340/448; 374/143
[58] Field of Search ............................ 73/146.5, 146.8; 116/34 R; 340/442, 445, 447, 858, 859; 374/143

[56] References Cited

U.S. PATENT DOCUMENTS

| | | | |
|---|---|---|---|
| 3,261,001 | 7/1966 | Magnin | 340/172.5 |
| 3,309,463 | 3/1967 | Roedl | 178/69.5 |
| 3,329,934 | 7/1967 | Wooden | 340/58 |
| 3,810,090 | 5/1974 | Davis, Jr. et al. | 340/58 |
| 4,057,783 | 11/1977 | Blanchier | 340/58 |
| 4,067,235 | 1/1978 | Markland et al. | 73/146.5 |
| 4,074,227 | 2/1978 | Kalmus | 340/58 |
| 4,101,872 | 7/1978 | Pappas | 340/539 |
| 4,119,944 | 10/1978 | Smith | 340/58 |
| 4,137,520 | 1/1979 | Deveau | 340/58 |
| 4,160,234 | 7/1979 | Karbo et al. | 340/58 |
| 4,186,377 | 1/1980 | Barabino | 340/58 |
| 4,237,728 | 12/1980 | Betts et al. | 73/146.5 |
| 4,263,579 | 4/1981 | Corgan et al. | 340/58 |
| 4,300,118 | 11/1981 | Matsuda et al. | 340/58 |
| 4,328,494 | 5/1982 | Goodall | 340/870.18 |
| 4,467,641 | 8/1984 | Abraham | 73/146.5 |
| 4,510,484 | 4/1985 | Snyder | 340/58 |
| 4,531,112 | 7/1985 | Thomas | 340/58 |
| 4,571,588 | 2/1986 | Lee et al. | 340/870.13 |
| 4,619,137 | 10/1986 | Bott | 73/146.5 |
| 4,695,823 | 9/1987 | Vernon | 340/58 |
| 4,703,650 | 11/1987 | Dosjoub et al. | 73/146.5 |
| 4,717,905 | 1/1988 | Morrison, Jr. et al. | 340/58 |
| 4,723,445 | 2/1988 | Ripley et al. | 73/146.3 |
| 4,737,761 | 4/1988 | Dosjoub et al. | 340/58 |
| 4,742,857 | 5/1988 | Gandhi | 152/418 |
| 4,816,802 | 3/1989 | Doerksen et al. | 340/447 |
| 4,891,973 | 1/1990 | Bollweber et al. | 73/146.5 |
| 4,893,110 | 1/1990 | Hebert | 340/442 |
| 4,909,074 | 3/1990 | Gerresheim et al. | 73/146.4 |
| 4,929,851 | 5/1990 | Pace | 307/359 |
| 4,935,738 | 6/1990 | Pilato | 340/870.24 |
| 4,975,679 | 12/1990 | Ballyns | 340/442 |
| 5,001,457 | 3/1991 | Wang et al. | 340/447 |
| 5,040,562 | 8/1991 | Achterholt | 137/227 |
| 5,054,315 | 10/1991 | Dosjoub | 73/146.5 |
| 5,109,213 | 4/1992 | Williams | 73/146.5 |
| 5,231,872 | 8/1993 | Bowler et al. | 73/146.5 |

FOREIGN PATENT DOCUMENTS

| | | |
|---|---|---|
| 0251355 | 1/1988 | European Pat. Off. . |
| 0344003 | 11/1989 | European Pat. Off. . |
| 0431217 | 6/1991 | European Pat. Off. . |
| 3703128 | 2/1987 | Fed. Rep. of Germany . |
| 2225300 | 4/1973 | France . |
| 2601533 | 1/1988 | France . |
| 2210537 | 6/1989 | United Kingdom . |

*Primary Examiner*—Donald O. Woodiel
*Attorney, Agent, or Firm*—Bull, Housser & Tupper

[57] ABSTRACT

A method and apparatus for measuring a physical quantity, property or condition and for transmitting a code representing the measured physical quantity, property or condition. The method includes the steps of developing a first signal in response to a physical quantity, property or condition, sampling the first signal to produce an instantaneous first signal value, assigning a first code to the instantaneous first signal value, and transmitting the first code for reception by a receiver. The method and apparatus are explained in connection with a vehicle tire monitoring apparatus wherein plurality of tire units measure tire pressures and temperatures and transmit values representing pressure and temperature to a central receiver located in a cab portion of the vehicle.

15 Claims, 46 Drawing Sheets

| | |
|---|---|
| 378 | $M_T/T_{cc}$ TEMP / COUNT VALUE |
| 380 | $b_T$ TEMP OFFSET VALUE |
| 382 | $M_P/P_{cc}$ PRESS/COUNT VALUE |
| 384 | $b_P$ PRESS OFFSET VALUE |
| 386 | $M_B/B_{cc}$ BATT VOLTAGE/ COUNT VALUE |
| 388 | $b_B$ BATT VOLTAGE OFFSET VALUE |

FIGURE 11

| | |
|---|---|
| 434 — UNIT FUNCTION | 5 BITS |
| 436 — UNIT ID ( LS BYTE ) | 8 BITS |
| 438 — UNIT ID ( MS BITS ) | 2 BITS |
| 440 — UNIT TYPE | 1 BIT |
| 442 — TIRE NUMBER | 5 BITS |

|     |           | 0 1 2 3 4 5 6 | 7 8 9 | 10 11 12 |
|-----|-----------|---------------|-------|----------|
| 774 | BAT       | NOT USED      | B T P | FCN |
| 776 | CODES     | LS BYTE OF ID | TIRE NO. | MSB OF ID |
| 778 | PRESSTEMP | PRESSURE BYTE | TEMP BYTE | |

FIGURE 27

TIRE MONITORING APPARATUS AND METHOD

This is a division of application Ser. No. 07/658,025, filed Feb. 21, 1991, U.S. Pat. No. 5,231,872.

BACKGROUND OF THE INVENTION

The invention relates to a method and apparatus for measuring a physical quantity, property or condition, transmitting a code representing the physical property, quantity or condition to a receiver and displaying a representation of the physical property, quantity or condition on a display at a central location. Such an apparatus and method has particular application in monitoring pressures and temperatures of air in tires, and displaying such air pressures and temperatures on a display located in a cab portion of a vehicle on which the apparatus is installed.

In pneumatic tired vehicles such as mining trucks, logging trucks, and semi-trailers etc, pneumatic tire problems can affect the operating cost of such vehicles. Operating costs are affected when a tire becomes flat due to wear or puncture as tires must often be replaced or repaired. This leads not only to a cost in affecting the repair but also leads to a cost due to temporary loss of use of the vehicle.

Other problems associated with pneumatic tires include road wear due to improperly inflated tires and loss of effectiveness of anti-lock breaking systems resulting from reduced friction due to over or under inflation of tires.

Operating costs of vehicles can, however, be minimized and road wear and loss of effectiveness of anti-lock breaking systems can be reduced by careful maintenance of tires. More specifically, if tire pressures are monitored and maintained within pre-defined limits, tire wear and road wear can be reduced and the effectiveness of anti-lock breaking systems can be maintained. Additionally, if the air temperature within a tire is monitored, excessive heating of the tire can be observed, serving as a warning that possible tire damage or blow-out is imminent.

Previously, monitoring of tire pressures and temperatures was done by simply using a conventional tire gauge to measure tire pressure and by simply touching the tire to determine if it appeared excessively warm. While the use of the pressure gauge is reasonably accurate, it could only be used while the vehicle was stopped. Measuring temperature also had to be done while the vehicle was stopped and an operator could only guess that the tire may be too hot.

What is required therefore is a method and apparatus for monitoring tire pressures and temperatures while the vehicle is in use.

Certain inventors before us have sought to address the problem of measuring tire pressure. For example the U.S. Pat. No 4,237,728 to Betts et al. discloses a low tire warning system which monitors tire inflation and sends a coded signal to a central receiver when the tire inflation is less than a predetermined value or threshold. It appears that actual tire pressure is not monitored, but instead a warning is generated when threshold is attained. Furthermore, there appears to be no mention of measurement of air temperature within the tire.

U.S. Pat. No. 4,742,857 to Gandhi discloses a tire pressure sensor and air supply for maintaining a desired air pressure in a tire. The device monitors air pressure in a tire by creating movement of a reluctance-type of pressure sensing element which cooperates with a receiving transducer mounted adjacent the tire, on the frame of the vehicle. While continuous measurement of tire pressure is possible, installation of a plurality of reluctance sensor elements and corresponding transducers is required. Furthermore, the transducers must be placed in close proximity to the sensor elements on the tires resulting in little clearance between the sensor and transducer. This can leave the system susceptible to damage due to debris lifted from the road by a tire as could frequently occur if the device was used with a mining vehicle or logging truck. Furthermore, Gandhi does not appear to disclose simultaneous monitoring of air temperature within a tire.

U.S. Pat. No. 4,067,235 to Markland et al. discloses a method and apparatus for measuring air in pneumatic tires. The system involves the use of first and second coils embedded in a portion of roadway over which the vehicle is driven and stopped upon. The first coil excites a primary receiving coil of a transducer embedded within the tire and thereby provides power to the transducer. The transducer then measures the air pressure in the tire and produces an output signal which has a frequency proportional to air pressure in the tire. This output signal is received by the second coil in the roadway which is connected to a monitoring apparatus beside the roadway. There is no mention that the device may be modified to permit monitoring of tire pressure and temperature while the vehicle is in use.

The present invention seeks to solve the problem of monitoring tire pressure and temperature while the vehicle is in use.

SUMMARY OF THE INVENTION

In accordance with a broad aspect of the present invention there is provided a method and apparatus for measuring a physical quantity, property or condition and for transmitting a code representing the measured physical quantity, property or condition. The apparatus includes means for performing the following method steps a) developing a first signal in response to a physical quantity, property or condition;

b) sampling the first signal to produce an instantaneous first signal value;

c) assigning a first code to the instantaneous first signal value; and d) transmitting the first code for reception by a receiver.

In accordance with the invention, the physical quantity, property or condition is sampled at a rate depending upon whether or not the sampled value meets a given set of conditions, the sampling rate being increased when the sampled value is found to meet an adverse set of conditions.

In accordance with another aspect of the invention, there is provided an apparatus including:

(a) a pneumatic tire;

(b) a transducer for developing a first signal in response to air pressure or air temperature within the tire;

(c) sampling the first signal to produce an instantaneous first signal value;

(d) assigning a first code to the instantaneous first signal value; and (e) transmitting the first code for reception by a receiver.

In accordance with another aspect of the invention there is provided an apparatus and method for receiving transmitted codes from a remote device, the apparatus including means for performing the following method steps:
  (a) receiving a received transmission having a received identifier, a received code and a re-synchronizing code;
  (b) extracting and storing the received identifier and the received code from the received transmission;
  (c) determining which identifier has been received; and
  (d) displaying a representation of the received code while providing an identification of the received code.

In accordance with another aspect of the invention there is provided a method and system for measuring a physical quantity, property or condition, transmitting a code representing the physical property, quantity or condition to a receiver and displaying a representation of the physical property, quantity or condition on a display at a central location. In accordance with another aspect of the invention there is provided an apparatus and method for receiving transmitted codes from a remote device, the apparatus including means for performing the following method steps:
  (a) developing a first signal in response to a physical quantity, property or condition;
  (b) sampling the first signal to produce an instantaneous first signal value;
  (c) assigning a first code to the instantaneous first signal value;
  (d) transmitting the first code for reception by a receiver;
  (e) receiving the first code; and
  (f) producing signals in response to the first code to control a display device to display a representation of the first code.

In accordance with another aspect of the invention there is provided an apparatus and method for receiving transmitted codes from a remote device, the apparatus including means for performing the following method steps:
  (a) providing a plurality of measurement and transmission circuits, each circuit:
    (i) developing a signal in response to a respective physical quantity, property or condition;
    (ii) sampling the signal to produce an instantaneous signal value;
    (iii) assigning a first code to the instantaneous signal value;
    (iv) transmitting a transmission including the code and an identifier unique to the circuit;
  (b) receiving a received transmission from each of the measurement and transmission circuits;
  (c) extracting and storing the identifier and the code from the received transmission;
  (d) determining which identifier has been received; and
  (d) displaying a representation of the received code while providing an identification of the received code.

In accordance with another aspect of the invention, there is provided an apparatus including:
  a) a body having connecting means for connecting the body to a valve stem of a tire and a chamber pressurized by air from the tire;
  b) measuring means for measuring an instantaneous value of air pressure in the chamber, the measuring means including sampling means for automatically sampling the instantaneous value of the at least one operating parameter at regular intervals in time; and
  c) transmitting means for transmitting a representation of the instantaneous value and for transmitting an identification for identifying the transmitter.

In accordance with another aspect of the invention, there is provided an apparatus and method of simultaneously performing analog to digital conversion on a plurality of input signals, the apparatus including means for performing the following method steps:
  a) starting a voltage ramp generator circuit for producing a ramp voltage;
  b) incrementing a digital counter at regular intervals in time while the ramp voltage is being generated;
  c) comparing each of the input signals to the ramp voltage while the ramp voltage is being generated;
  d) loading an instantaneous count value from the counter into a parameter register corresponding to whichever input signal has a voltage less than the ramp voltage;
  e) repeating the steps of comparing and loading until the ramp voltage is greater than the voltage of each of the plurality of input signals.

The invention addresses the problem of monitoring a physical property, quantity, or condition at a remote device and permits transmission of a code representing the monitored physical, quantity, or condition to a central receiving device. A plurality of monitoring devices may be used with a single receiver rendering an apparatus according to the invention particularly useful in monitoring air pressures and temperatures of tires on a vehicle. The air pressure and air temperature of air within each tire on a vehicle such as a mining truck or semi-trailer unit can be monitored inside a cab portion of the vehicle to alert an operator to any potential problems with the tires. Furthermore, as the code representing the actual measured value is sent to the receiver, the receiver can display, in real time, a numerical indication of the air pressure or air temperature of a particular tire in units of pressure or temperature accordingly. Furthermore such indication can be provided while the operator is driving the vehicle, which eliminates the need to take the vehicle out of productive use to measure air pressures or air temperatures.

BRIEF DESCRIPTION OF THE DRAWINGS

FIG. 11 is a memory map of registers used by the unit conversion routine of FIG. 10;

FIG. 16 is a memory map of registers used by a transmit routine according to the first embodiment of the invention;

FIG. 27 is a memory map of bit storage registers implemented in RAM on the subcontroller;

DETAILED DISCLOSURE general apparatus

Figure 1:
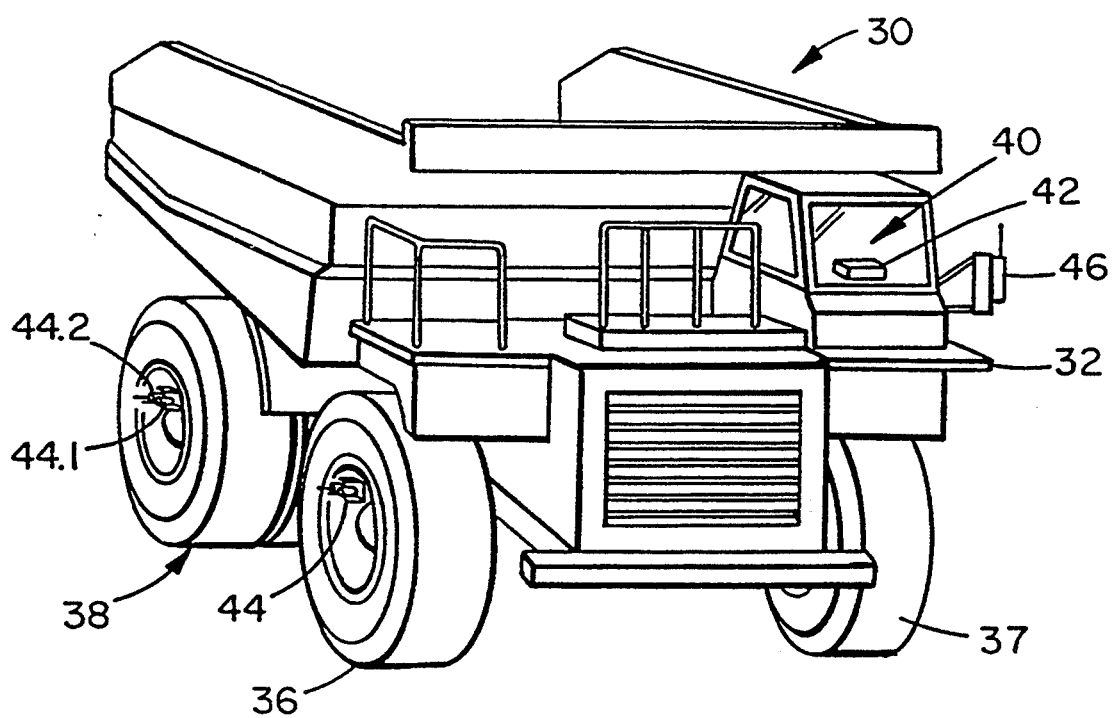
FIG. 1 is a perspective view of a mining truck on which an apparatus according to first embodiment of the invention is mounted.

Referring to FIG. 1, an apparatus for monitoring a respective operating parameter of each of a plurality of remotely situated devices is shown generally at 30. The apparatus is shown mounted on a conventional mining tractor 32 having six wheels, three being designated generally at 36, 37 and 38 respectively. Each wheel has an associated pneumatic tire with associated operating parameters which, in this embodiment include air pressure and temperature. The air pressure and temperature of air in each tire is measured and transmitted to a central location inside a cab portion 40 of the tractor 32. A cab unit 42 receives, displays and performs tests upon the air pressures and temperatures of the tires to alert the driver to potential problems with the tires.

To effect measuring and transmission of the operating parameters of the tires, each tire is fitted with a tire unit 44 which performs the functions of measuring and transmitting. An antenna 46 is connected to the cab unit 42 and permits the cab unit to receive a transmission from each of the tire units, each transmission including a representation of respective operating parameters of a respective tire.

tire unit tire unit mounting

Figure 2:
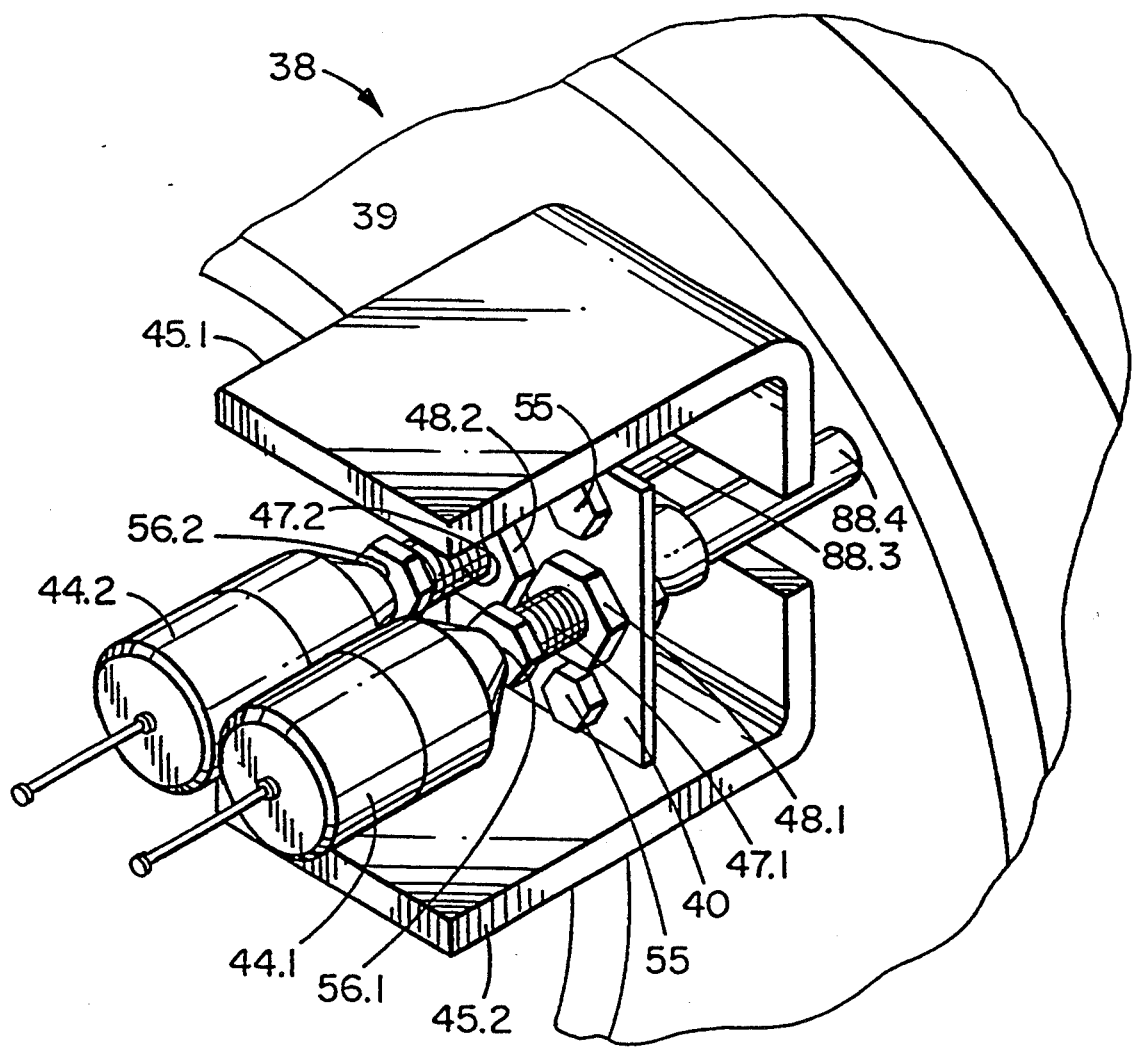
FIG. 2 is a perspective view of two tire units according to the invention shown mounted on a dual wheel assembly of the mining truck of FIG. 1.

Referring to FIG. 2, two tire units 44.1 and 44.2 are shown mounted on dual wheels 38. A separate tire unit is connected to each tire. Thus referring to FIG. 1, in this embodiment, there are six tire units associated with the tractor.

Figure 3:
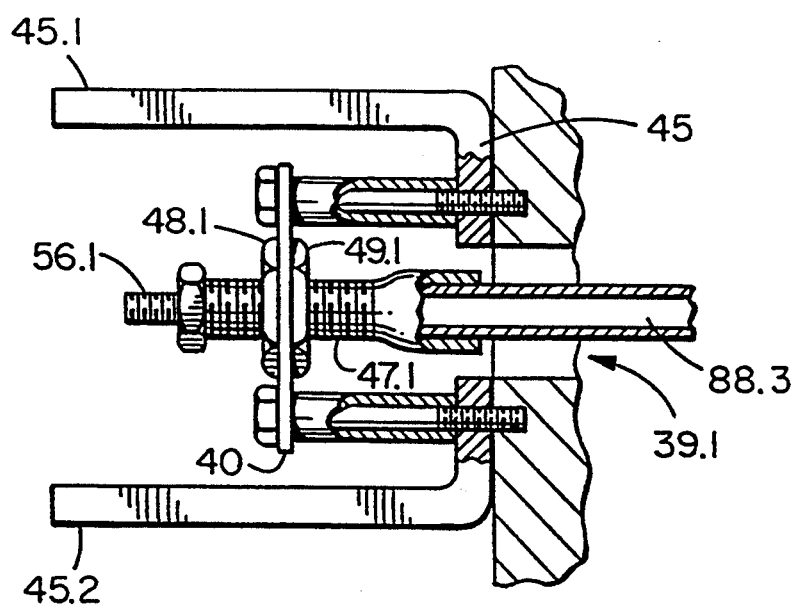
FIG. 3 is a cross-sectional view of a mounting bracket for mounting the tire unit of FIG. 2 onto the dual wheel assembly.

Referring to FIGS. 2 and 3, each of the tires of the dual wheels 38 has a respective flexible pipe 88.3 and 88.4 which extends from inside the tire to an outer facing rim 39. The rim 39 has openings, one of which is shown at 39.1 in FIG. 3, through which the flexible pipes 88.3 and 88.4 extend. The flexible pipes 88.3 and 88.4 have respective end portions to which are attached respective extension conduits 47.1 and 47.2 respectively. Extension conduit 47.1 is fastened to a plate 40 by opposing nuts 48.1 and 49.1. Extension conduit 47.2 is fastened to the plate 40 in a similar manner.

The plate 40 is connected to a mounting bracket 45 including first and second protective shrouds 45.1 and 45.2 mounted on opposite sides of the opening 39.1. The shrouds are connected to the rim 39 by bolts 55 extending through the plate 40 and through bushings and through respective shrouds 45.1 and 45.2.

Tire units 44.1 and 44.2 are mounted on to the extension conduits 47.1 and 47.2 respectively by adaptor fittings 56.1 and 56.2 respectively.

tire unit structure

Figure 4:
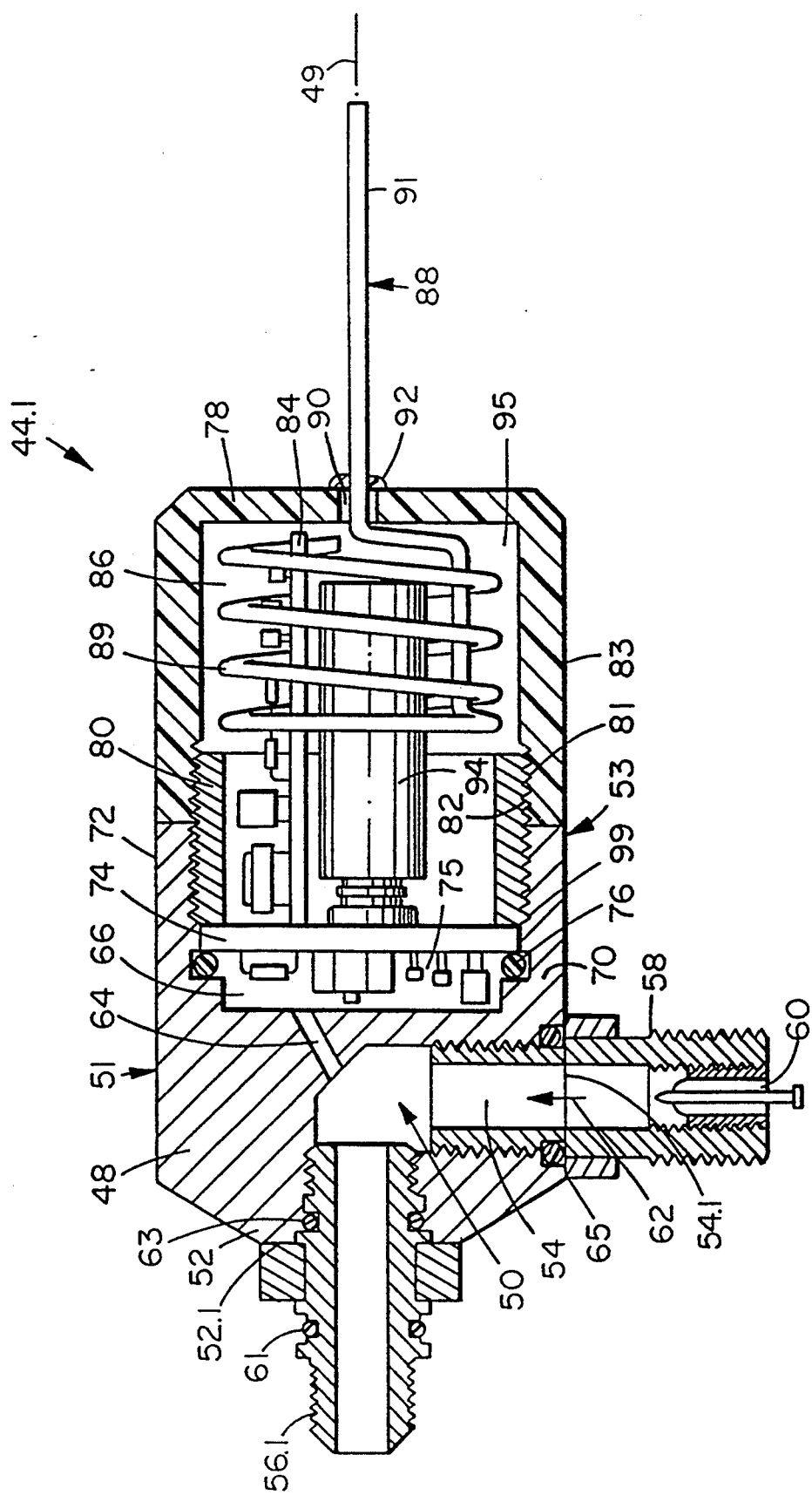
FIG. 4 is a cross-sectional view of a tire unit according to the first embodiment of the invention.

Referring to FIG. 4, a cross-sectional view of tire unit 44.1 is illustrated. The tire unit includes a generally cylindrical body 48 having a longitudinal axis 49, a conduit portion 51 and a housing portion 53. A conduit 50 is formed in the conduit portion, the conduit 50 having an L-shape including an axial portion 52 having a first opening 52.1 connectable to the valve stem and a transverse portion 54 having a second opening 54.1, the axial portion being coincident with the longitudinal axis 49 and the transverse portion being normal to the axis 49.

The axial portion 52 is threaded to receive the adapter fitting 56.1 mounted on the extension conduit 47.1 of FIG. 3. The threaded axial portion acts as connecting means for connecting the body to a valve stem of a tire. Referring back to FIG. 4, the adaptor fitting has inner and outer O-rings 61 and 63 respectively for sealing the adaptor to the extension conduit and axial portion 52 respectively.

The transverse portion 54 is threaded to receive an extension conduit 58 in which is mounted a conventional tire valve member 60. The extension conduit 58 has an O-ring 65 which prevents the escape of air about the extension conduit 58. Air is forced into the tire by connecting a conventional air hose (not shown) to the extension conduit 58 whereupon the valve member 60 is opened and air is permitted to flow into the tire in a direction indicated by arrow 62. Upon removal of the air hose, the valve member 60 closes and air is prevented from escaping from the tire.

The body 48 further includes a relatively small air passage 64 in communication with and extending between the conduit 50 and a first chamber 66 in the housing portion 53. The air passage 64 conducts air from the conduit 50 into the first chamber 66. Air in first chamber 66 is therefore at the same pressure as air in the tire, hence the first chamber is pressurized by air from the tire.

First chamber 66 is generally cylindrical in shape and has a first end portion 70 with a threaded circular wall portion 72 extending therefrom. A second end portion of the first chamber 66 is formed by a circular, disc-shaped first printed wiring board 74. A resilient O-ring 76 acts as a seal between the first printed wiring board and the wall portion 72. A circular cylindrical collar 80 having an outside threaded portion 81 is secured to the threaded circular wall portion 72 and serves to secure the first printed wiring board 74 tightly against the seal in the first chamber 66. A generally circular cap 78 having a circular cylindrical wall 83 extending therefrom has a threaded end portion 82 in complementary engagement with the outside threaded portion 81.

The first printed wiring board 74 contains measurement circuitry and components 75 for measuring an instantaneous value of temperature and pressure of air within the first chamber 66. The board has a ground track 99 which is aligned with and in contact with collar 80 to provide an electrical connection to collar 80. Collar 80 is also in electrical connection with the cylindrical body 48 which is in connection with the adaptor fitting 56 which is further in connection with the mounting bracket 45 of FIG. 2 which provides a chassis-ground connection to the rim 39 and the chassis of the vehicle. Such connection between the ground track and the chassis of the vehicle enhances transmission of signals from the tire unit to the cab unit 42 shown in FIG. 1.

Referring back to FIG. 4, a second printed wiring board 84 is connected to the first printed wiring board 74 and extends normal thereto, parallel with the axis 49. The second prickled wiring board contains transmitter circuitry and components forming a transmitter shown generally at 86, the transmitter being for transmitting a representation of the instantaneous values of the pressure and temperature and for transmitting an identification for identifying the specific transmitter and thus a specific tire. The transmitter includes an antenna shown generally at 88, the antenna having a coiled portion 89 coiled around the second printed wiring board and having a straight portion 91 which extends along the axis 49 of the body 48. The straight portion of the antenna extends through a circular opening 90 formed in the cap 78 and therefore extends from the body 48. An interface between the opening 90 and the antenna 88 is sealed by a conventional silicone sealant material 92 to prevent moisture ingress.

Power for the transmitter circuit 86 and the measurement circuit 75 is provided by a conventional 9 volt battery 94 capable of operating under the operating temperature conditions of the tire. The battery is housed in a second chamber 95 formed in the cap 78, the second chamber being disposed on an opposite side of the axis 49 to that of the transmitter 86.

measurement circuitry sensors

Figure 5:
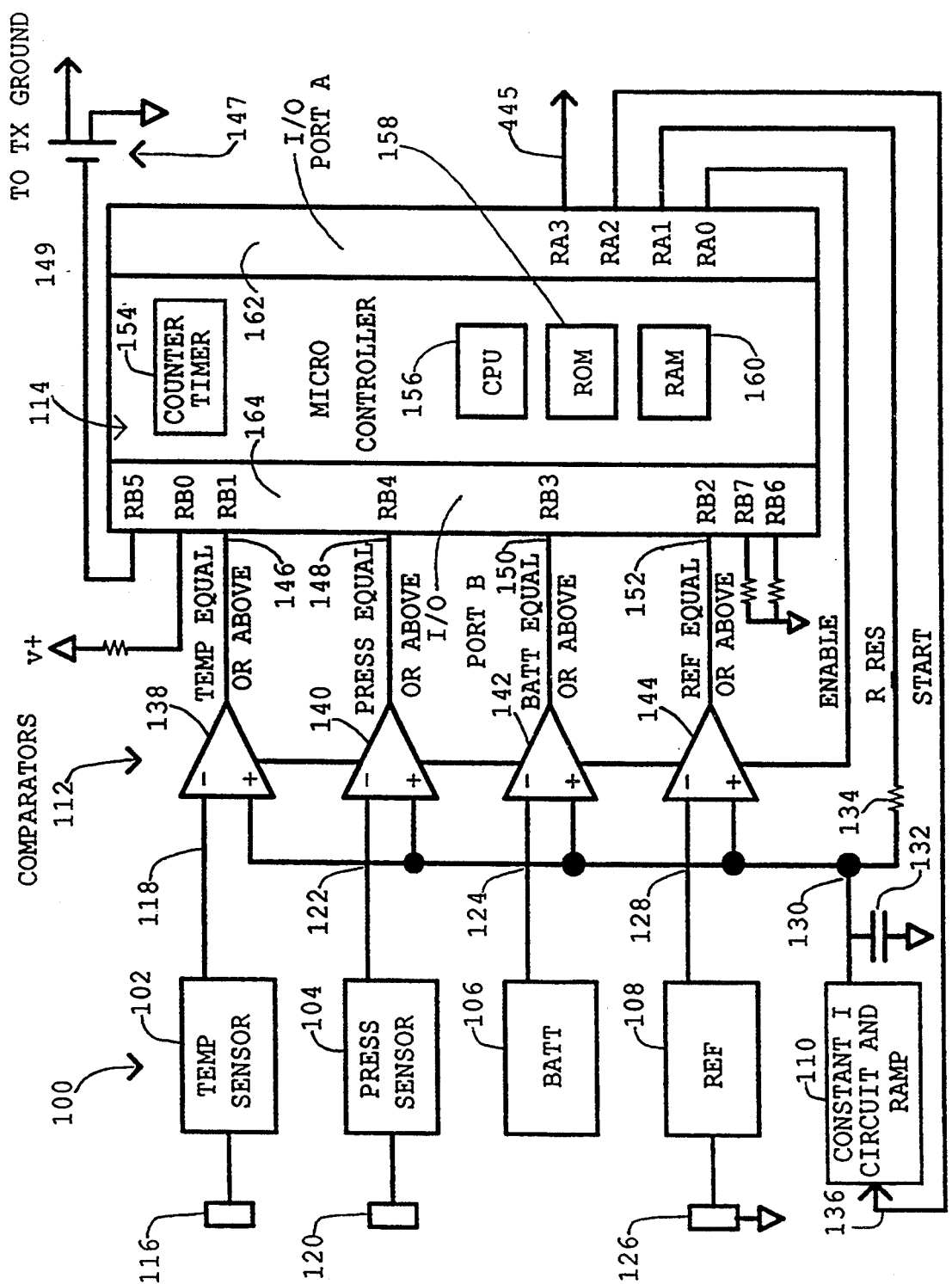
FIG. 5 is a functional block diagram of measurement circuitry according to the first embodiment of the invention.

Referring to FIG. 5, the measurement circuitry 75 is shown generally at 100 in functional block diagram form. The measurement circuitry includes a temperature sensor circuit 102, a pressure sensor circuit 104, a battery interface circuit 106, a reference voltage circuit 108, a voltage ramp generator circuit 110, a plurality of comparators 112 and a first microcontroller 114.

temperature sensor

In this embodiment, tile temperature sensor circuit 102 includes a precision centigrade sensor 116 which produces a temperature output signal 118 having a voltage proportional to the temperature of air in the first chamber 66 shown in FIG. 3. The output signal has a minimum voltage of approximately 0.1 volts at −40 degrees celsius and a maximum voltage of 1.8 volts at 130 degrees celsius. The temperature sensor circuit thus acts as temperature measurement means for measuring the temperature of air in the tire.

pressure sensor

In this embodiment the pressure sensor circuit 104 includes a Wheatstone bridge-type of pressure sensor 120 which acts as pressure measurement means for measuring the pressure of air in the tire. The pressure sensor circuit illustrated produces a pressure output signal 122 having a voltage proportional to pressure in the first chamber 66 of FIG. 4. Thus, the voltage varies in response to air pressure in the first chamber. The output signal has a minimum voltage of 0.1 volt at atmospheric pressure and a maximum voltage of 2.4 volts at 130 psi gauge pressure. The pressure sensor circuit thus acts as a transducer for developing the pressure output signal in response to air pressure in the tire.

battery interface circuit

The battery interface circuit 106 includes a conventional voltage divider circuit (not shown) having a battery output signal 124 having a voltage proportional to the voltage of battery 94 of FIG. 4. In this embodiment the voltage divider is designed to provide a battery output signal of approximately 2.5 volts when the battery 94 has an open circuit voltage of 9 volts. The voltage appearing on the battery output signal line 124 depends upon the condition of the battery and the load presented to the battery and generally decreases as battery power is depleted.

reference voltage circuit

The reference voltage circuit 108 includes a voltage reference 126, identified as an LM385 available from National Semiconductor Corporation of Santa Clara Calif. The reference voltage circuit 108 produces a reference output signal 128 having a constant voltage of approximately 2.5 volts, independent of temperature.

voltage ramp generator circuit

The voltage ramp generator circuit 110 generates a ramp voltage linearly increasing in time from an initial value of approximately 0 volts to a maximum level of approximately 2.5 volts. The ramp voltage appears on a ramp signal line 130. The circuit includes a ramp capacitor 132 which is charged by the ramp voltage and which is discharged through a resistor 134 connectable to signal ground through the first microcontroller 114, which will be more fully described below. The ramp generator circuit 110 has an input 136 which is controlled by the first microcontroller to enable and disable the ramp generator circuit.

comparators

The comparators include a temperature comparator 138, a pressure comparator 140, a battery comparator 142, and a reference comparator 144. Each of the comparators 138 through 144 has a respective inverting input(−) and non-inverting input(+). The ramp signal line is provided to the non-inverting input(+) of each of the comparators while the output signals 118 through 128 from the temperature, pressure, battery and reference circuits 102 through 108 are provided to respective inverting inputs. The temperature comparator 138 has an output which produces a temperature signal 146 having a high voltage level when the ramp voltage is greater than the voltage of the temperature output signal 118. The pressure comparator 140 has an output 148 which produces a pressure signal having a high level when the ramp voltage is greater than the voltage of the pressure output signal 122. The battery comparator 142 has an output 150 which produces a battery signal having a high level when the ramp voltage is greater than the battery voltage and the reference comparator 144 has an output 152 which produces a reference signal having a high level when the reference voltage is equal to the ramp voltage. The comparators thus act as producing means for producing comparison signals corresponding to each input signal, the corresponding signals indicating whether or not an input signal has a voltage greater than the ramp voltage.

first microcontroller

In this embodiment, the first microcontroller 114 has a timer circuit 154, a central processing unit 156, a read-only memory (ROM) 158 and a random access memory (RAM) 160 and 12 input/output pins which are configured as two programmable input/output ports, designated as port "A" 162 and port "B" 164. The first microcontroller further has a constant instruction cycle time wherein the cycle time to complete any instruction of program code is the same as the cycle time to execute any other instruction, i.e. each programmed instruction takes the same amount of time to execute. Finally, the first microcontroller has a feature which enables it to be placed into a low power mode for a pre-determined period of time after which it automatically executes pre-determined program instructions stored in the ROM 158.

watchdog timer circuit

The timer circuit 154 provides a clock pulse to the CPU 156 at regular intervals, which in this embodiment are 2.5 second intervals. Clock pulses produced by the timer circuit interrupt the CPU and cause a main program to be entered, as will be more fully explained below.

The functions of the RAM, ROM and CPU would be clear to one of ordinary skill in the art. Specific registers allocated in the RAM and ROM are described more fully later. The input/output ports are described immediately below.

port A and port B

Both ports A and B are programmable in that each pin may be individually programmed to be an input, an output or tristated. Programming of the individual pins is achieved by writing to respective port A and port B registers (not shown) corresponding to ports A and B. When a pin of a port is selected to be an output, the state of the pin is programmed by writing a binary 1 or 0 to a bit position in the respective port register corresponding to that pin. When a pin of a port is selected to be an input, the state of the pin is read by reading the corresponding bit position of the corresponding port register.

port A

Port A includes four pins designated RA0–RA3. In the embodiment shown, each pin of port A is programmed as an output while each individual pin of port B is dynamically configured as either an output, an input or tristate. RA0 provides an enable signal which enables or disables the comparators 138–144. By enabling and disabling the comparators, power to the comparators and hence power consumption of the circuit is controlled. RA1 provides a connection to ground for resistor 134, which has the effect of enabling and disabling charging of capacitor 132 and thereby enables or disables generation of the ramp voltage by the ramp generator circuit 110. RA2 provides a start signal to the ramp circuit on input 136. RA2 is set active when it is desired to start the ramp generator circuit 110. RA3 provides an RFMOD signal which is used to supply a serial stream of data to be transmitted by the transmitter circuitry.

port B

Port B has eight pins designated RB0–RB7. RB0, RB6 and RB7 are permanently programmed to be inputs. RB0 is tied high while RB6 and RB7 are both tied low. RB1–RB4 are dynamically changed between inputs and outputs as will be more fully explained below and RB5 is permanently programmed as an output and is connected to a MOSFET 147 for control of a radio frequency (RF) ground path 149 for the transmitter. This permits power consumption of the transmitter circuit 86 of FIG. 3 to be controlled by the microprocessor 114.

The measurement circuit shown generally at 100 in FIG. 5, acquires data relating to operating parameters monitored by sensor circuits 102 and 104 and acquires data relating to operating parameters of the measurement circuit through the battery interface circuit 106 and the reference voltage circuit 108. The measurement circuit samples each individual operating parameter, performs an analog-to-digital conversion thereon, and dispatches digital values representing the measured operating parameters in the serial stream of data appearing at RA3.

main program
modes of operation

The circuit 100 is controlled by a main program residing in ROM 158 of the first microcontroller 114. The main program is shown in flow diagram form in FIG. 6 and is designated generally at 200. The main program cooperates with the timer circuit 154, shown in FIG. 5, whereupon the first microcontroller is placed into one of two modes; an active mode and a low power mode. Upon receipt of a clock pulse from the timer circuit 154, the first microcontroller is placed into the active mode where it executes instructions according to the main program. When the main program is finished executing instructions, the first microcontroller is placed into the low power mode wherein minimal power is consumed by the measurement and transmitter circuits 75 and 86 until the next timer clock pulse is received, 2.5 seconds later. Operation of the circuit in the active mode will therefore now be described.

overview of main program

Figure 6:
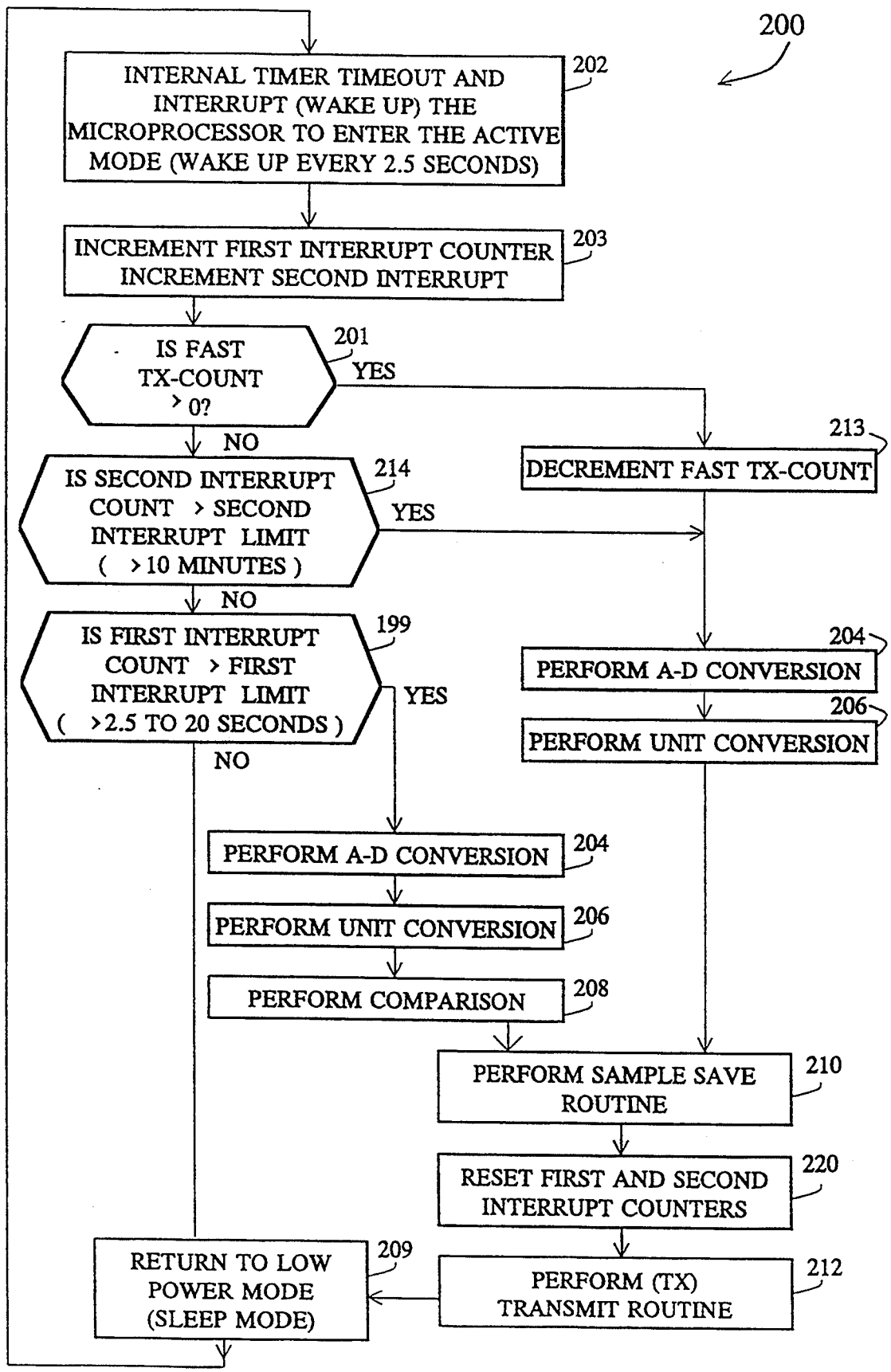
FIG. 6 is a flow diagram according to a main program executed on a first microcontroller according to the first embodiment of the invention.

Referring to FIG. 6, the main program is shown generally at 200. The main program cooperates with a plurality of registers existing in RAM 160 in FIG. 5, the registers being shown generally at 399 in FIG. 7. The registers include first and second interrupt counters 401 and 402, first and second interrupt limit registers 403 and 404, and a fast transmit count register 407. The first and second interrupt counter registers 401 and 402 are used to keep track of timer interrupts received when the first microcontroller exits the low power mode. The first and second interrupt limit registers hold pre-set values which are compared to respective interrupt count registers to determine actions to take within the main program. The fast transmit count register normally contains the value zero, however, when special conditions occur in the program, this register is loaded and decremented to keep track of successive transmissions as will be described below.

Figure 7:
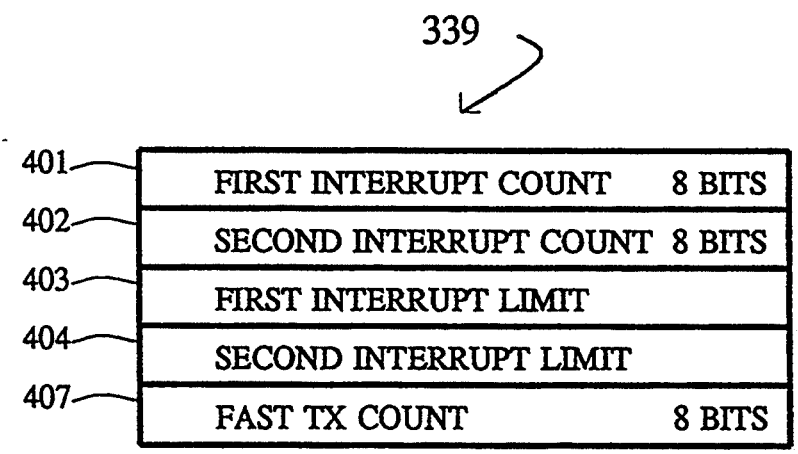
FIG. 7 is a memory map of registers used by the main program of FIG. 6.

Referring now to FIG. 6, upon receiving 202, a clock pulse from the timer circuit 154 of FIG. 5, the main program is entered. Upon entry of the main program, the first and second interrupt counter registers 401 and 402 of FIG. 7 are incremented 203 to record the occurrence of the interrupt. Next, the fast transmit count register 407 is read 201 to determine whether the contents are greater than zero. Under normal conditions, the contents of the fast transmit count register 407 will be zero and in such a case, program flow continues with step 214 wherein the contents of the second interrupt count register 402 are compared to the contents of the second interrupt limit register 404 to determine whether or not the contents of the second interrupt count register 402 are greater than the contents of the second interrupt limit register 404. The contents of the second interrupt limit register represent a number of interrupts which would be received in a ten minute period. Thus, using the second interrupt counter, a timer is implemented whereby interrupts from the timer circuit are counted to determine when ten minutes has passed. If ten minutes have not passed, step 199 compares the contents of the first interrupt count register 401 with the contents of the first interrupt limit register 403 to determine whether or not twenty seconds has passed. The first interrupt limit counter holds a number representing the number of interrupts expected to be received in a twenty second period. If twenty seconds has not passed, program flow continues by returning the first microcontroller 114 to the low power mode as indicated at step 209.

Referring to FIG. 6, it may be seen that step 199 causes, at twenty second intervals, the program to perform an analog-to-digital conversion as indicated at 204, performs a unit conversion as indicated at 206 and performs a comparison routine as indicated at 208. In addition, step 214 causes, every ten minutes, the main program to perform an analog-to-digital conversion 204.1, a unit conversion 206.1, and a sample save routine 210. In addition, the main program resets 220 the first and second interrupt counter registers 401 and 402, performs a transmit routine 212, and returns the first microcontroller to the low power mode as indicated at 209. In addition, should the fast transmit count register 407 have contents greater than zero, indicating an abnormal condition as will be described below, the main program decrements the fast transmit count register 213, and performs steps identical to those occurring at ten minute intervals, namely the analog-to-digital conversion 204.1, the unit conversion 206.1, the sample save routine 210, the resetting 220 of the first and second interrupt counters 401 and 402, the transmit routine 212, and returning the microcontroller to the low power mode 209.

analog to digital conversion subroutine
general discussion

It will be appreciated that it is desirable to perform all functions of circuit 100 shown in FIG. 5 using a minimum number of components, thereby minimizing cost and space requirements while maintaining accuracy and while permitting the analog-to-digital conversion to be performed in a relatively short period of time. Consequently, a cooperation is formed between the comparators 138 through 144, the first microcontroller 114 and the analog-to-digital conversion algorithm 204.

registered used in A/D conversion

Figure 8:
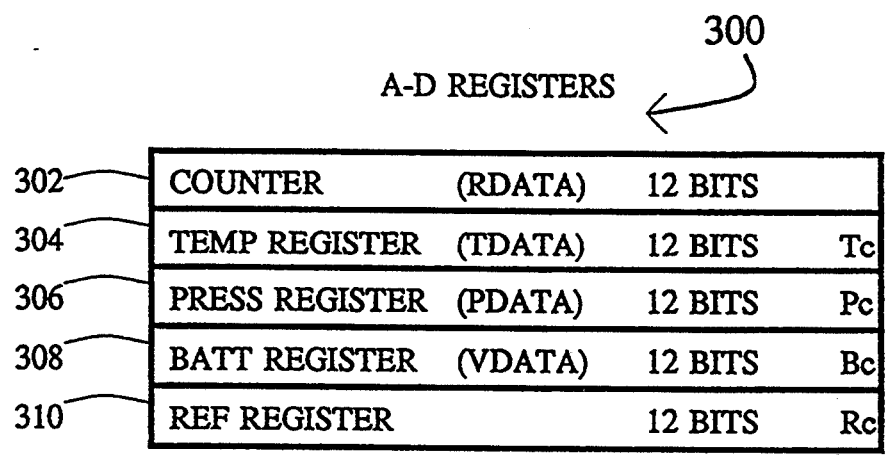
FIG. 8 is a memory map of registers used in connection with an analog-to-digital conversion program according to the first embodiment of the invention.

Referring to FIG. 8, the analog-to-digital algorithm cooperates with a plurality of analog-to-digital registers 300 which are implemented in the RAM 160 of FIG. 5. The registers include a counter register 302, a temperature register 304, a pressure register 306 a battery register 308, and a reference register 310.

Upon entry into the analog-to-digital algorithm, all of the analog-to-digital registers 300 are initialized to zero. Upon exit of the analog-to-digital algorithm, the temperature register contains a count value corresponding to the temperature measured by sensor 116 of FIG. 5, the pressure register 306 contains a count value corresponding to pressure measured by pressure sensor 120 of FIG. 5, the battery register 308 contains a count value corresponding to battery voltage detected by interface circuit 106 of FIG. 5, and the reference register contains a value corresponding to the reference voltage provided by the reference voltage circuit 108 of FIG. 5. The counter register 302 is used in the process of acquiring appropriate values to be loaded into registers 304 through 310.

initialization of registers

Figure 9A:
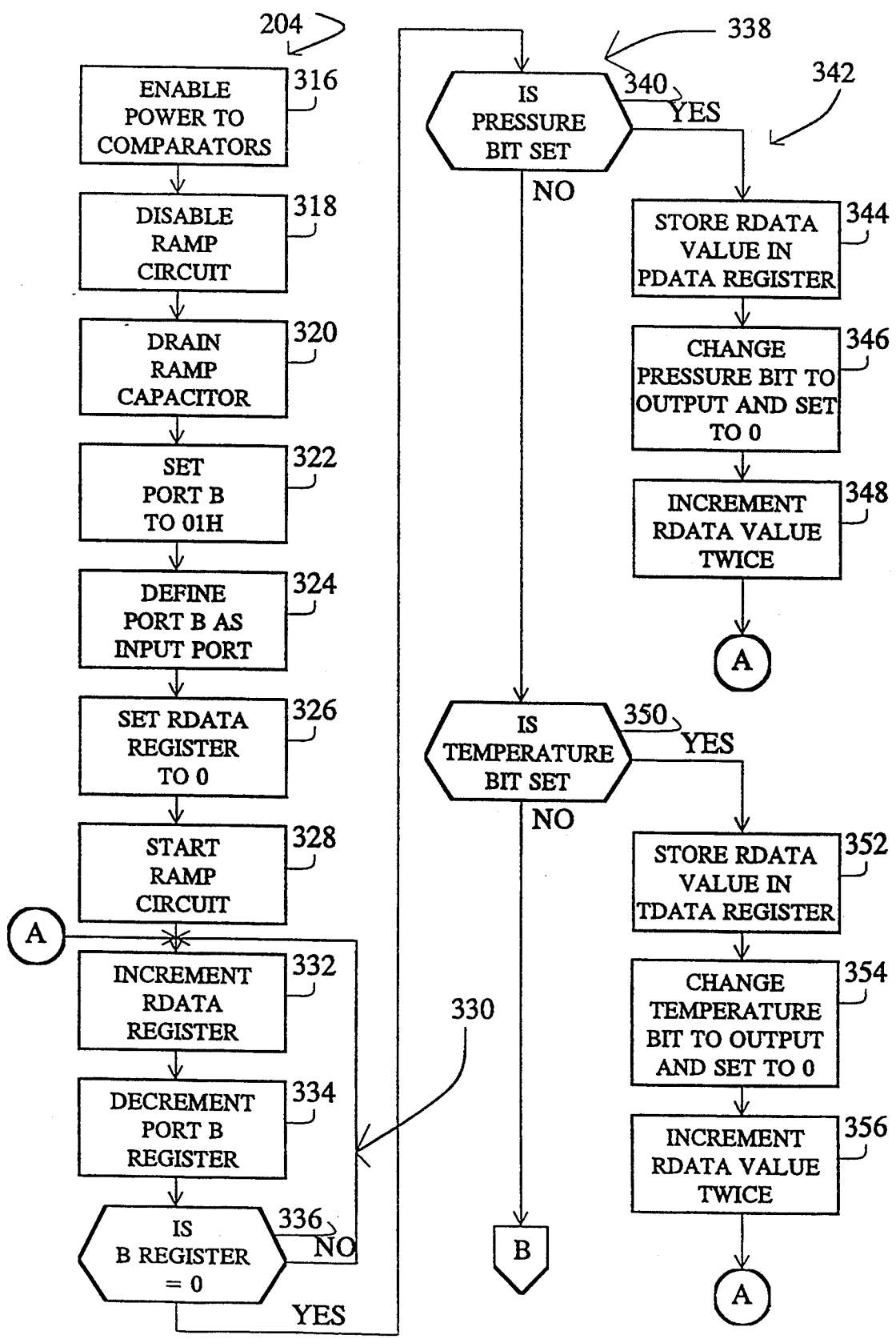
FIGS. 9A and 9B are first and second portions respectively of a flow diagram according to the analog-to-digital algorithm according to the first embodiment of the invention.

Referring to FIG. 9A, the analog-to-digital algorithm is shown generally at 204. The algorithm begins with step 316 by enabling power to the comparators 138 through 144 of FIG. 5. This is achieved by writing a binary "1" to port A of the first microcontroller, which sets the RA0 pin active.

Next, referring back to FIG. 9A step 318 disables the ramp generator circuit 110 of FIG. 5 by writing a binary "0" to output RA2 of port A. Next, step 320 writes a binary "0" to RA1 to connect the ramp capacitor-discharge resistor into the circuit. This has the effect of initializing the ramp generator circuit 110 to ensure the initial voltage appearing on signal line 130 is 0 volts. Step 320 then sets RA1 tristate to remove the resistor from the circuit to permit the capacitor to charge. Step 322 then configures port B to ignore inputs and a "01H" is written to the port B register. This defines an initial starting value for port B. Step 324 then defines port "B" as an input port and thereby renders it ready to receive active signals on inputs RB0 through RB7. As stated earlier, RB0 is held active, RB1–RB4 are rendered active depending upon the ramp voltage, and RB5–RB7 are held inactive. Initially, it is assumed that RB1–RB4 will each be inactive as the ramp voltage at this point in the algorithm will be zero volts while signals 118 through 128 will be well above zero volts. Consequently, at this point in the algorithm, the port B register should contain the value "01H".

Next, step 326 sets the count register contents to zero. The counter is thus initialized. Step 328 then writes a binary "1" to RA2 which has the effect of starting the ramp voltage generator. The voltage appearing on signal line 130 then begins to increase linearly in time.

entry of count loop

The A/D algorithm then enters a loop indicated generally at 330, the entry of which is indicated at A in FIG. 9A. The loop includes step 332 which increments the counter register 302 of FIG. 6 by one count value. The loop and microcontroller thus act as adding means for adding an incremental value to the counter register. The contents of the counter register thus increase linearly in time at the same time as the voltage appearing on signal line 130. The counter register and loop thus act as a digital counter which is incremented at regular intervals in time while the ramp voltage is being generated. When the ramp voltage exceeds any of the input signals to the comparators, the corresponding comparator output goes high and remains high. The signals are thus sampled by the comparators within a time window determined by the microcontroller. The comparators act as comparing means for comparing each of the input signals to the ramp voltage while the ramp voltage is being generated. The comparators and microcontroller thus act as sampling means for sampling the signals to produce an instantaneous value of each signal.

To test which if any comparators have a high output, step 334 decrements the port B register. If none of the pins RB1–RB4 has a high level voltage the value of the port B register before decrementing will be "01H" and the value after decrementing will be "00H". If any of the pins RB1–RB4 has a high level voltage, the value of the port B register will be greater than "01H" and the value after decrementing will be greater than "00H". Step 336 then tests the port B register to see whether or not it is "00H". If the B register contents are "00H", the algorithm remains in loop 330 and program flow repeats steps 332, 334 and 336. If the contents are not "00H", the algorithm branches to a bit testing portion of the A/D algorithm which determines which pin RB1–RB4 has a high level voltage or in other words which bit has been set.

bit testing pressure bit

Still referring to FIG. 9A, step 340 tests the decremented value held in the "B" register to determine whether or not RB4, the pressure bit, is set. If the pressure bit has been set, program flow branches to a pressure storage routine 342 including step 344 which stores the current value of the counter register 302 in the pressure register 306 of FIG. 8. The analog-to-digital routine and the microcontroller thus act as assigning means for assigning a code to the instantaneous pressure signal, the code being the current counter value. Upon saving the current counter value, step 346 re-configures input RB4 to be an output and sets it to zero in order to place the RB4 pin to inactive, or low voltage state so that unless one of pins RB1–RB3 is active, port B will again contain "01H" before decrementing. Step 348 then increments the counter register contents twice to compensate for the time taken to execute steps 340, 344 and 346 to maintain timing accuracy of the A/D conversion process. Accuracy is maintained because the instruction cycle time of each instruction is the same in the processor used. Program flow then continues at point A and loop 330 is again entered.

temperature bit

If, upon testing the pressure bit in step 340, it is found that the pressure bit has not been set, then step 350 tests the temperature bit to determine whether or not it is set. If the temperature bit is set, step 352 copies the current counter value into the temperature register 304 of FIG. 8. The analog-to-digital routine and the first microcontroller thus act as assigning means for assigning a code to the instantaneous value of the temperature signal, the code being the current counter value. Step 354 then re-configures RB1 to be an output and sets it to zero. Step 356 then increments the contents of the counter register twice and program flow continues at point A and the loop 330 is re-entered.

voltage bit

Figure 9B:
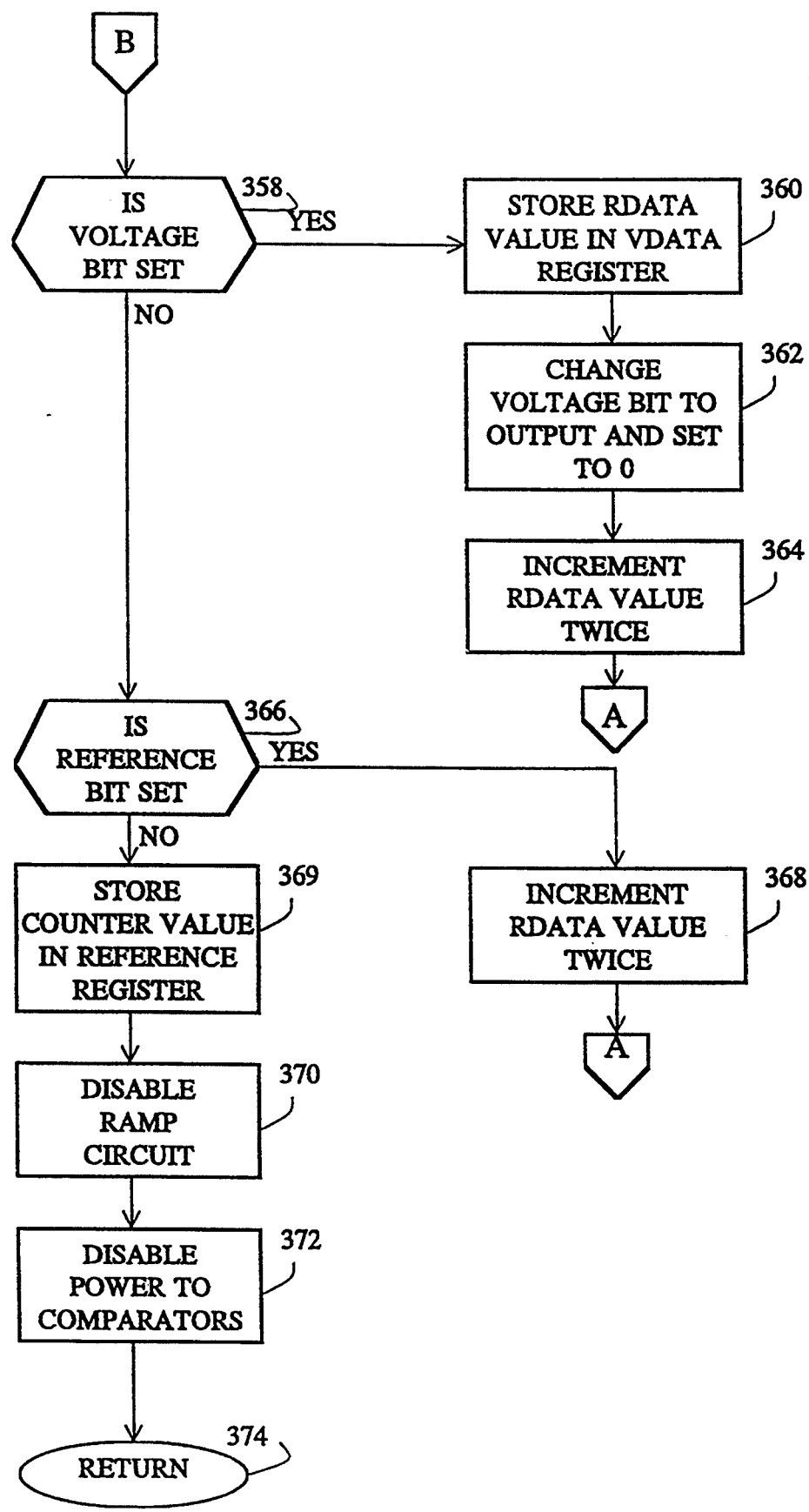

Referring now to FIG. 9B, if neither the pressure bit nor the temperature bit has been set, step 358 tests the voltage bit to determine whether or not it is set. If the voltage bit is set, step 360 copies the current counter value into the battery register 308 of FIG. 8. The analog-to-digital routine and the first microcontroller thus act as assigning means for assigning a code to the instantaneous value of the battery signal, the code being the current counter value. Step 362 then re-configures RB1 to be an output and sets it to zero. Step 364 then increments the contents of the counter register twice and program flow continues at point A and the loop 330 is re-entered.

reference bit

If neither the pressure bit, the temperature bit nor the voltage bit have been set, the program continues at step 366 which tests whether or not the reference bit is set. If the reference bit has not been set then step 368 increments the contents of the counter register twice. Program flow then continues at point "A" and loop 330 of FIG. 9A is re-entered. If the reference bit has been set, then the ramp voltage has attained its highest level and the analog-to-digital conversion process has been completed. Step 369 then copies the current contents of the counter register into the reference register 310 of FIG. 8. The analog-to-digital routine and the first microcontroller thus act as assigning means for assigning a code to the instantaneous value of the ramp signal, the code being the current counter value. Step 370 then writes a binary "0" to RA2 which has the effect of disabling the ramp generator 110 of FIG. 5. Step 372 then writes a binary "0" to RA0 which disables power to the comparators. The A/D routine of the main algorithm is thus completed and program flow continues as indicated in FIG. 6 with the unit conversion routine 206. It will be appreciated that the A/D routine and the microcontroller act as loading means for loading an instantaneous count value from the counter register in a parameter register corresponding to whichever input signal has a voltage less than thee ramp voltage. It will also be appreciated that the A/D routine and the microcontroller act as repeating means for repeating the steps of comparing and loading until the ramp voltage is greater than the voltage of each of the input signals.

result of a/d conversion

Referring to FIG. 8, it will be appreciated that upon termination of the analog-to-digital conversion algorithm, the temperature register 304, the pressure register 306, the battery register 308 contain counter values which represent corresponding fractions of full scale values measured. These fractional values are scaled by the unit conversion routine 206, shown in FIG. 10, to convert the fractional values into values having pressure, temperature or voltage units.

unit conversion routine

Figure 10:
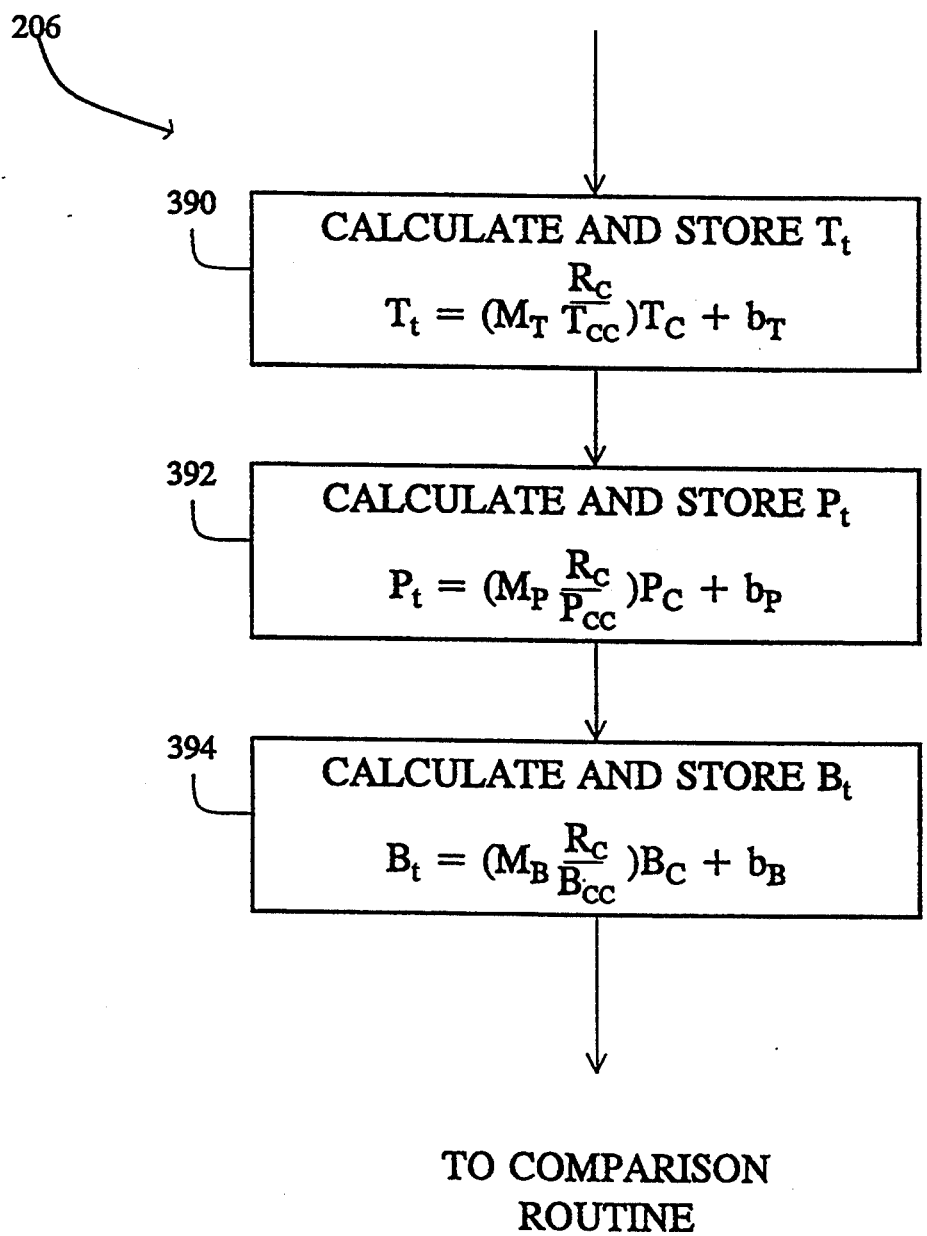
FIG. 10 is a flow diagram according to a unit conversion algorithm according to the first embodiment of the invention.

Referring to FIG. 10, the unit conversion routine is shown in greater detail at 206. The unit conversion routine employs a linear equation of the form $$y = mx + b$$

Where
- y = a given operating parameter expressed in pressure, temperature or voltage units. Respective pressure, temperature or voltage units are stored in the pressure, temperature and battery registers respectively upon completion of the unit conversion routine;
- m = a constant expressed in units per count of the A/D counter register 302;
- x = the count value of the operating parameter held in the temperature, pressure, or battery register after A/D routine is completed; and
- bcc = an offset value for the respective parameter.

The value m is equal to the relation $$(s)(Tcc)/(Rc)$$

Where
- s = a scaling factor for the temperature, pressure or battery voltage being measured, for example in the case of temperature, (s) is represents a scaling factor having units of degrees Celsius per count unit;
- Rc = the counter value stored in the reference in Register 310 when the reference bit was detected as set during the analog-to-digital conversion process; and
- Tcc = a constant representing the total count value expected for a pre-determined reference voltage of 2.5 volts, when the circuit is operating in ambient air having a temperature of 25 degrees Celsius.

The ratio (Tcc/Rc) will ideally be equal to 1, however if temperature affects the voltage ramp generator circuit 110, the value Rc may be different than the value Tcc as the ramp voltage may be affected by temperature. Consequently, the value (Tcc/Rc) is a scaling factor which permits the slope value (s) to be scaled up or down to compensate for irregularities in the ramp voltage such as may be caused by temperature variations. It will be appreciated that as the (Rc) values in the above equations are determined at the time of actually performing the analog-to-digital conversion, only the values (s)*(Tcc) and corresponding offset values bcc need be pre-defined.

storage of parameter values

Referring to FIG. 11, the values (s)(Tcc) and (bcc) for use in temperature calculations are stored in temperature scale and offset registers 378 and 380. Similarly, the values (s)(Tcc) and (bcc) for use in pressure and battery voltage calculations are stored in pressure and battery offset and scale registers 382, 384, 386, and 388 respectively.

Referring to FIG. 10, the unit conversion routine 206 includes a temperature conversion step 390 which retrieves the contents of the temperature scale register 378, substitutes it in the equation y=mx+b using temperature offset and scale values from registers 378 and 380 of FIG. 11 and stores the result in the temperature register 304 of FIG. 8. The temperature value or code acquired during the A/D algorithm is thus replaced with a temperature value expressed in degrees Celsius. In effect therefore, the code acquired from the A/D algorithm is represented by another code expressing the same value in meaningful temperature units.

Referring back to FIG. 10, the unit conversion routine 206 then performs subsequent steps 392 and 394 which substitute the pressure and battery voltage values acquired during the A/D algorithm into the y=mx+b equation and which store resulting pressure and voltage values in the pressure and battery registers 306 and 308 of FIG. 8, with pressure and battery voltage values expressed in pounds per square inch and volts respectively. Thus, the codes for these values acquired from the A/D algorithm are represented by related codes which express the same values in meaningful pressure and voltage units respectively.

comparison routine

Referring back to FIG. 6, upon completion of the unit conversion routine occurring every 2.5 to 20 seconds, the comparison routine 208 is executed. The comparison routine is shown in greater detail at 208 in FIG. 12.

registers used by comparison

Figure 13:
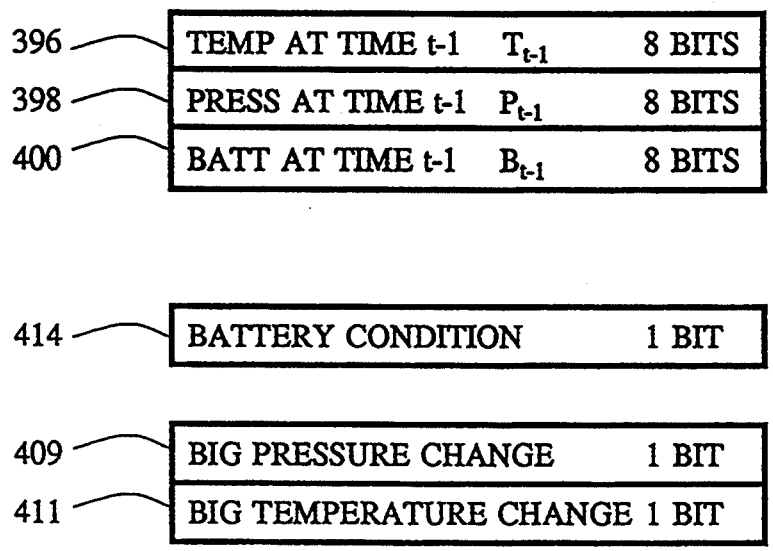
FIG. 13 is a memory map of registers used by the comparing routine of FIG. 12.

Referring to FIG. 13, the RAM 160 of FIG. 4 includes an earlier temperature register 396 for storing an earlier acquired temperature value; an earlier pressure register 398 for storing an earlier acquired pressure value; and an earlier voltage register 400 for storing an earlier acquired voltage value. The RAM also includes a one bit battery condition register 414, the bit being set to one when the battery voltage is below an acceptable limit and the bit being set to zero when the battery voltage is within acceptable limits. The RAM further includes a big pressure change flag register 409 and a big temperature change flag register 411. The big pressure change flag register is for storing a flag bit indicative of whether or not the rate of change of pressure per unit time is greater than a pre-defined value, and the big temperature change flag register is for storing a flag bit indicative of whether or not the rate of change of temperature per unit time is greater that a pre-defined value.

Figure 14:
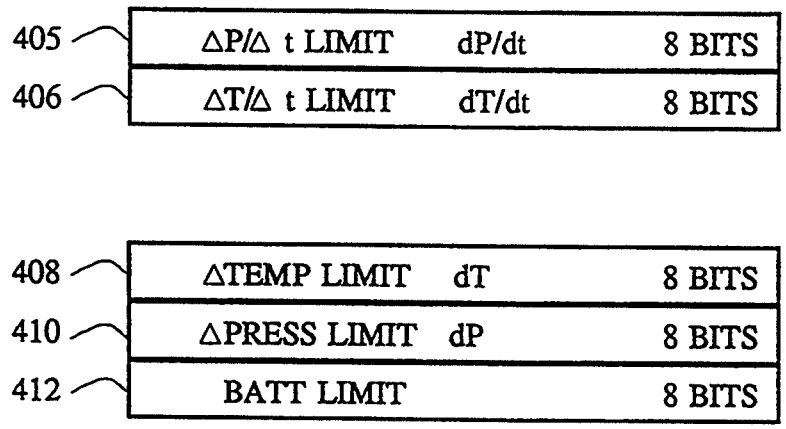
FIG. 14 is a memory map of fixed registers used by the comparing routine of FIG. 12.

Referring to FIG. 14 the ROM 158 of FIG. 5 has a dP/dt limit register 405, a dT/dt limit register 406, a temperature difference register 408, a pressure difference register 410 and a battery voltage difference register 412. The dP/dt limit register 405 holds a value representing a maximum allowable rate of change of pressure with respect to time. The dT/dt limit register 406 holds a value representing a maximum allowable rate of change of temperature with respect to time. The temperature difference register 408 contains a value corresponding to the allowable difference between an earlier acquired temperature value and a later acquired temperature value. Similarly, the pressure difference register 410 contains a maximum allowable pressure difference value. The battery voltage difference register 412 contains a value corresponding to the minimum allowable battery voltage.

steps of comparison routine

The comparison routine 208 has a first step 418 which compares the absolute value of the difference between the temperature value stored in register 304 of FIG. 8 and the temperature value stored in register 396 of FIG. 13. This difference is compared to the contents of the temperature limit register 408. If the absolute value of the difference is less than the temperature limit value, program flow continues with step 420 which performs a similar comparison on pressure values.

Step 420 calculates the absolute value of the difference between the contents of the pressure register 306 of FIG. 6 and the contents of the pressure register 398 of FIG. 13. This pressure difference is compared to the pressure limit value stored in the register 410 of FIG. 13. If the absolute value of the difference in pressure is less than the pressure limit value, program flow continues with step 423 which sets the contents of the first interrupt limit register 403 of FIG. 7 to correspond to twenty seconds. Thus, the first interrupt limit is restored to twenty seconds or is maintained at twenty seconds while pressure and temperature values, and hence temperature and pressure differences are within the limits specified by the contents of the temperature and pressure limit registers 408 and 410 respectively.

Figure 12:
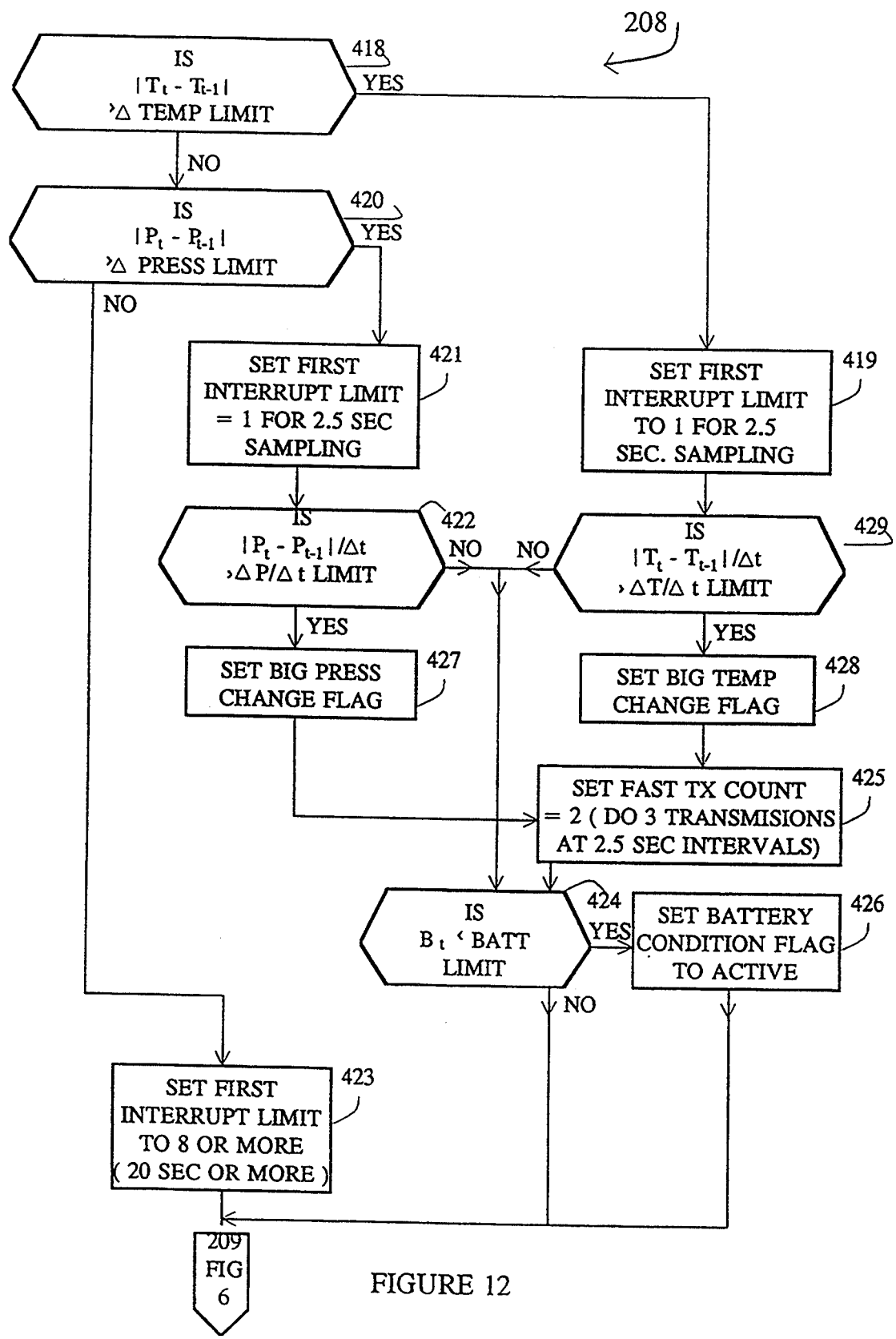
FIG. 12 is a flow diagram according to a comparing routine according to the first embodiment of the invention.

Referring to FIG. 12, if the result of the temperature comparison in step 418 indicates that the allowable temperature limit change has been exceeded, the first interrupt limit register 403 of FIG. 7 is loaded with the value 1 to cause the analog-to-digital conversion 204, the unit conversion 206 and the comparison routine 208 of FIG. 6 to be executed upon receipt of each interrupt from the timer circuit. This has the effect of increasing the rate of sampling the temperature, pressure and battery parameters.

Similarly, if the result of the pressure comparison indicated in step 420 indicates that the change in pressure is greater than the allowable limit, the first interrupt limit register is loaded with a "1" to cause sampling to occur upon the occurrence of each interrupt from the clock timer circuit. The sampling rate is thus increased if either the temperature or pressure value presently acquired has changed from the temperature or pressure value earlier acquired by more than an allowable limit. The comparison routine thus acts as testing means for testing the signals to determine whether they meet a first or second set of conditions and for sampling the signals at a first rate when one of the signals meets the first set of conditions and for sampling the signals at a second rate when the signals meet the second set of conditions, the first set of conditions being met when any of the signals has not changed by more than a pre-defined limit and the second set of conditions being met when any of the signals has changed by more than the pre-defined limit. The comparison routine also acts as comparing means for comparing a later acquired value with an earlier acquired value and wherein the first set of conditions are met when the later acquired value is within a pre-defined range of the earlier acquired value and wherein the second set of conditions are met when the later acquired value is outside of a pre-defined range of the earlier acquired value.

Referring to steps 429 and 422, if the change in temperature per unit time is greater than the dT/dt limit stored in register 406, a big temperature change flag is set as indicated at 428 by storing a flag value in the big temperature change register 411 of FIG. 13.

Similarly, if the pressure change per unit time is greater than the dP/dt limit stored in register 405 of FIG. 14, a big pressure change flag is set as indicated at 427. The big pressure change flag is set by writing a flag value into register 409 of FIG. 13. If either the big temperature flag or the big pressure change flag has been set, the fast transmit count register 407 of FIG. 13 is loaded (425 of FIG. 12) with the value 2 which causes step 201 of FIG. 6 to cause transmission of parameter information to occur three successive times at 2.5 second intervals. In addition, the sampling and analog-to-digital conversion process is performed at 2.5 second intervals. The comparison routine thus acts as determining means for determining a rate of change of the signals and the first set of conditions are met when the rate of change of any of the signals is within a pre-defined range of a pre-defined rate of change and the second set of conditions are met when the rate of change of any of the signals is outside of a pre-defined range of a pre-defined rate of change. Clearly, the first sampling rate is less than the second sampling rate as the first sampling rate is approximately 20 seconds and the second sampling rate is approximately 2.5 seconds.

If either the rate of pressure change per unit time, or the rate of temperature change per unit time comparison undertaken in steps 422 and 429 respectively is negative, the battery voltage is tested at step 424. Step 424 reads the contents of the battery register 308 of FIG. 8 and compares such contents with the contents of the battery limit register 412 of FIG. 14. If the contents of the battery register 308 of FIG. 8 are less than the contents of battery limit register 412 of FIG. 14, the comparison routine is exited and program flow continues with the sample save routine 210 of FIG. 6. If, however, the battery register contents 308 of FIG. 8 are less than the battery limit value 412 of FIG. 14, the battery condition flag is set to active as indicated at 426 in FIG. 12. Step 426 sets the battery condition bit 414 of FIG. 13 to active. Upon setting the battery bit, the comparison routine is completed and program flow continues with the sample save routine 210 of FIG. 6.

Referring to FIGS. 6 and 12, it may be seen that under normal condition, sampling of parameter values occurs every twenty seconds and transmission of parameter values occurs once every ten minutes. Thus, it may be said that the transmitting means transmits the later acquired code at first regular intervals of time, these intervals being ten minutes in duration. In the event that a temperature or pressure changes more than predetermined limits, the sampling rate is increased to one sample every 2.5 seconds. The occurrence of the transmissions remains the same at ten minute intervals.

In the event that pressure or temperature changes per unit time are greater than predetermined limits, the sampling frequency is increased to once every 2.5 seconds and the frequency of transmission is increased to once every 2.5 seconds for three successive transmissions. In this way, the tire unit monitors the operating parameters of the tire by taking samples of the parameters at specified intervals. These specified intervals are shortened in the event of an anomaly being found in one of the parameters and the occurrence of transmissions from the tire unit is increased only upon an anomaly in the parameters indicating a rapid change in such parameters. The comparison routine thus acts as testing means for testing the signal to determine whether or not the signal meets a first or second set of conditions and for transmitting at first regular intervals of time when any of the signals meets the first set of conditions and for transmitting at second regular intervals of time when any of the signals meets the second set of conditions. The comparison routine also acts as comparing means for comparing a later acquired code with an earlier acquired code, the first set of conditions being met when the later acquired code is within a pre-defined range of the earlier acquired code and, the second set of conditions being met when the later acquired code is outside of a pre-defined range of the earlier acquired code.

The comparison routine also acts as determining means for determining a rate of change of a signal, the first set of conditions being met when the rate of change of the signal is within a pre-defined range of a pre-defined rate of change and the second set of conditions being met when the rate of change of the signal is outside of a pre-defined range of a pre-defined rate of change. Clearly in the embodiment shown, the first regular intervals of time are longer than the second regular intervals of time as the first regular intervals of time are 10 minutes in duration and the second regular intervals of time are 2.5 seconds.

sample save routine

Figure 15:
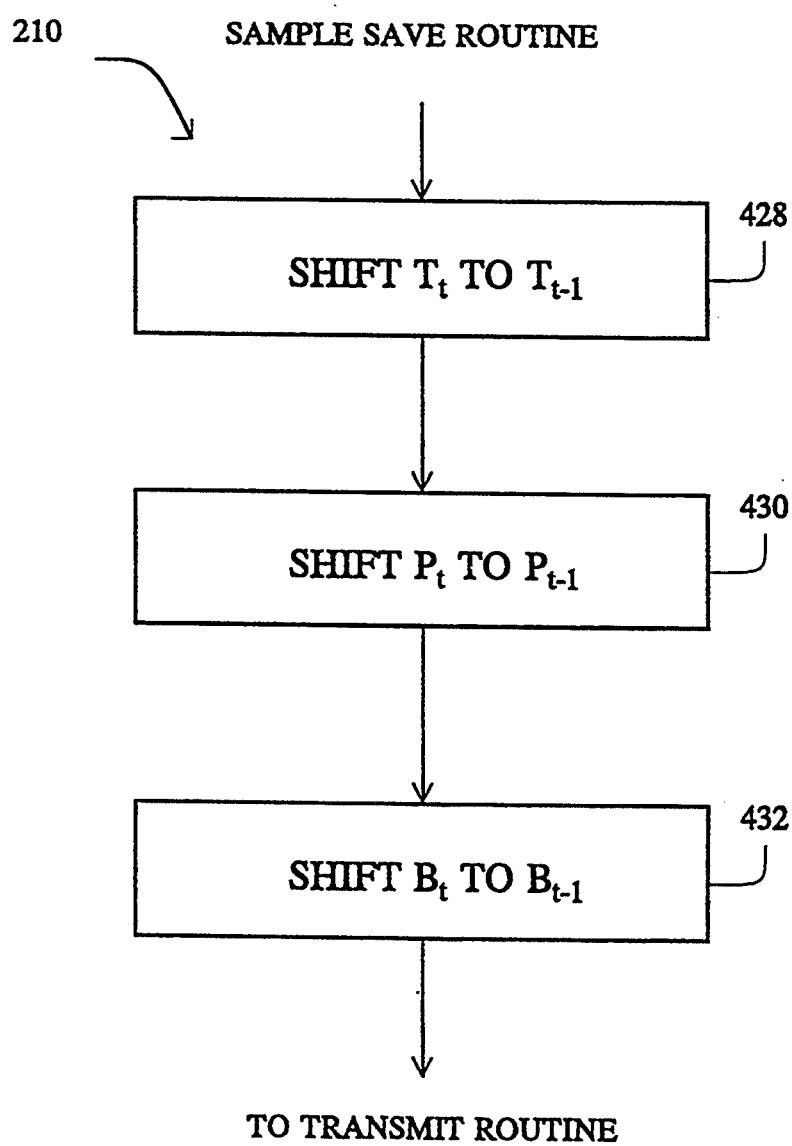
FIG. 15 is a flow diagram according to a sample save routine according to the first embodiment of the invention.

Referring to FIG. 15, the sample save routine 210 is shown in greater detail. Step 428 of the sample save routine simply loads the contents of temperature register 304 of FIG. 8 into temperature register 396 of FIG. 12. Similarly, referring back to FIG. 15, steps 430 and 432 load the contents of pressure register 306 and the contents of battery register 308, both shown in FIG. 8, into the pressure and battery registers 398 and 400 respectively, shown in FIG. 13. The sample save routine is thus completed and program flow continues by resetting the first and second interrupt counters 401 and 402 to zero and performing the transmit routine 212.

transmit routine

The purpose of the transmit routine 212 is to send the values stored in temperature register 304, pressure register 306 and battery register 308 shown in FIG. 8, to the cab unit 42 of FIG. 1. To achieve this end, the transmit routine formats the data held in the temperature, pressure and battery registers 304, 306 and 308 together with unit function information, unit identification information, unit type information, and tire number information in a form detectable by the receiver and causes this information to appear in a transmission sent from the transmitter circuitry 86 to the cab unit.

registers used by transmit routine

Referring to FIG. 16, the ROM 158 of FIG. 5 includes a unit function register 434, upper and lower ID registers 436 and 438, a unit type register 440 and a tire number register 442 which contain pre-defined values which are transmitted each time a transmission is sent to the cab unit.

unit function register

The unit function register 434 stores a five-bit code representing an indication of the functional qualities of the tire unit 44. In this embodiment, the code 00000 has been used to indicate that the unit measures pressure and temperature. Such a device may be used on conventional mining truck tires. In an alternative embodiment a unit function code of 00001 may be used to identify a unit measuring other than tire operating parameters such as vehicle weight.

unit ID registers

The lower unit ID register 436 holds eight bits, whereas the upper unit ID register 438 holds two bits. The lower and upper unit ID registers 436 and 438 thus provide ten bits for identifying a total of 1024 different units. Thus trailers having wheels with tire units thereon may be connected to the tractor and these tire units may also transmit to the same cab unit. All of the tire units 44 mounted on a given tractor or trailer would have the same unit ID number. Thus 1023 different trailers can be connected to the tractor unit and be uniquely identified.

unit type register

The unit type register 440 holds a one bit value for identifying the specific unit type. In this embodiment, the code 0 is used to indicate that the unit is a tractor and the code 1 is used to indicate that the unit is a trailer.

tire number register

The tire number register 442 holds a five bit value for identifying a specific tire on the tractor or trailer unit on which the tire unit 44 is installed. Five bits have been used for this purpose and therefore thirty-two different tires on a single tractor or trailer unit may be identified. The contents of the tire number register in combination with the contents of the unit ID register act as identification means for identifying the tire unit from which a transmission is being received.

The tire unit has a label (not shown) on which is printed the unit function, unit ID, unit type and tire number programmed into the above registers. The user installs the tire unit on a wheel of a tractor or trailer corresponding to the tire number printed on the label.

initialization of transmitter

Figure 17:
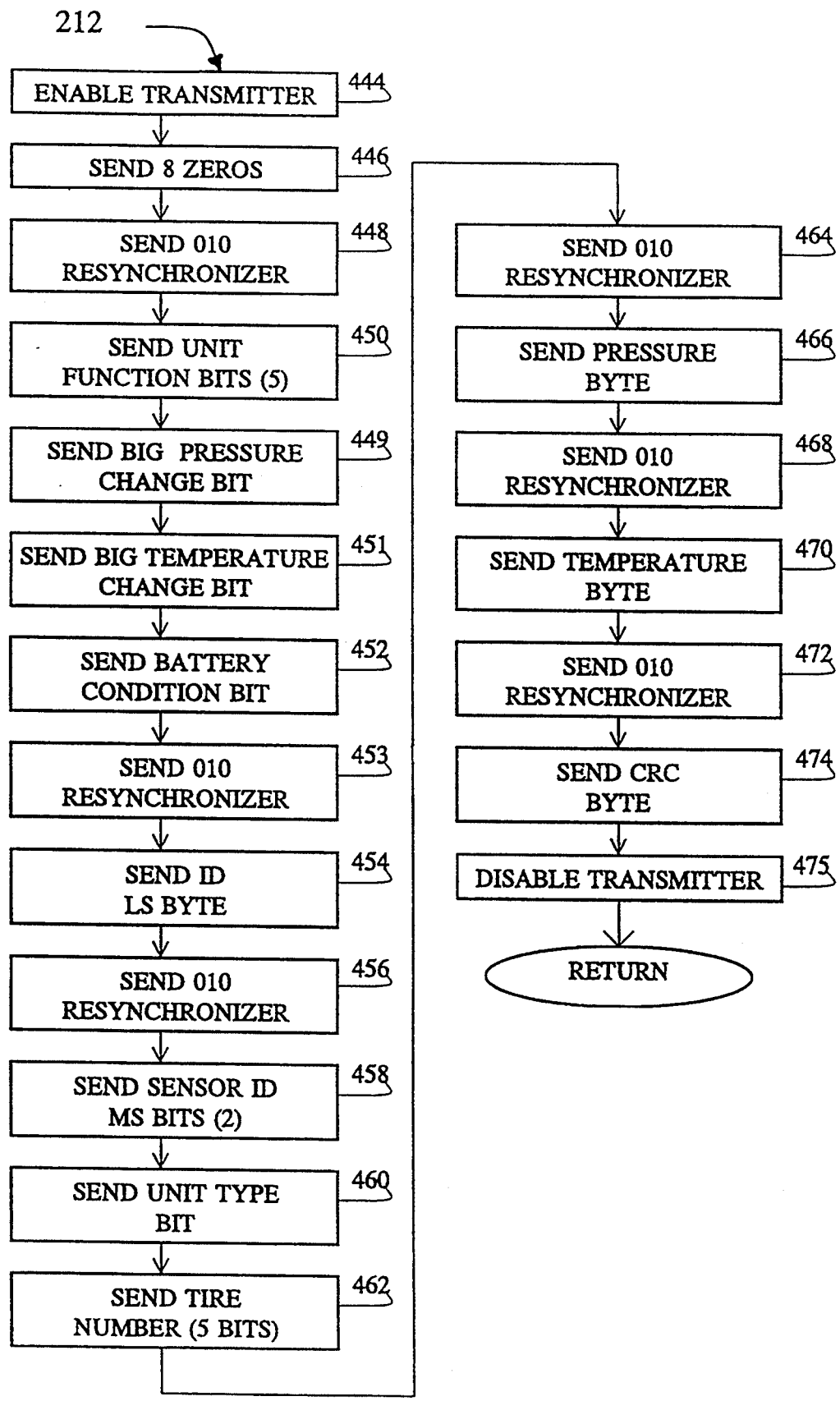
FIG. 17 is a flow diagram according to the transmit routine.

Referring now to FIG. 17, the transmit routine 212 is explained in greater detail. The transmit routine includes step 444 which writes a binary "1" to RB5 of FIG. 5 which connects the RF ground signal line 149 via MOSFET 147 to a signal ground of the overall circuit and thereby provides a ground path for the transmitter. The transmitter is thereby enabled.

The remaining steps of the transmit routine relate to data appearing in serial format on RF modulation signal line 445. The data appears in digital format at 1200 baud at pin RA3 of port A, providing the RFMOD signal.

transmit protocol

Figure 18:
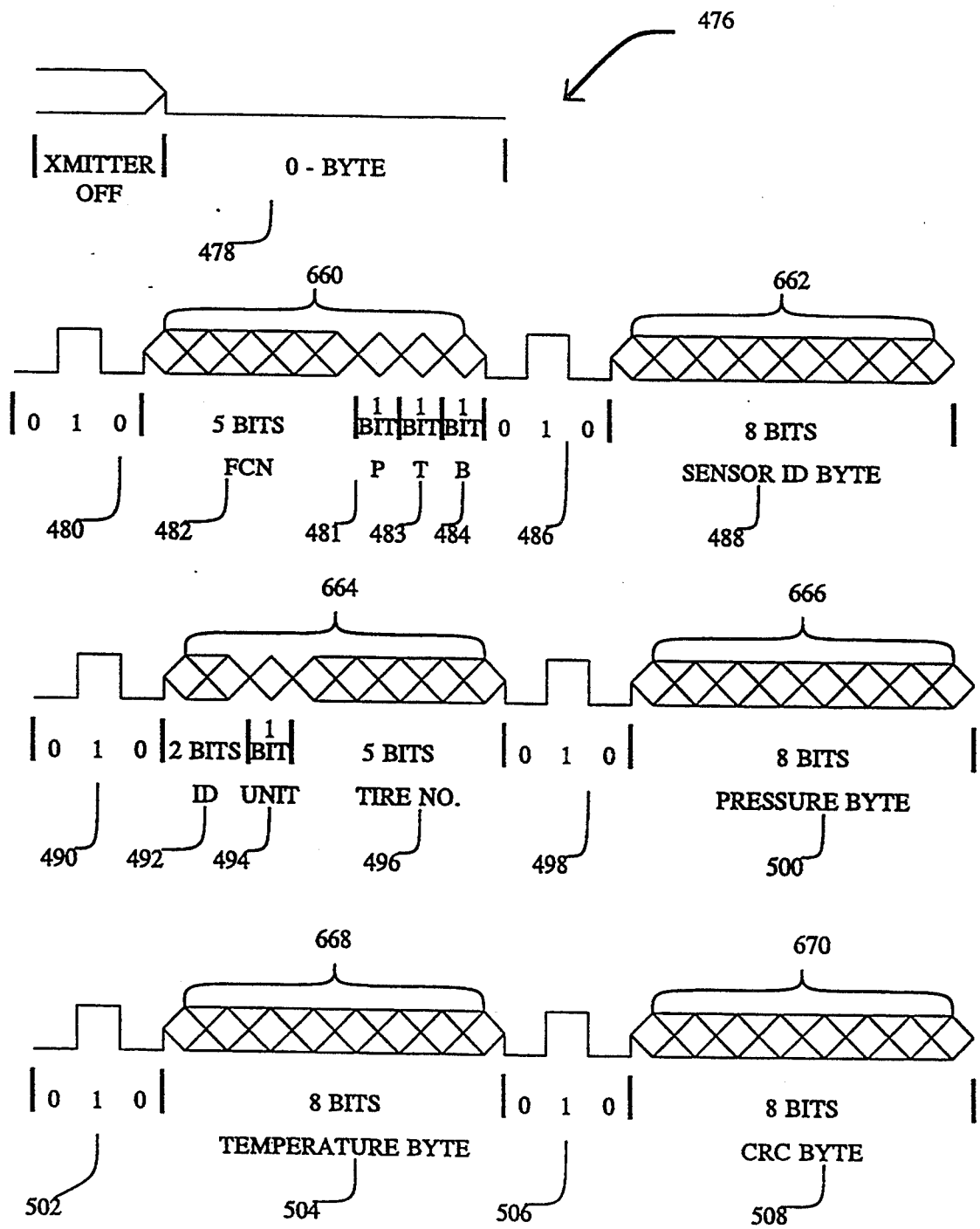
FIG. 18 is a timing diagram of a transmit protocol produced by the transmit routine of FIG. 17.

Referring to FIG. 18, the transmit protocol produced by the transmit routine 212 of FIG. 17 is illustrated generally at 476.

starting sequence

Referring to FIGS. 17 and 18, step 446 produces a sequence Of eight binary zeros which will be referred to as a zero byte 478. Step 448 then produces a three bit code as a re-synchronization sequence comprising the bits 010 and the transmit protocol thus includes a first 010 re-synchronizer sequence 480. The first re-synchronization sequence acts as a re-synchronizer at the receiver and permits re-synchronization of the receiver during transmission of data from the transmitter to the receiver.

information bytes

Referring to FIGS. 13, 16, 17 and 18, step 450 causes the contents of the unit function register 434 of FIG. 16 to be included and the transmit protocol thus includes a five-bit unit function code 482. Step 449 inserts the contents of the big pressure change register 409 into the transmit protocol as indicated at 481. Similarly, step 451 inserts the contents of the big temperature change register 410 into the transmit protocol as indicated at 483. Step 452 then inserts the contents of the battery condition register 414 of FIG. 13 into the transmit protocol. The protocol thus includes a battery condition bit 484.

Next, step 453 produces a second 010 re-synchronizer sequence. The transmit protocol 476 thus includes a second re-synchronizer sequence 486. Step 454 then produces the contents of the first unit ID register 436 and the transmit protocol 476 thus includes a unit ID least significant byte 488.

Step 456 then produces a third 010 re-synchronizer sequence at pin RA3 and the transmit protocol 476 thus includes a third 010 re-synchronizer sequence 490. Step 458 produces the contents of the second unit ID register 438 and the transmit protocol 476 thus includes high order ID bits 492.

Step 460 then produces the contents of the unit type register 440 and the transmit protocol 476 thus includes one unit type bit 494. Step 462 then produces the contents of the tire number register 442 and the transmit protocol 476 thus includes five tire number bits 496.

Next, step 464 produces a fourth 010 re-synchronizer sequence at pin RA3 and the transmit protocol 476 thus includes a fourth 010 re-synchronizer sequence 498. Step 466 produces the contents of the pressure register 306 of FIG. 8 and the transmit protocol 476 thus includes a pressure byte 500.

Next, step 468 produces a fifth 010 re-synchronizer sequence at pin RA3 and the transmit protocol 476 thus includes a fifth 010 re-synchronizer sequence 502. Step 470 produces the contents of the temperature register 304 of FIG. 8 and the transmit protocol 476 thus includes a temperature byte 504.

Next, step 472 produces a sixth 010 re-synchronizer sequence and the transmit protocol 476 thus includes a sixth 010 re-synchronizer sequence 506. Step 474 then produces a cyclic redundancy check (CRC) byte and the transmit protocol thus includes a cyclic redundancy check (CRC) byte 508. It will be appreciated that the cyclic redundancy check is calculated using conventional methods.

Finally, step 475, writes a binary "0" to RB5 of FIG. 5 which disconnects the RF ground signal line 149 and thereby disables the transmitter.

Referring back to FIG. 18, the transmit protocol is divided into six packets of data 660, 662, 664, 666, 668, 670. The first packet 660 includes 8 bits including the two-bit function code 482, the big pressure change bit 481, the big temperature change bit 483 and the battery condition bit 484. The second packet 662 includes 8 bits including the sensor ID least significant byte 488. The third packet 664 includes 8 bits including the most significant two bit ID bits 492, the one unit type bit 494 and the five-bit tire number 496. The fourth packet 666 includes 8 bits which include the pressure byte 500, the fifth packet 668 includes 8 bits which include the temperature byte 504 and the sixth packet 670 includes 8 bits including the CRC byte 508. Each of the packets is separated by a "010" re-synchronizer sequence.

re-entry into low power mode

After the cyclic redundancy check byte has been produced by step 474, the transmit routine 212 is completed and program flow continues in FIG. 6 at step 209 wherein the first microcontroller is placed into the low power mode.

transmitter circuit

Figure 19:
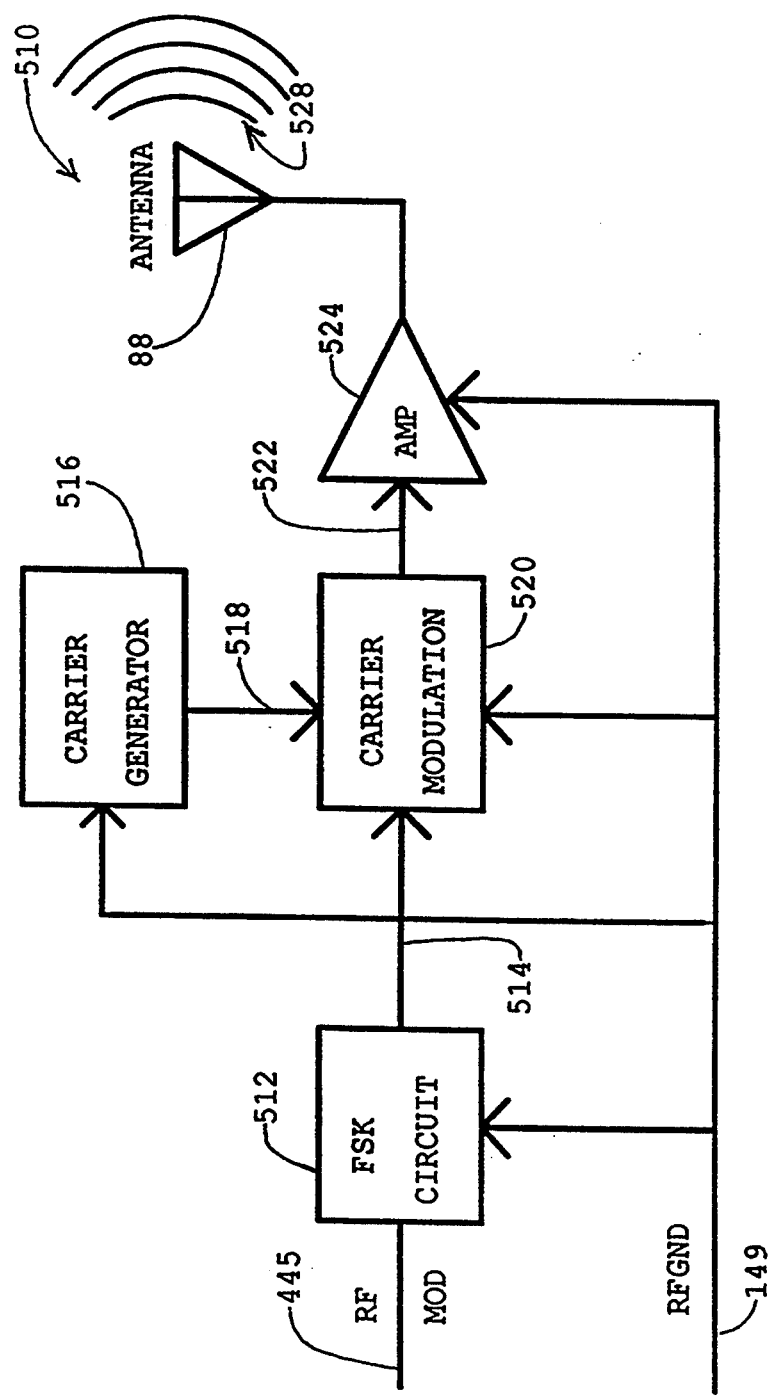
FIG. 19 is a functional block diagram of a transmitter circuit according to the first embodiment of the invention.

Referring to FIG. 19, the transmitter circuit is shown generally at 510. The transmitter is connected to pin RA3 of the first microcontroller by the RF modulation signal line 445, and is connected to pin RB5 of the microcontroller 114 by the RF ground signal line 149 controlled by the RB5 output of the first microcontroller 114.

The transmitter circuit 510 is a conventional frequency shift keyed transmitter circuit which produces a carrier signal having a carrier frequency of 49.83 MHz and a bandwidth of approximately 10 kHz and a power output of 100 milliwatts.

The transmitter circuit includes an FSK circuit 512 having a signal output 514 with an analog output voltage which increases or decreases depending upon whether the RF modulation signal 445 is high or low.

The transmitter circuit also includes a carrier generator 516 having an output 518 for producing the carrier signal described above.

The transmitter further includes a carrier modulation circuit 520 which modulates the carrier appearing on output 518 with the voltage on signal line 514 produced by the FSK circuit 512. The carrier modulation circuit has an output 522 which produces an FSK modulated signal having a higher frequency when the RF modulation signal 445 is at a high level and which has a lower frequency when the RF modulation signal is at a low level. The FSK modulated signal on output 522 is supplied to an amplifier 524 which amplifies the signal and supplies an amplified version thereof to the antenna 88. It will be appreciated that antenna 88 is impedance matched to amplifier 524 to effect signal transfer with minimal loss.

It will be appreciated that the output of the transmitter is a frequency shift keyed electromagnetic signal 528. The signal 528 is transmitted according to the transmit protocol and is transmitted at approximately 1200 baud which results in a bit time of approximately 0.833 mSec. As the signal 528 is transmitted according to the transmit protocol and as the transmit protocol includes the pressure byte, the temperature byte and an identification of the transmitter, the pressure byte, the temperature byte and the identification of the transmitter are thus transmitted for reception by a receiver.

Receiver

Referring back to FIG. 1, the receiver is mounted inside the cab portion of the tractor and thus is mounted at a central location.

antenna/amplifier

Figure 20:
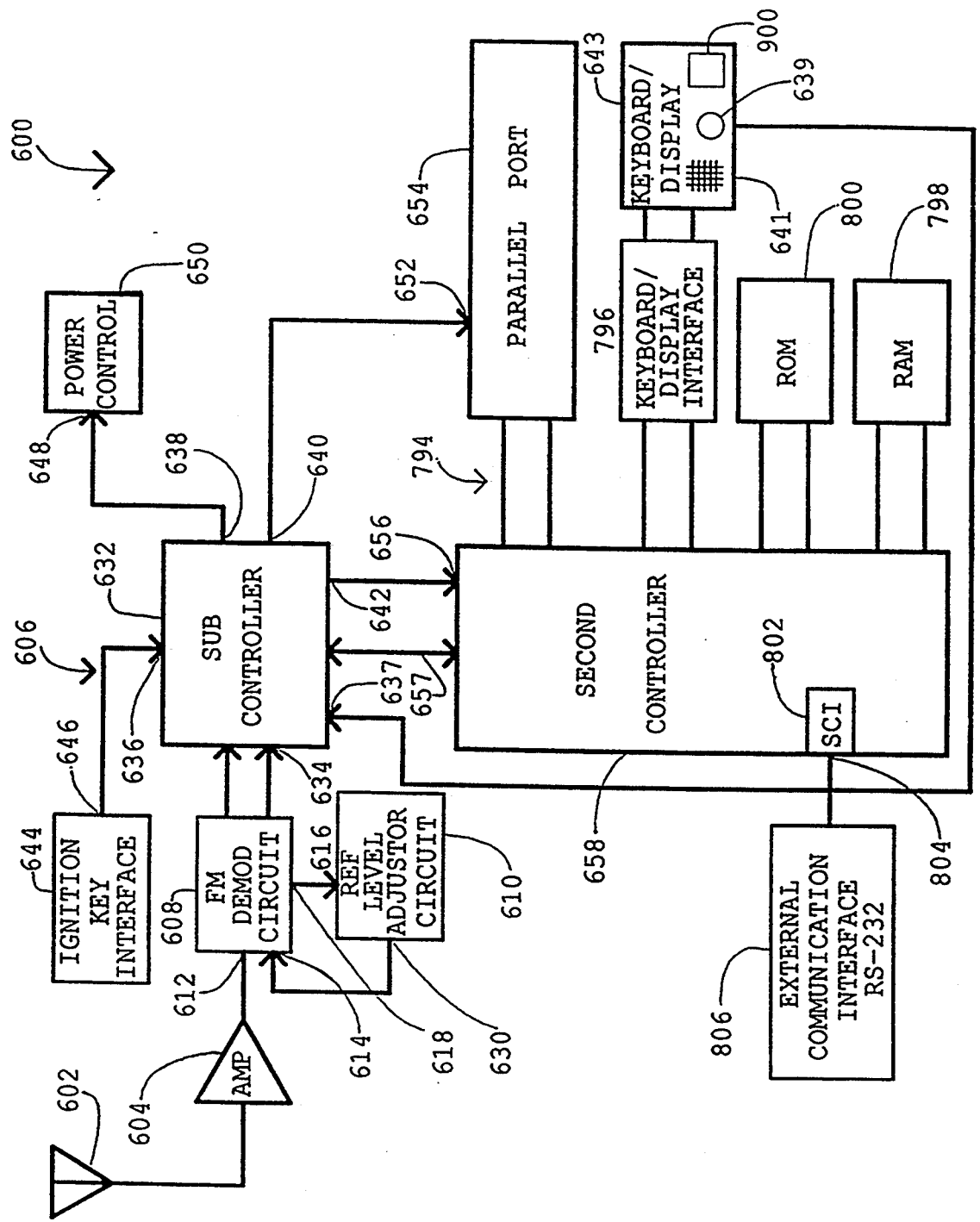
FIG. 20 is a functional block diagram of a receiver circuit according to the first embodiment of the invention.

Referring to FIG. 20, the receiver is shown generally at 600 and includes an antenna 602, an amplifier 604, and an FM receiver circuit shown generally at 606. The antenna 602 includes a conventional whip antenna mounted on top of the cab of the tractor. The antenna may alternatively be mounted on the front bumper of the tractor or under a frame portion of the cab of the tractor.

The antenna 602 receives the FSK modulated electromagnetic signals produced by each of the transmitters and produces low-level signals in response thereto. The antenna is connected to the amplifier 604 through an impedance matching network (not shown). The low level signals are thus supplied to the amplifier 604 which amplifies them to a level which can be detected by the FM receiver circuit 606.

FM receiver circuit

The FM receiver circuit includes an FM demodulator circuit 608 and a reference level adjustor circuit 610. In the preferred embodiment, the FM demodulator circuit includes a Motorola MC3362 low-power dual conversion FM receiver. available from Motorola Semiconductor Corporation of Arizona. The FM demodulator circuit has a mixer input 612, a comparator input 614, a comparator output 616 and a detector output 618. The mixer input 612 receives the signal produced by the amplifier 604 and produces an analog signal corresponding to the FSK modulated electromagnetic signal, the analog signal being produced at the detector output 618.

The FM demodulator circuit is connected to peripheral components including resistors, capacitors and crystals, the selection of which would be clear to one of ordinary skill in the art, to tune the circuit to receive FSK signals having a carrier frequency of 49.830 MHz and a bandwidth of 10 kHz, (i.e. the same carrier frequency and bandwidth of the signals produced by the transmitters).

When the carrier frequency of the transmitted signal is identical to the tuned carrier frequency of the FM demodulator circuit the analog signal produced at the detector output has a DC component determined by the ratio of binary "1"s to binary "0"s in the transmit protocol.

While the demodulator circuit is tuned to the expected carrier frequency of the transmitters, it will be appreciated by one of ordinary skill in the art that temperature and component drift effects may cause the carrier frequency of individual transmitters to differ slightly from the expected carrier frequency. Any difference in actual carrier frequency of a transmitted signal from that of the tuned carrier frequency of the receiver will appear as a DC component in the analog signal produced at the detector output. With a plurality of transmitters in operation, the DC component dynamically changes. Thus the demodulator circuit acts as producing means for producing an analog signal in response to the received transmission, the analog signal having a DC component.

Normally, the analog signal is fed into an internal comparator (not shown) in the MC3362 which produces a digital output signal at comparator output 616. However, due to the dynamically changing DC component appearing in the analog signal, the analog signal may appear to have a higher or lower voltage level than would otherwise be present in the absence of the DC component. This can have the effect of causing the internal comparator to switch prematurely resulting in erroneous data appearing at the comparator output 616. Premature switching of the internal comparator however, is reduced by connection of the reference level adjustor circuit 610 between the detector output 618 and the comparator input 614.

reference level adjustment

Figure 21:
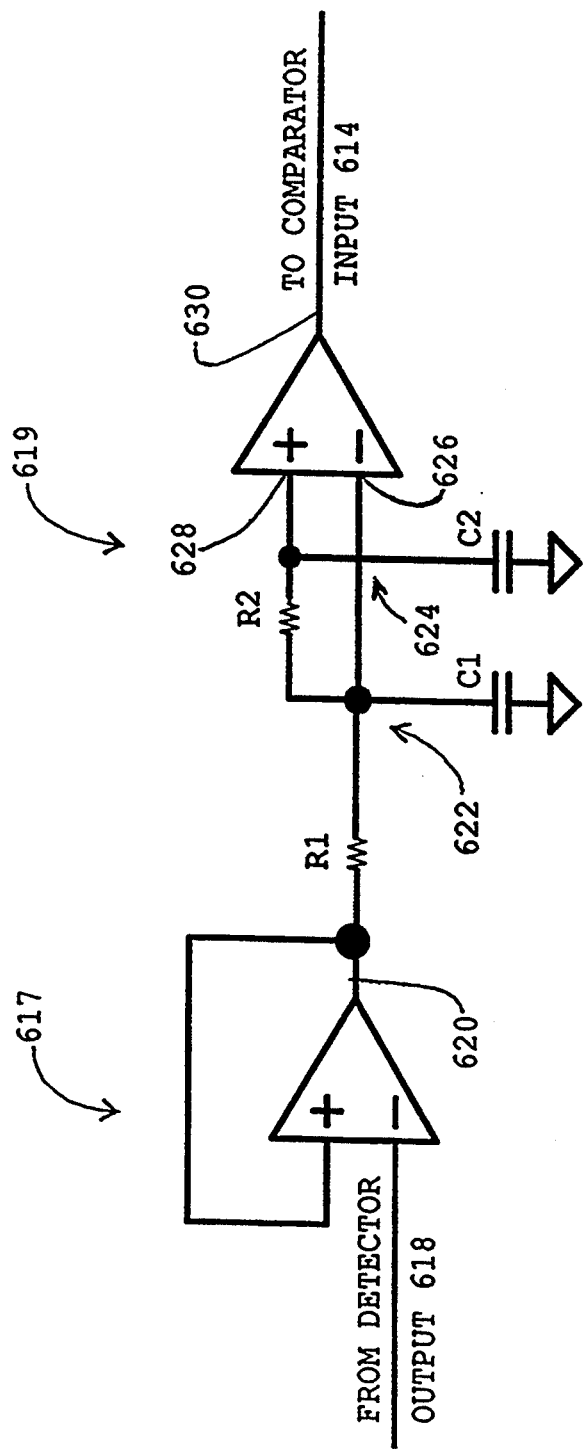
FIG. 21 is a schematic diagram of a reference level adjuster circuit according to the first embodiment of the invention.

The reference level adjustor circuit 610 is shown in greater detail in FIG. 21. The circuit includes a voltage follower shown generally at 617 and an external comparator shown generally at 619. The voltage follower is conventional and has an output 620 which produces a buffered analog signal. The external comparator includes first and second lowpass filter circuits shown generally at 622 and 624. The first filter circuit 622 includes resistor R1 and capacitor C2. The second filter circuit 624 includes the series combination of resistors R1+R2 and capacitor C2. The first filter circuit has a time constant approximately equal to 1/10 of a bit time of a transmitted bit (e.g. approx 0.083 sec) The second filter circuit has a time constant at least equal to one byte time.

The buffered analog signal is supplied to both filters, however the output of the first filter is supplied to a reference input 626 of the external comparator 619 and the output of the second filter circuit is supplied to a comparing input 628 of the comparator 618.

The effect of the circuit is to employ the first filter circuit 622 to filter out the DC component of the analog signal and use it as a reference voltage to which the actual analog signal is compared. Thus the effect of the DC component is virtually eliminated and the external comparator 619 produces a preliminary digital output signal on an output 630 of the external comparator, the preliminary digital signal having digital signal transitions due to modulation of the analog signal only. The first filter circuit 622 thus acts as first attenuating means for attenuating high frequency components of the analog signal to produce a filtered analog signal, the high frequency components having frequencies more than ten times the baud rate of the received transmission and the second filter circuit 624 acts as second attenuating means for attenuating the filtered analog signal to produce a reference signal proportional to the DC component. In addition the external comparator acts as a comparator which is switched in response to the filtered analog signal to produce a digital signal, the comparator using the reference signal as a switching reference.

Referring back to FIG. 20, the preliminary digital signal is supplied to the internal comparator of the MC3362 on comparator input 614 which permits a "clean" digital signal to be produced at the comparator output 616.

The receiver circuit 600 further includes a subcontroller 632, an ignition key interface 644, a keyboard/display unit 643, a power control circuit 650, a parallel port 654 and a second microcontroller 658.

subcontroller

The subcontroller 632 is a single chip microcontroller having on board ROM, RAM, a timer circuit, and programmable I/O ports. The status of input ports is determined by reading an input status register (not shown) for the port. Outputs are controlled by writing to an output control port (not shown). The status of an output pin may be determined by reading the output control port.

subcontroller-physical connections

The subcontroller 632 has a first input 634, a second input 636, a third input 637, a first output 638, a second output 640, a third output 642 and a plurality of handshaking lines 643 including a clock line, a reset line, an NMI line and a permission line.

The first input 634 receives the digital signal from comparator output 616.

The second input 636 is connected to the ignition key interface circuit 644 which has an output 646 which provides an ignition key signal to the second input 636. The ignition key signal has two voltage levels indicating that the ignition key is on and off respectively.

The third input 637 is connected to an on/off switch 639 on a keyboard portion 641 of the keyboard/display unit 643. The third input receives a keyboard on/off signal from the on/off switch 639, the on/off switch being operable independently of the remainder of the keyboard portion. The keyboard on/off signal has a high or low voltage level depending on whether the keyboard on/off switch is on or off respectively.

The first output 638 is connected to an input 648 of the power control circuit 650 which enables or disables power to each of the components shown in FIG. 20.

The second output 640 includes a single data line which is connected to an input 652 of the parallel port 654.

The third output 642 is connected to an interrupt input 656 of the second microcontroller 658.

The handshaking lines 637 are connected to the second microcontroller 658 and control the second microcontroller to render it ready to receive data from the subcontroller 632, to reset the second microcontroller upon power-up, and to enable the subcontroller to receive a permission signal from the second microcontroller indicating that the second microcontroller is ready to be put into a low power mode.

subcontroller monitoring program

Generally, power is supplied to the subcontroller 632 at all times and power to the remaining portions of the circuit is controlled by the subcontroller through the power control circuit 650. When the tractor is parked and the engine is shut off, the subcontroller will place all other components into a low power mode wherein only the subcontroller is executing a program and wherein all other portions of the circuit are functionally inactivated. During this time, the subcontroller executes a main algorithm shown generally in FIG. 22 at 800.

Figure 22:
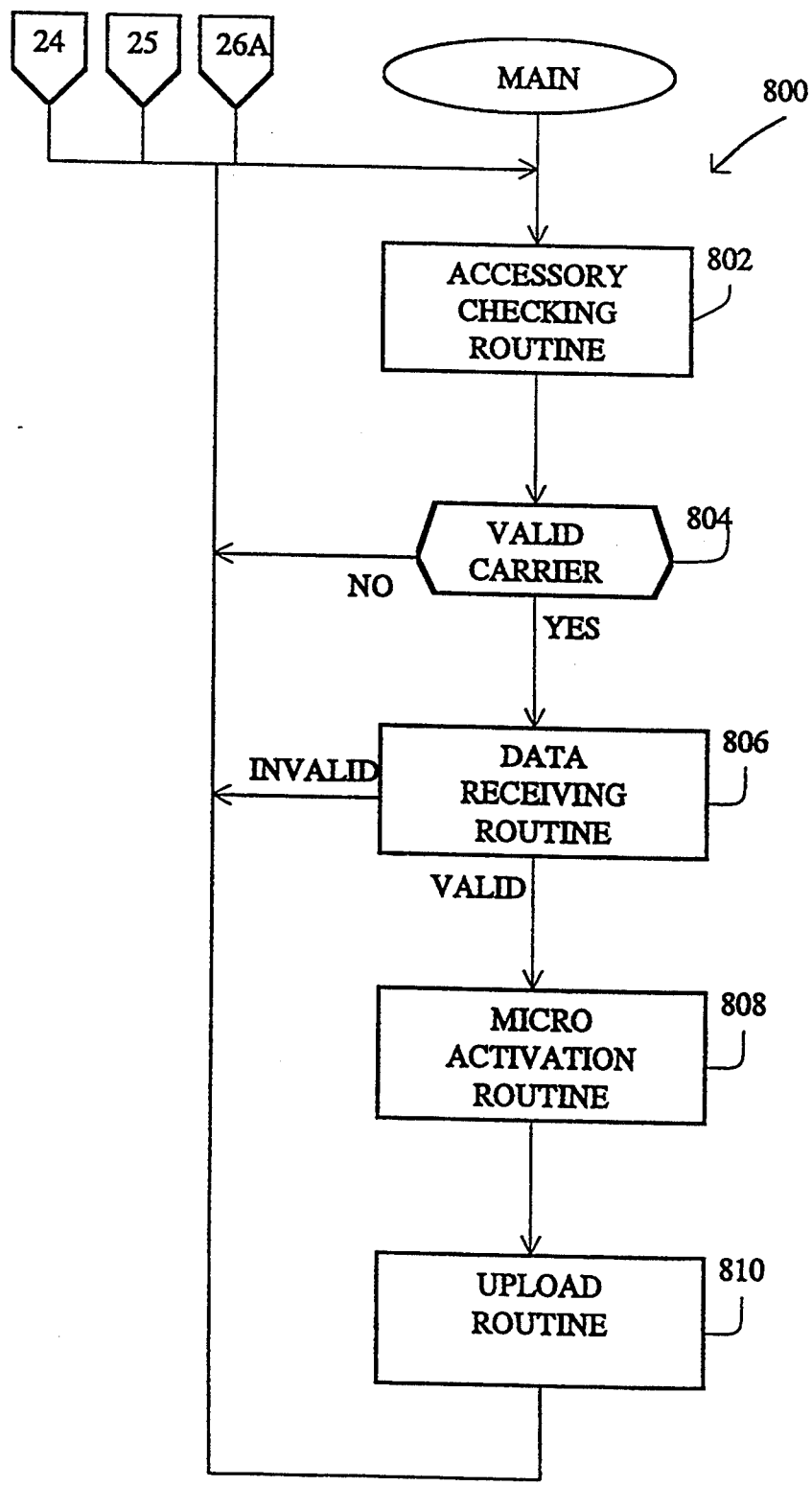
FIG. 22 is a flow diagram of a subcontroller monitoring program executed by a subcontroller according to the first embodiment of the invention.

Referring to FIG. 22, the main algorithm 800 includes an accessory checking routine 802, a data carrier testing routine 804, a data receiving routine 806, a second microcontroller activation routine 808 and an upload routine 810.

It will be appreciated that the program run by the subcontroller is programmed into the internal ROM of the subcontroller and that all temporary storage registers which are accessed by the program are located in the internal RAM of the subcontroller.

accessory checking routine 802

Figure 23:
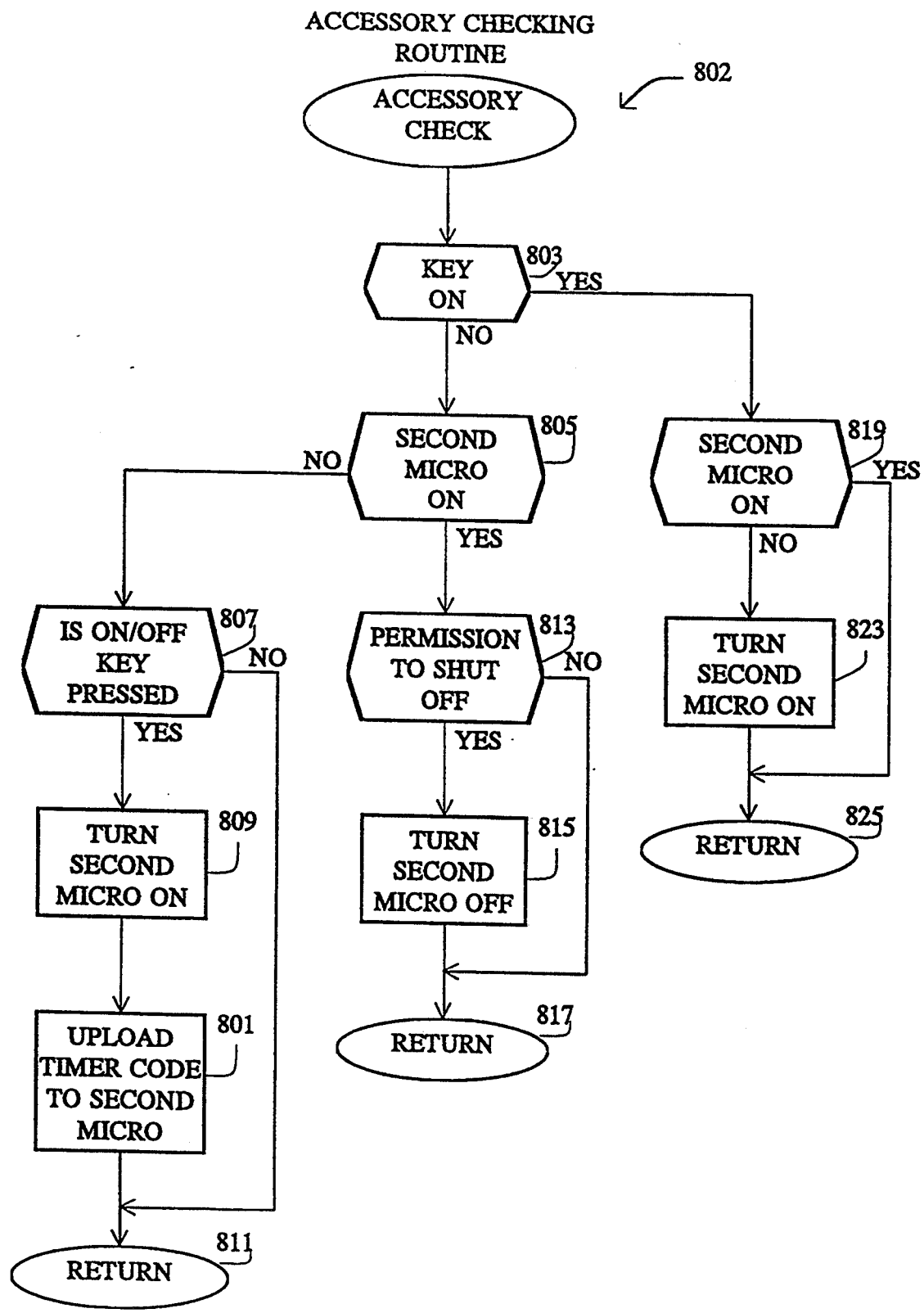
FIG. 23 is a flow diagram of an accessory checking routine executed by the subcontroller.

The accessory checking routine is shown generally at 802 in FIG. 23. Referring to FIGS. 20 and 23, the routine begins by checking 803 input 636 of FIG. 20 to determine the state of the ignition key interface signal produced by the ignition key interface 644 on output 646. The routine then reads the state of the first output 638. As the first output 638 is controlled by the subcontroller, the subcontroller merely reads the output control port (not shown) to determine the state of the output.

If the ignition interface signal indicates that the ignition switch is off and the first output 638 is inactive 805 indicating that the second microcontroller is off, third input 637 is sampled to determine whether or not the on/off key 639 on the keyboard has been pressed as indicated at step 807. If pressed, the second microcontroller is turned on 809 by setting the output 638 active. A timer code is uploaded 801 to the second microcontroller which renders it operational for a period of time which in this embodiment is 5 minutes. This enables a truck operator to turn the device on and enter selected parameters to be described later or to observe the display while the tractor is turned off. If the on/off key 639 is not pressed, the accessory checking routine is exited 811 and processing proceeds with step 804 of FIG. 22.

If the accessory interface signal at input 636 is inactive and the second microcontroller is on, the permission handshaking line is tested 813 to determine whether or not it is active indicating that the second microcontroller is signalling that it has finished its processing (to be described later) and can now be turned off 815 by the subcontroller. To turn the second microcontroller off 815, the subcontroller sets the output 638 inactive thereby disabling power to the second microcontroller and reducing power consumption. If the permission handshaking line is not active, the second microcontroller is not ready to be shut off and the accessory checking routine is exited 817 and processing proceeds with step 804 of FIG. 22.

If the accessory interface signal at input 636 indicates that the ignition key is on, and the second microcontroller is off 819, the second microcontroller is turned on 823 by setting the output 638 active. If the accessory interface signal indicates that the ignition switch is on 803 and if the second microcontroller is on 819, the accessory routine is exited 825 and processing proceeds with step 804 of FIG. 22.

data carrier testing routine 804

At any time the accessory routine is exited, the main program proceeds with step 804 of FIG. 22, which samples the input 634 to determine whether or not a valid carrier signal is being received by the demodulator circuit. The presence of a valid carrier is assumed when a sequence of eight zeros is received. If no valid carrier is being received, it is assumed that none of the transmitters is transmitting and the main program continues processing back at the accessory checking routine 802. If a valid carrier is being received, the main program proceeds with the data receiving routine 806.

zero sequence detector subroutine 699

Figure 24:
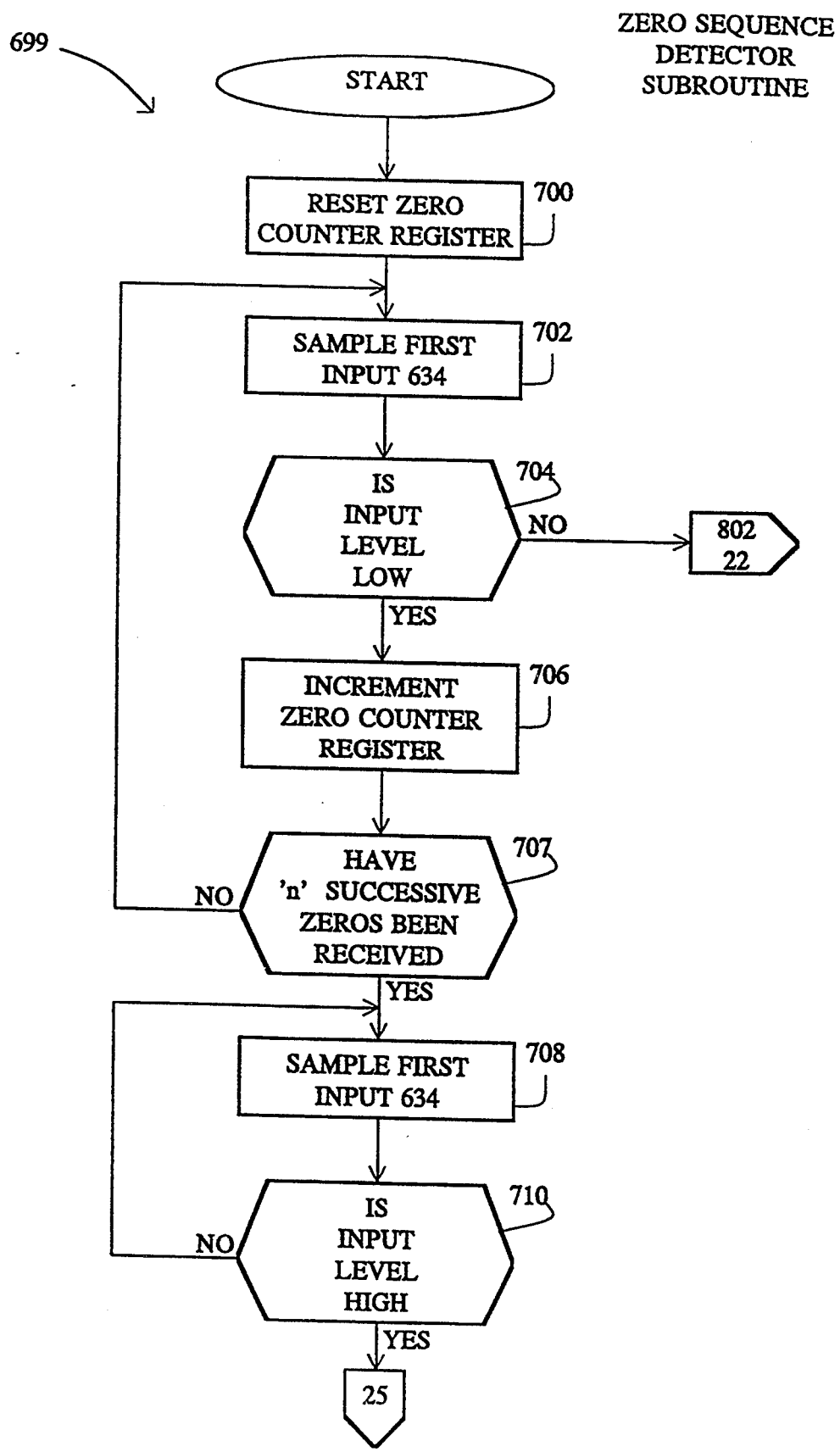
FIG. 24 is a flow diagram of a zero sequence detector subroutine executed by the subcontroller.

Referring to FIGS. 20 and 24, the data carrier testing routine includes a zero sequence detector subroutine which is shown generally at 699. The routine begins by directing the subcontroller to reset 700 a zero counter register for counting successive occurrences of O's in the received transmission. The routine then monitors the first input 634 by sampling 702 the first input 634 and testing 704 to determine whether or not the input is low or high. If the input is high, program flow again proceeds with the accessory checking routine 802 of FIG. 20. Referring back to FIG. 22, if the input is low the zero counter register is incremented 706 to record the occurrence of the low value. The counter contents are then tested 707 to determine whether or not "n" successive low values have been recorded. In this embodiment "n" is equal to 40 but it will be appreciated that n is programmable and can be any number. The value 40 has been chosen for n because this represents a minimum number of low values which can be recorded, during the time taken for the 0-byte 478 of the transmit protocol of FIG. 18 to be transmitted, and for which it can reasonably be assumed that the 0 byte is being received. If the input is not low for 40 counts of the zero counter, program flow continues by returning to the accessory checking routine 802. If the input is low for 40 counts of the zero counter register, it is assumed that the zero-byte of the transmit protocol has been received and that a valid carrier is being detected. Program flow continues with further sampling 708 of the input until a high level is detected 710, signifying the occurrence of the leading edge of the "1" in the 010 sequence flow then continues with the data receiving routine 806 of FIG. 22.

data receiving routine 806

Figure 25:
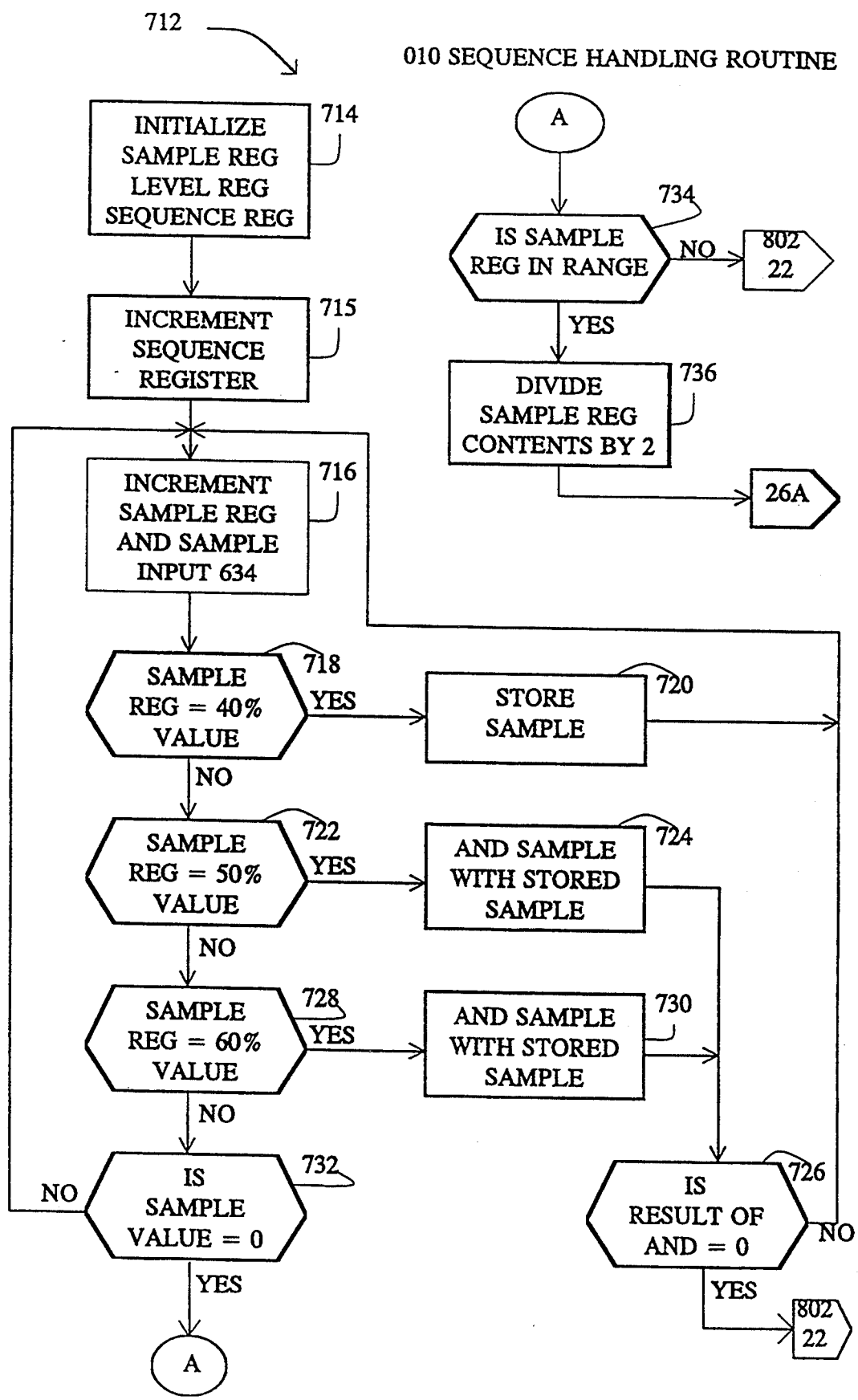
FIG. 25 is a flow diagram of a 010 sequence handling subroutine executed by the subcontroller.
Figure 26A:
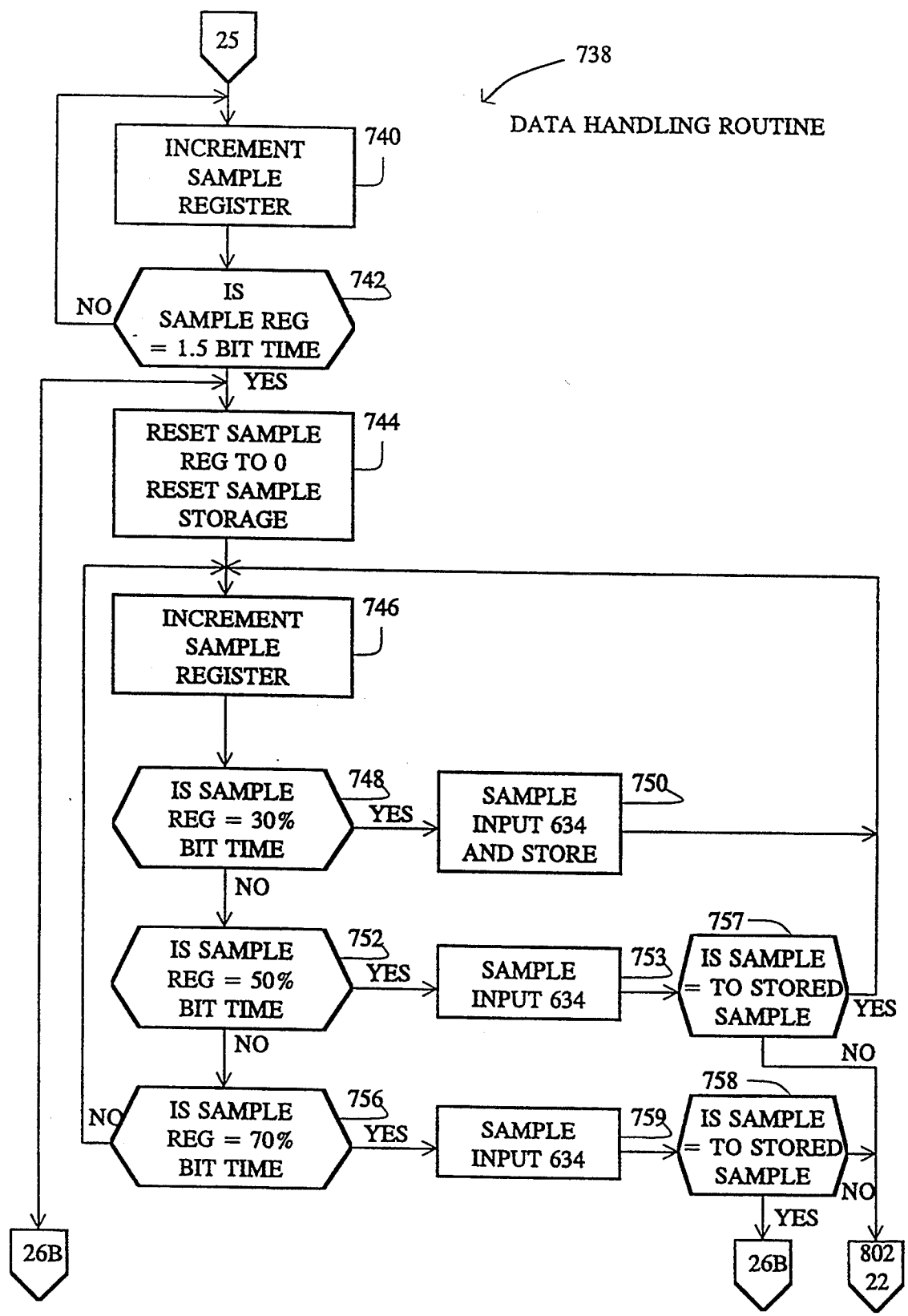
FIGS. 26A and 26b are first and second portions respectively of a flow diagram of a data handling routine executed by the subcontroller.

The data receiving routine 806 includes a 010 sequence handling subroutine shown generally at 712 in FIG. 25, and a data handling subroutine shown generally at 738 in FIG. 26a.

010 sequence handling subroutine 712

Referring to FIGS. 20 and 25 the 010 sequence handling routine begins by initializing a sample counter register, initializing 714 a level register and initializing a sequence occurrence counter register existing in RAM. The sample counter register will contain a value representing the number of count loop sequences executed that is, the number of samples taken of the "1" in the 010 sequence. The level register will contain a value representing the voltage level appearing at the first input 634 of FIG. 20. The sequence occurrence counter register will contain a value representing the number of 010 sequences received.

After initialization of the above registers, the routine increments 715 the sequence occurrence register and then increments the sample counter register and samples the input 634 of FIG. 20 as indicated at 716. The contents of the sample counter register are then tested 718 to determine whether or not the count value corresponds to a 40% bit time position. If so, the voltage level of the sample is stored 720 in the level register and the program continues at step 716 by incrementing the counter register and again sampling the input 634 of FIG. 20. If not, then the contents of the sample counter register are tested 722 to determine whether the count value corresponds to a 50% bit time position.

If the counter value corresponds to the 50% bit time position, the voltage level of the sample is ANDed 724 with the contents of the level register and the result is stored in the level register. If the result of the AND function is zero, the routine is aborted 726 and program flow continues back at the accessory checking routine 802 of FIG. 22.

Referring back to FIG. 25, if the result of the AND function is one then the program continues execution at step 716 by again incrementing the counter register and taking a sample of the input. If the counter value is not equal to the 50% bit time position, the counter register contents are tested 728 to determine whether the sample corresponds to the 60% bit position.

The above process of testing the level of the sample as described for the 50% bit position is repeated for the 60% bit position as indicated generally at 730. If the counter value is not equal to the 60% bit time position, the level register is checked 732 to determine whether the sample level has returned to zero signifying the occurrence of the falling edge of the "1" in the 010 sequence. If the sample level has not returned to zero, it is assumed that the "1" bit of the sequence is still present and sampling and counting continues at step 716 until the input voltage level has returned to zero as indicated at 732.

When the input voltage level has returned to zero, the contents of the sample counter register are checked 734 to determine whether or not the sample register contents are within a pre-defined range representing an expected sample register contents range corresponding to the duration of one bit time. If the sample contents are out of the pre-determined range, the process is aborted and the program resumes operation at the accessory checking routine 802 in FIG. 22.

Referring back to FIG. 25, if the sample counter register contents are within the pre-defined range, the sample counter register contents are divided by two 736 which has the effect of setting the sample counter register contents to a value corresponding to the mid-bit position of the "1" in the 010 sequence. The receiver is thus re-synchronized to the mid bit position of the "1" in the 010 re-synchronizer of the transmission. The data handling routine is then entered to receive and store individual bits of the incoming data.

data handling subroutine 738

Referring to FIG. 26a, the data handling routine is shown in detail at 738. The data handling routine begins by incrementing 740 the contents of the sample counter register and then testing 742 the contents of the sample counter register to determine whether or not the sample register contents corresponds to a predetermined value representing a 1½ bit time position. If the sample register contents are not equal to the 1½ bit time value, the program continues by returning to the step of incrementing the sample counter register 740.

If the sample counter register contents do represent the 1½ bit time position, the sample counter register is reset to zero as indicated at 744, to signify the leading edge of the first bit of data. The sample counter register contents are then incremented as indicated at 746. The contents of the sample counter register are then tested 748 to determine whether or not the sample contents are equal to a value representing a 30% bit time position. If so, the program samples and stores the input voltage level in the level register as indicated at 750. Program flow is then directed back to the step of incrementing the sample counter register as indicated at 746.

If the sample register contents are not equal to the 30% bit position, the contents are tested to determine whether they correspond to a 50% bit time position as indicated at 752. If so, then a sample of the input 634 is taken 753 and the sample value is compared 757 to the sample value previously acquired at the 30% bit time position. If the 50% sample value is equal to the sample value, program flow returns to the step of incrementing the sample counter register contents. If the 50% sample value is not equal to the 30% bit time sample value, the routine is aborted and program flow continues at step 802, the accessory checking routine of FIG. 20.

Referring back to FIG. 26a, if the sample value is not equal to the 50% bit time position value, the contents of the sample counter register are tested to determine whether the sample counter register contents are equal to a value corresponding to a 70% bit time position as indicated at 756.

If the contents of the sample counter register are not equal to the 70% bit time value, program flow is directed back to the step of incrementing the sample counter register 746. If the contents of the sample counter register are equal to the 70% bit time value, a sample is taken 759 and the value of the sample is compared to the 30% bit time value as indicated at 758. If the 70% bit time value is not equal to the 30% bit time value, the routine is aborted and program flow continues at the accessory checking routine, step 802 of FIG. 20.

Figure 26B:
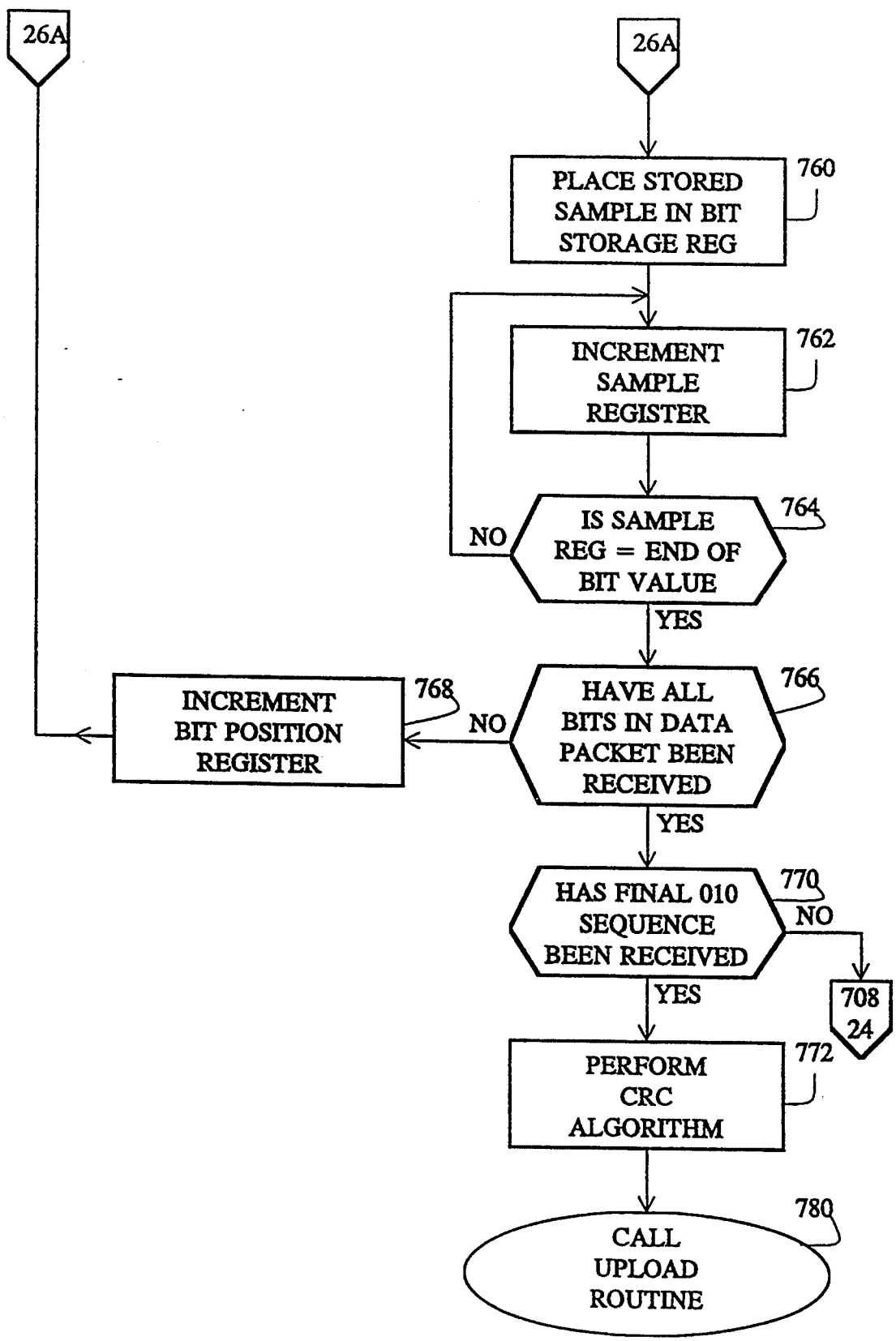

Referring back to FIG. 26a, if the 70% value is equal to the 30% value, the 30% value is assumed to be the value of the bit and the value is stored 760 in a bit storage register corresponding to the bit position of the bit currently received as shown in FIG. 26b. There is a separate bit storage register for each bit in each packet of data.

Referring to FIG. 27, the bit storage registers form part of a first group of receiver parameter registers which are arranged into three 16-bit registers identified as bat 774, codes 776, and presstemp 778.

Bits 0–7 of the bat register are unused. Bit 8 is the battery condition bit, bits 9 and 10 are the big temperature and big pressure change bits, and bits 11–15 represent the five-bit function code. Bits 0–7 of the codes register represent the least significant byte of the unit identification. Bits 8–12 represent the tire number, bit 13 represents the unit type and bits 14 and 15 represent the two most significant bits of the unit identification. Bits 0–7 of the presstemp register represent the air pressure and bits 8–15 represent the temperature.

Referring back to FIG. 26b, after storing 760 the bit value in the appropriate bit position of the appropriate bit storage register, the program continues by incrementing the sample counter register contents as indicated at 762 and testing 764 the contents to determine whether or not the sample register contents correspond to a value indicative of an expected end of the bit time. If the sample contents do not correspond to the end of the bit time, the program continues by repeating step 762 until the sample register contents does indicate the end of the bit time.

When the end of the bit time has been reached, the program queries 766 whether or not all eight bits in the data packet have been received and if not, the bit position sample register is incremented 768 and program flow continues back at step 744 in FIG. 26a where the above steps are repeated for the next bit in the data packet.

Referring back to FIG. 26b when all bits in the packet have been received, step 770 tests the sequence sample counter register to determine whether or not the final 010 sequence has been received. If it has not, the program continues at step 708 shown in FIG. 24. If it is determined that the final 010 sequence of the entire transmission has been received, program flow continues with the execution of a conventional cyclic redundancy check CRC algorithm 772.

Upon entry of the CRC algorithm, the bit storage registers shown in FIG. 27 contain respective bits representing the data in the transmit protocol. The individual bits in the bit storage registers are used in the cyclic redundancy check algorithm to calculate a value and compare it with the CRC byte transmitted in the transmit protocol. If the transmitted value does not equal the calculated value, the data is considered invalid and is ignored. If the transmitted value is equal to the calculated value, the bits received are assumed to be the bits sent and the data is considered valid. The data handling routine is then exited 780 and the main program executes the second microcontroller activation routine 808 as shown in FIG. 22.

second microcontroller activation routine 808

Figure 28:
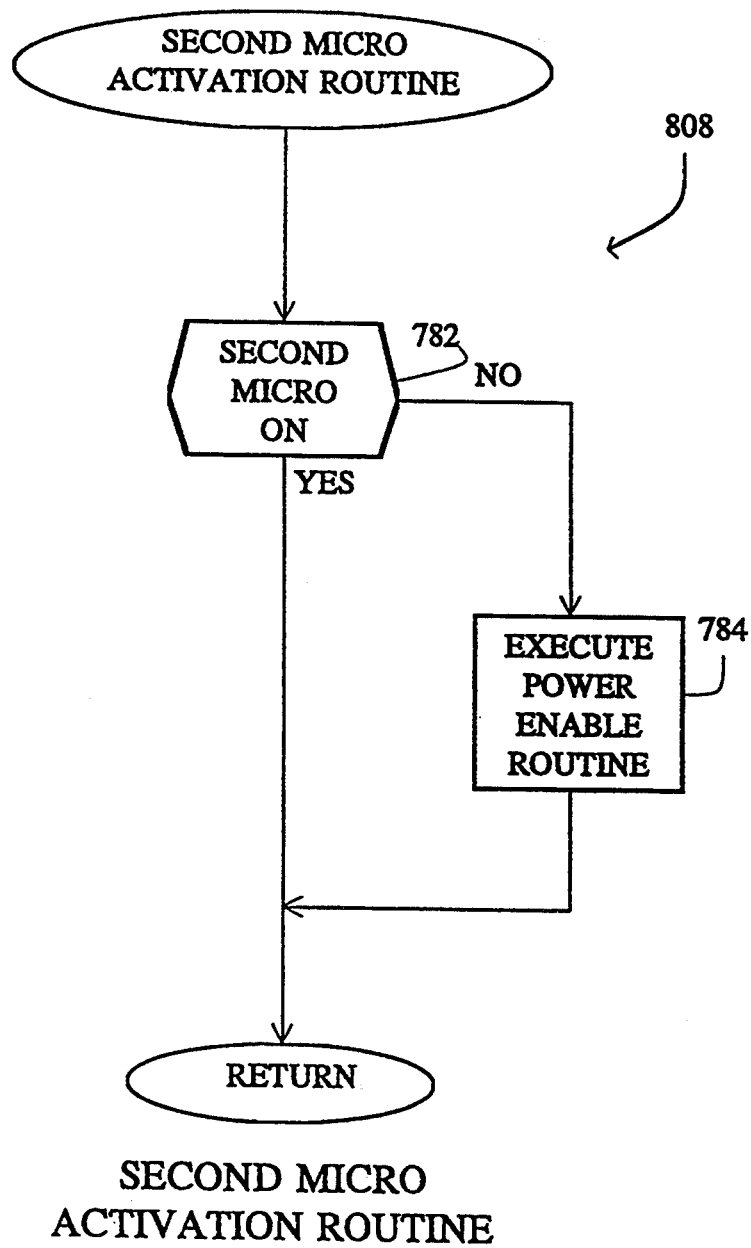
FIG. 28 is a flow diagram of a second microcontroller activation routine executed by the subcontroller.

Referring now to FIGS. 20 and 28, upon entry of the second microcontroller activation routine 808, the state of the first output 638 is determined 782 to ascertain whether or not the second microcontroller 658 is on or off. If the second microcontroller is off, a power enable subroutine 784 is called which sets the first output 638 active and controls the reset handshaking line thereby turning on the second microcontroller. Referring back to FIG. 22, the main program then enters the upload routine 780 which communicates the bits in the bit storage registers to the second microcontroller.

upload routine 810

Figure 29:
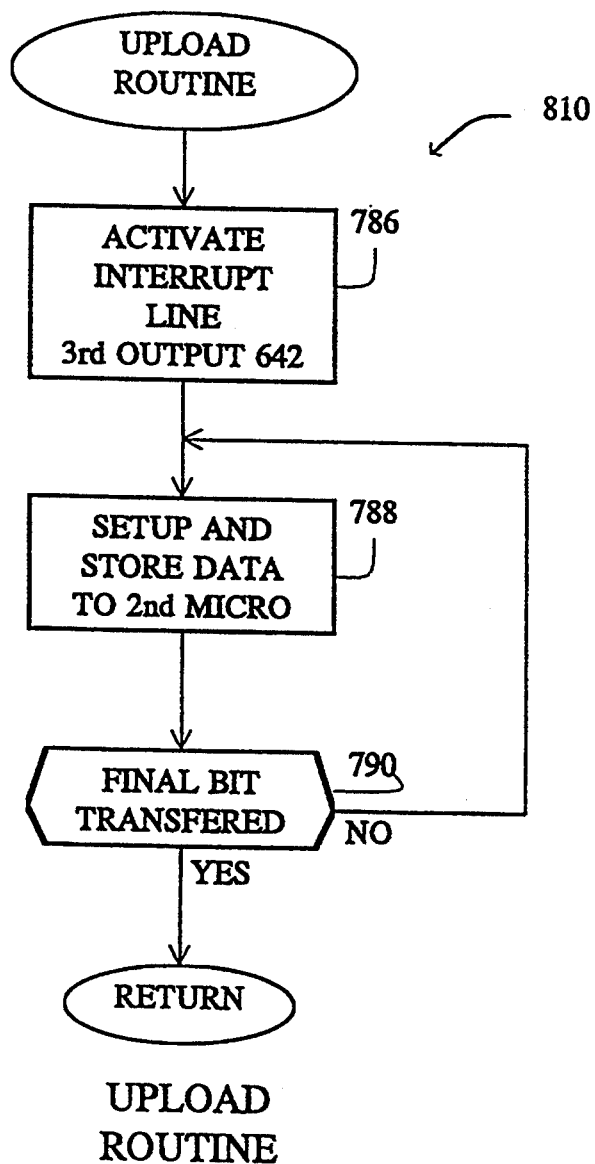
FIG. 29 is a flow diagram of an upload routine executed by the subcontroller.

Referring to FIG. 29, the upload routine is illustrated generally at 810. In the upload routine, the subcontroller 632 activates 786 the third output 642 to interrupt the second microcontroller 658 whereupon the second microcontroller is rendered ready to receive data.

After activating the third output, the subcontroller 636 uses the clock handshaking line 643 and the data line 640 to provide data 788, consisting of the bits in the bit storage registers of FIG. 27, to the second microcontroller. The clock handshaking line acts as a strobe to indicate to the second microcontroller the occurrence of valid data on the data line.

The upload routine monitors the locations of bits in the storage register as they are transferred to the second microcontroller to determine when the final bit has been transferred as indicated at 790. If the final bit has not been transferred, the routine continues back at step 788 to provide the next bit to the second microcontroller. If the renal bit has been transferred, the upload routine is considered to be completed and the subcontroller returns to running the monitoring algorithm as indicated at 792.

Referring back to FIG. 22, upon completion of the upload routine, the second microcontroller has three sixteen bit registers, similar to those depicted in FIG. 27, which contain respective copies of the contents of the registers 774, 776, and 778 of the subcontroller as depicted in FIG. 27. Also upon completion of the upload routine, the subcontroller monitoring program returns to the beginning of the monitoring program and resumes by repeating steps 802–810 of FIG. 22.

keyboard/display unit

Figure 30:
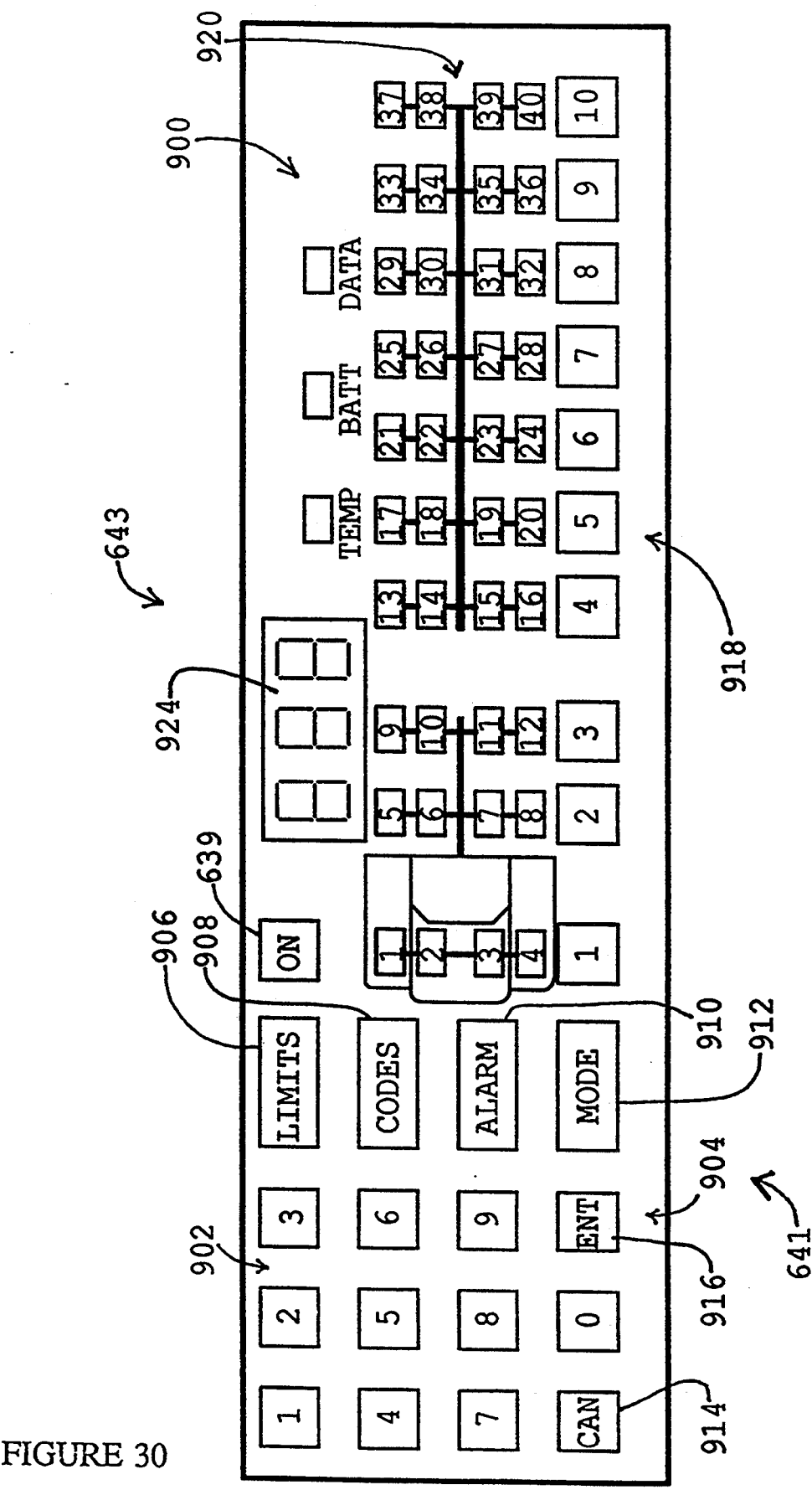
FIG. 30 is a plan view of a keyboard display unit according to a first embodiment of the invention.

Referring to FIG. 30, the keyboard/display is shown in greater detail generally at 643 and includes the keyboard portion 641 and a display portion shown generally at 900. The keyboard portion 641 includes ten numeric keys shown generally at 902, for entering numeric values into the second microcontroller and includes a plurality of control keys shown generally at 904 for selecting functions of the second microcontroller. The control keys include a limit key 906, a code key 908, an alarm key 910, a mode key 912, a cancel key 914, an enter key 916 and ten axle keys shown generally at 918, each axle key being designated with a number from 1 to 10. The keyboard portion also includes the independent on/off switch 639 previously described. All keys of the keyboard portion are arranged in a row/column matrix form and thus function similar to a conventional row/column matrix keyboard.

The display portion 900 includes a plurality of LEDs shown generally at 920, the LEDs being arranged in a two-dimensional array to represent 40 tire positions, arranged into 10 display axles with 4 tires each, the tire positions being numbered from one to forty. The display portion also includes three status LEDs shown generally at 922 and a three digit 7-segment display 924. Each of the LEDs 920 and 922 are bi-colour LEDs and may be activated to produce red, green or orange light.

second microcontroller physical connections

Referring back to FIG. 20, the second microcontroller 658 is connected to the parallel port 654 by conventional address and data lines indicated generally at 794. The second microcontroller is also connected to external RAM 798 and ROM 800, the external ROM containing a receiver program including a plurality of constants for use in calculations and the external RAM containing program defined values and tables for use by the receiver program. In the embodiment shown, the RAM 798 is battery backed-up to retain program defined values and tables in the event of a power failure.

The second microcontroller also has a built-in serial communications interface 802 which has transmit and receive output pins shown generally at 804 which are connected to an external communications interface 806 for conventional RS-232-C serial communications. It will be appreciated that the communications interface 806 may be used to communicate parameters received by the second microcontroller to an external device such as a portable computer, or the like.

The second microcontroller is also connected to a keyboard/display interface 796 which in turn is connected to the keyboard/display unit 643. The main controller actuates the address and data lines 794 to control the interface 796 to permit keys pressed on the keyboard to be recognized by the second microcontroller and to cause data to be represented on the display portion 900 of the keyboard/display unit 643.

receiver program

The receiver program includes a power-up routine, a main loop routine and an data transfer routine.

power-up routine

Referring to FIG. 23, as previously described, the second microcontroller is enabled, that is, is receiving power when either the key switch is on or the on/off key on the keyboard has been pressed. When the key switch is on the second microcontroller is on until the key is shut off. When the on/off key is pressed, the second microcontroller is on for 5 minutes. Upon turning the second microcontroller on, the second microcontroller initializes variables and jumps into the main loop 88 of FIG. 31. Program flow in the main loop is interrupted when the second microcontroller receives an interrupt on the interrupt input 656 of FIG. 20 at which time program flow jumps to the data transfer routine beginning at 970 in FIG. 37.

main loop

Figure 31:
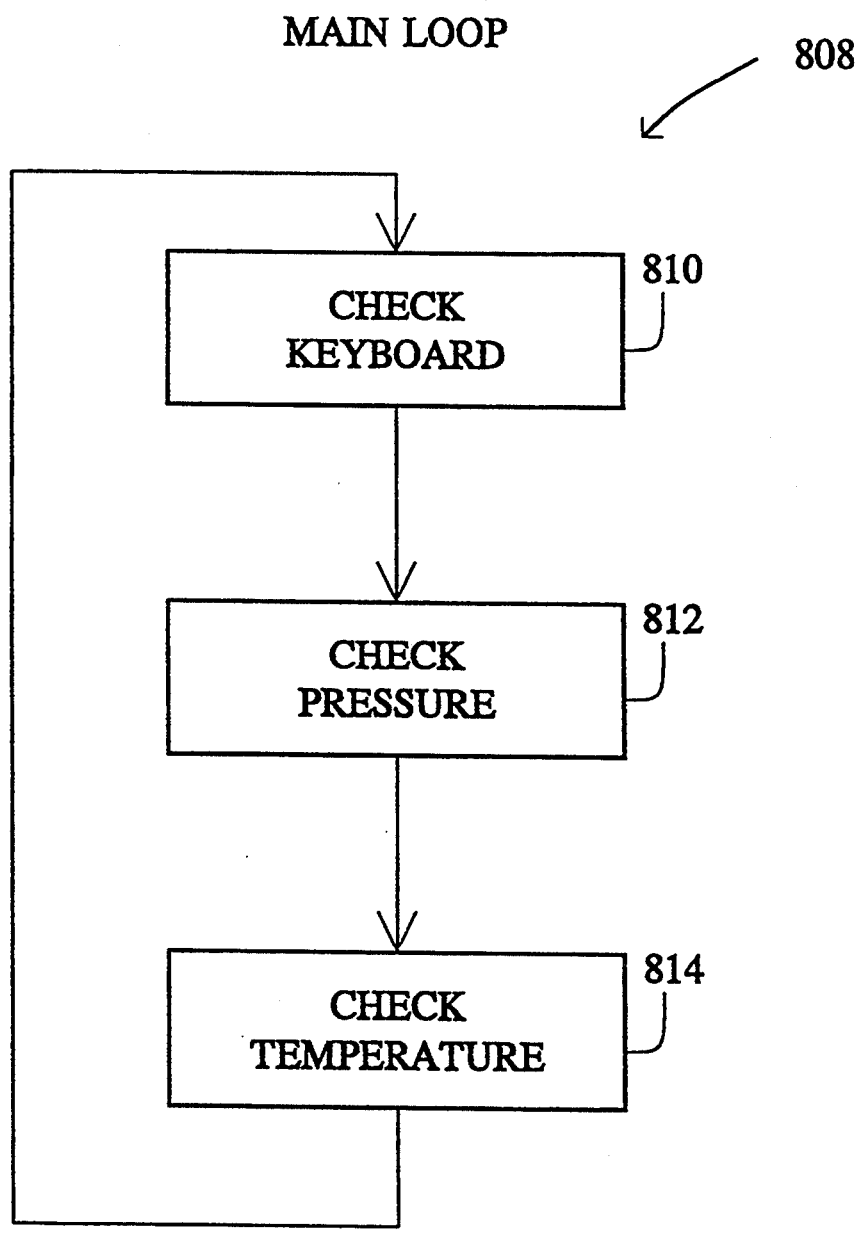
FIG. 31 is a flow diagram of a main loop of a receiver program executed by a second microcontroller.

Referring to FIG. 31, the main loop of the receiver program is shown generally at 808. The main loop includes a keyboard checking routine 810, a pressure checking routine 812 and a temperature checking routine 814.

tables

Figure 32:
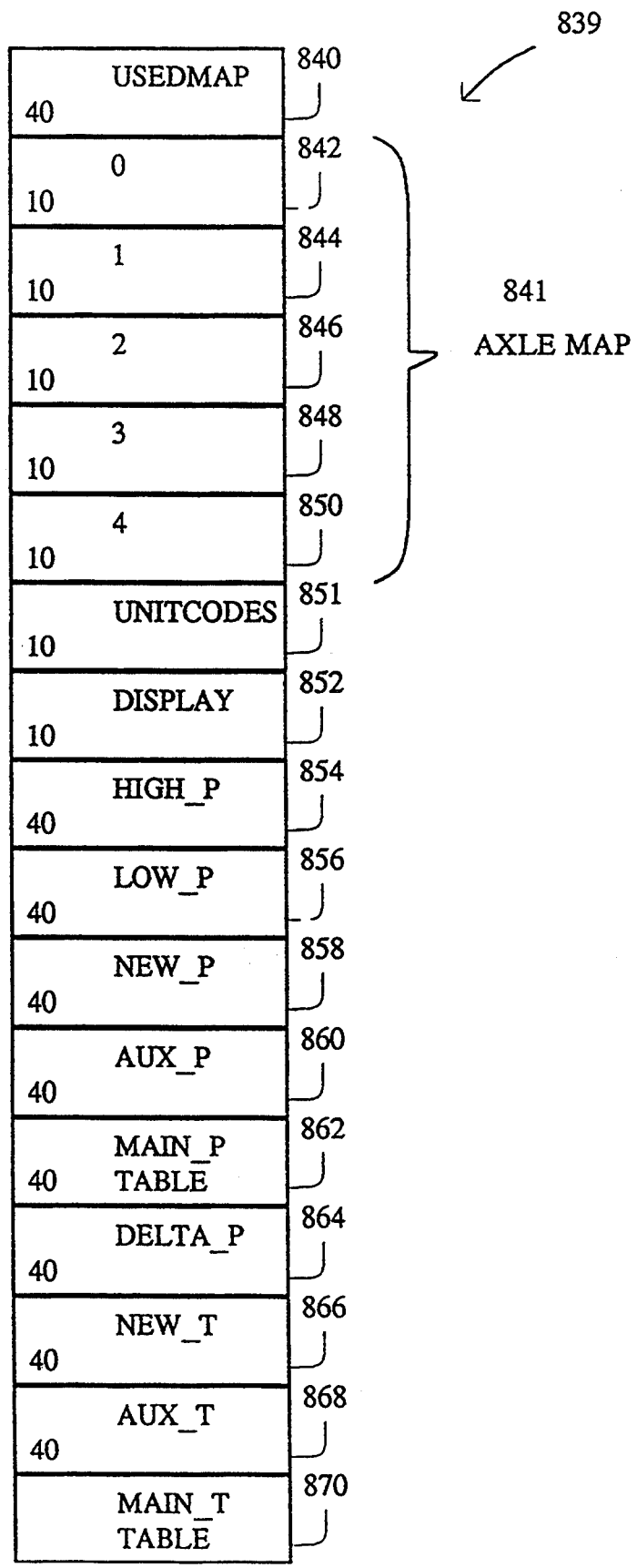
FIG. 32 is a memory map of tables of registers used by the receiver program.

Each of the above routines cooperates with predefined tables defined in the RAM. Referring to FIG. 32, the tables are shown generally at 839 and include a USEDMAP table 840, an AXLEMAP table shown generally at 841, a unit codes table 851, a DISPLAY table 852 a HIGH_P table 854, a LOW_P table 856 a NEW_P table 858, an AUX_P table 860, a MAIN_P table 862, a DELTA_P table 864, a NEW_T table 866, an AUX_T table 868, and a MAIN_T table 870.

USEDMAP table

The USEDMAP table consists of ten consecutive memory locations. There is a one-to-one correspondence between memory locations and the axles on the display, that is, axle 1 corresponds to memory location 1, axle 2 corresponds to memory location 2 and so on. The content of each memory location is used to indicate the number of wheels on the corresponding axle. An axle may have 0, 2, or 4 wheels and therefore, each memory location contains the number 0, 2, or 4.

AXLEMAP table

The AXLEMAP table consists of five sub-tables identified as sub-tables 0-4, the sub-tables being designated with numerical references 844-850 respectively. Each sub-table has ten memory locations which are used to contain information relating to axles on a corresponding tractor or trailer unit. The ten memory locations of any given sub-table correspond to the possible axle positions on a unit and the content of each memory location corresponds to the axle on the display which corresponds to the axle on the unit.

DISPLAY table

The DISPLAY table has ten locations, similar to the USEDMAP table. In the codes and limits routines to be described below, user entered data is initially stored in the display table before being transferred into the USEDMAP table.

HIGH_P, LOW_P tables

The HIGH_P and LOW_P tables 854 and 856 each have forty locations. Each location is used to contain a high or low pressure limit value for a corresponding tire of the display. Thus, for example, tire number 1 has a low pressure limit given by the contents of the first location in the LOW_P table and has a high pressure limit given by the first location of the HIGH_P table. Similarly, tire number 40 has a low pressure limit given by the fortieth location of the LOW_P table and has a high pressure limit given by the fortieth location of the HIGH_P table.

NEW_P, AUX_P, MAIN_P and DELTA_P

The NEW_P, AUX_P, MAIN_P and DELTA_P tables 858-864 each have forty locations, with each location corresponding to a respective tire on the display. The NEW_P and AUX_P tables are tables to which a pressure byte from the second presstemp register is copied upon receipt of incoming data from the subcontroller. Whether the NEW_P table or the AUX_P table receives the byte from the presstemp register is determined by the data transfer routine to be described below.

The MAIN_P table 862 also has forty locations. The contents of each location are obtained by copying the contents of either the NEW_P or AUX_P tables, as determined by the pressure checking routine to be described below.

The DELTA_P 864 table has forty locations, each location containing a sum and count value for determining an average pressure from the pressures received from each tire unit. Each location of the DELTA_P table corresponds to a tire on the display.

NEW_T, AUX_T and MAIN_T tables

The NEW_T, AUX_T, and MAIN_T tables 866-870 each have forty locations, with each location corresponding to a respective tire on the display. The NEW_T and AUX_T tables are tables to which a temperature byte from the second presstemp register is copied upon receipt of incoming data from the subcontroller. Whether the NEW_T table or the AUX_T table receives the byte from the presstemp register is determined by the data transfer routine to be described below.

The MAIN_T table 870 also has forty locations. The contents of each location are obtained by copying the contents of either the NEW_T or AUX_T tables, as determined by the temperature checking routine to be described below.

keyboard checking

Figure 33:
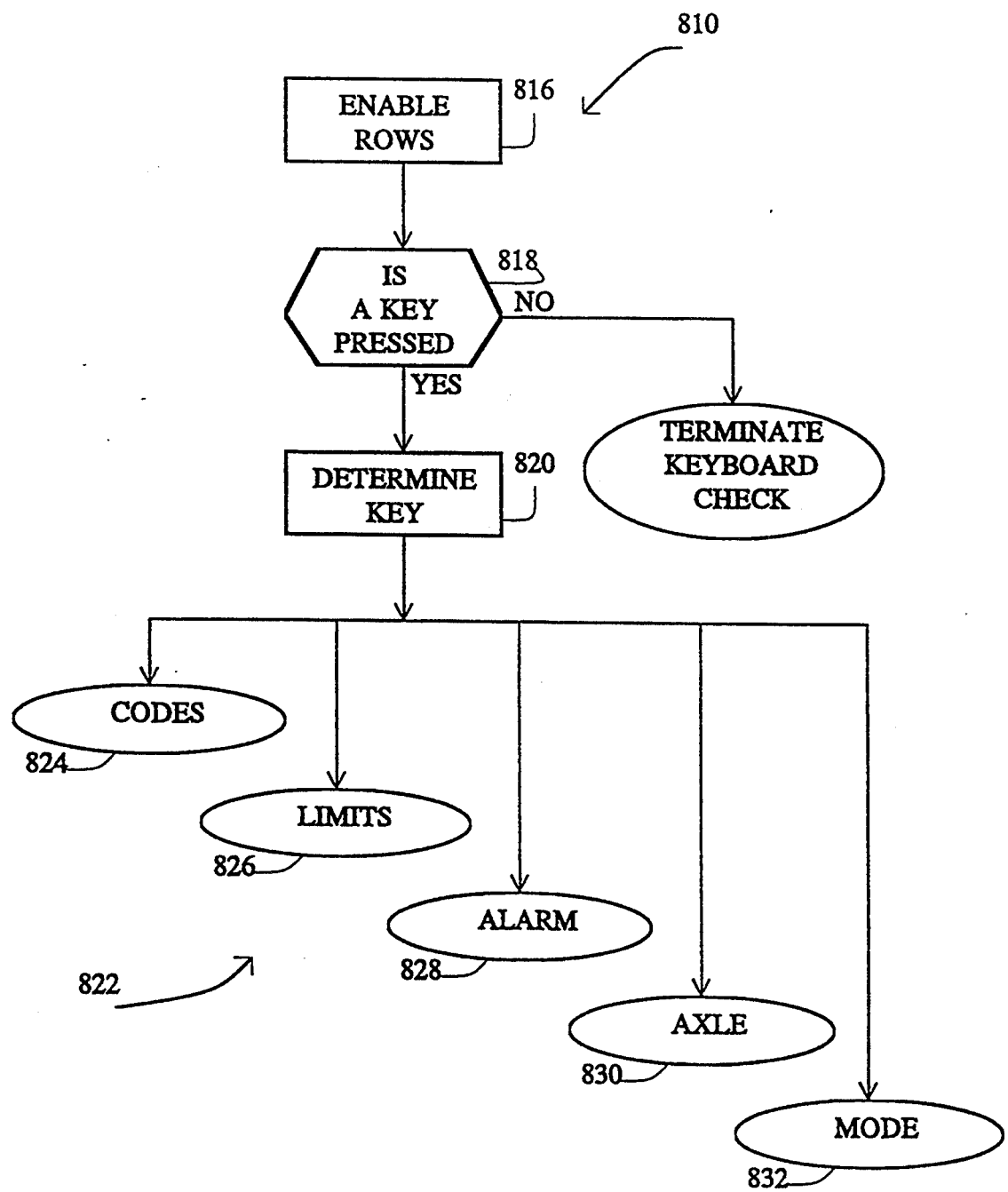
FIG. 33 is a flow diagram of a keyboard checking routine executed by the second microcontroller.

Referring to FIG. 33, the keyboard checking routine is shown generally at 810. The routine begins by enabling 816 power to all of the rows of the keyboard. The columns are then scanned 818 to ascertain whether or not any key has been pressed. If no key has been pressed, the keyboard checking routine is aborted and the program continues execution with the pressure checking routine 812 in the main loop of FIG. 31. If a key has been pressed however, the keyboard checking routine-ascertains the row and column of the key and determines a unique code representing the key, by consulting a look-up table which associates row/column information with unique codes. This is indicated at the determine key step illustrated at step 820 in FIG. 33.

Upon determining the unique code for the key pressed, the keyboard checking routine branches to one of a plurality of sub-routines shown generally at 822. The plurality of sub-routines includes a codes routine 824, a limits routine 826, an alarm routine 828, an axle routine 830 and a mode routine 832. Steps performed in each of the above sub-routines are described below.

codes sub-routine

The codes sub-routine 824 is invoked by the user pressing the codes key 908 of FIG. 30. The routine permits the user to select axles on the display to correspond to axles on a particular unit and to enter the ID code of that unit.

Figure 34:
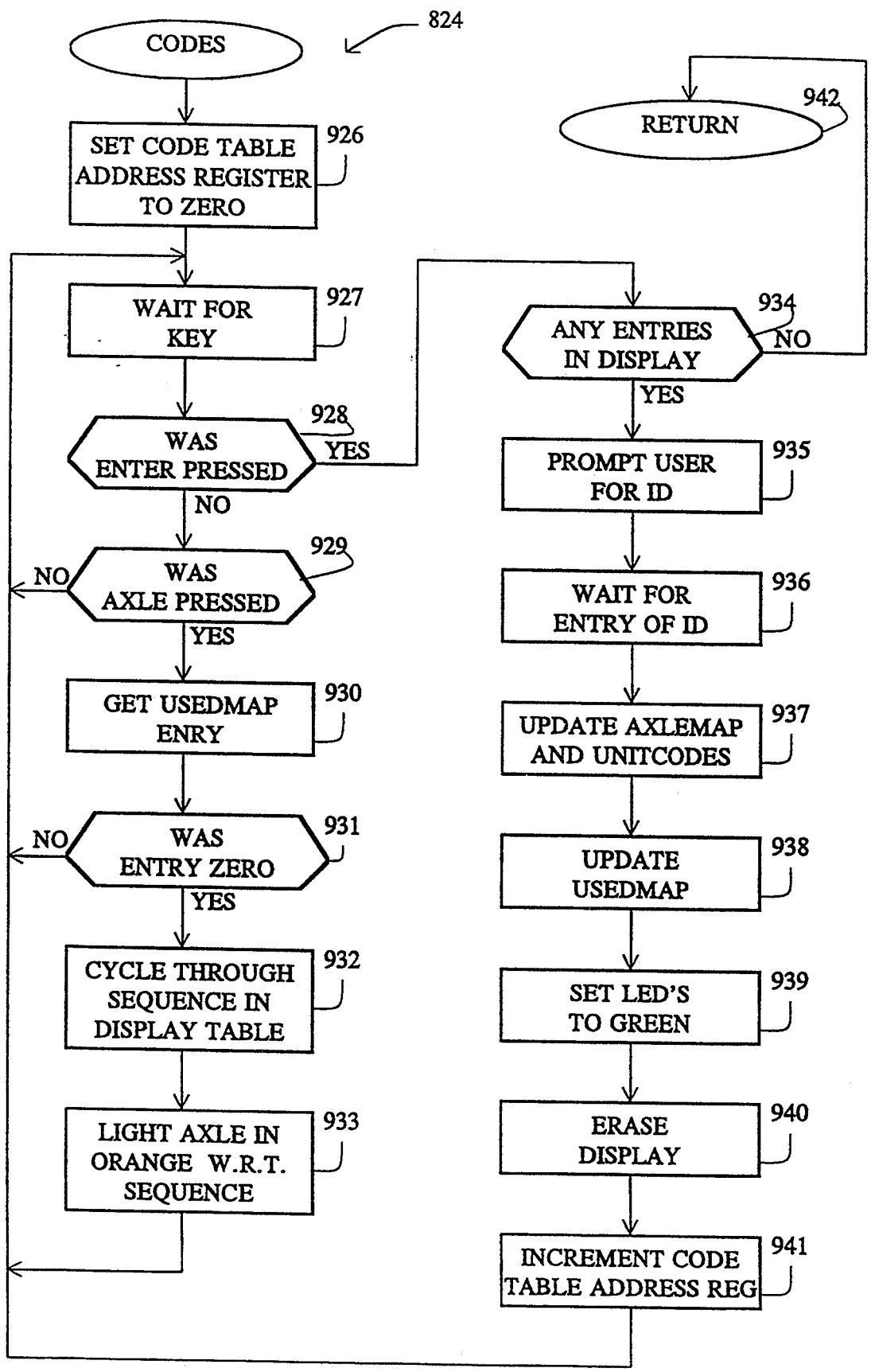
FIG. 34 is a flow diagram of a codes routine executed by the second microcontroller.

Referring to FIG. 34, the codes routine is shown generally at 824. The routine begins by initializing a unit code table address register to zero. The routine then waits 927 for the user to press an axle key 918 or the enter key 916 of FIG. 30.

Pressing an axle key causes program flow to continue with step 928 wherein it is determined whether or not the enter key was pressed. In this example, assume the axle key was pressed and therefore program flow continues with step 929 wherein a verification is made that in fact, an axle key had been pressed. If an axle key had not been pressed, program flow continues at step 927 and waits for the next key press. If the axle key was pressed as in this example, program flow continues with step 930 wherein the USEDMAP location corresponding to the selected axle is read. A test 931 is made on the contents of the USEDMAP location. If the contents of the location in the USEDMAP table are not equal to zero, it is assumed that the axle is already used by another unit. In this case, program flow continues at step 927 wherein a further key press is awaited. If the USEDMAP location is zero, the number four is loaded into the corresponding location in the display table as indicated at 932. Subsequently, the wheels on the selected axle are lighted in orange in accordance with the contents with the display table location as indicated at 933.

Program flow then continues with step 927 further waiting for the next key press. If the key press is again the same axle key, program flow continues as described above until step 932 is encountered, at which time the display table contents are changed to 2. Then, step 933 lights the two outside LEDs on the display axle in orange to indicate that the two outside wheels on the physical axle have been selected. Program flow then continues with step 927 wherein further key presses are awaited. If the next key press is again the same axle key, program flow continues as above until step 932 is encountered at which time the corresponding location in the display table is loaded with the value 0. Step 933 then turns off all four LEDs on the display axle and program flow continues at step 27 waiting for another key press. From the above, it may be seen that continued pressing on an axle key while in the codes subroutine cycles the contents of the display table location corresponding to the selected axle through the sequence 4-2-0 with the LEDs corresponding to the wheels on the physical axle being lighted accordingly.

Still referring to FIG. 34, upon pressing the axle key as above, the display table location corresponding to the selected axle contains a number representing the number of wheels on the axle. When the axle key has been pressed the desired number of times to select the actual number of wheels on the axle, the enter key is pressed which directs program flow to step 934 which reads the contents of the corresponding display table location. If the contents are zero, the routine returns to 942 to the main loop 808 of FIG. 31. If the display table location contents are not zero, the user is prompted for entry of a unit ID number as indicated at step 935. The program then waits for entry of the ID number as indicated at step 936. Upon entry of the ID number, the ID number is used to point to the starting address of the AXLEMAP sub-table corresponding to the unit. If, for example, three different axles have been entered with the same ID number, the first three locations of the AXLEMAP table corresponding to that ID number are loaded with the axle numbers corresponding to the axle keys pressed. Any unused locations in the selected AXLEMAP table are loaded with the value −1. After loading the relevant AXLEMAP table, the USEDMAP table 840 of FIG. 32 is loaded with the contents of the display table.

Referring back to FIG. 34, upon loading the AXLEMAP and USEDMAP tables, the codes routine sets the LED's on the display corresponding to the wheels selected on each of the selected axles to be lighted in green. This is indicated at step 939. Next, the display table is erased as indicated at 940 and subsequently, the unit code table address register contents are incremented as indicated at 941. It will be appreciated that the unit codes table 851 of FIG. 32 implements a unit to ID mapping table which associates unit number, such as 1, 2, 3, etc. with the unit ID numbers associated with the tire units. Thus, upon entry of the codes routine, it was stated that the unit number is set to zero as indicated at 926. When the user enters an ID number in step 936, this ID number is loaded into the mapping table to associate the ID number with unit zero. Upon execution of step 941, the unit number is incremented, in which case the user would be prompted again for another ID number with such ID number being associated with unit number one and so on.

The codes routine illustrated in FIG. 34 is continually executed until the enter key is pressed without having first pressed an axle key. In this case, program flow continues through steps 927, 928, 934 and 942 whereupon the codes routine is exited and other portions of the keyboard checking routine are executed.

Figure 35:
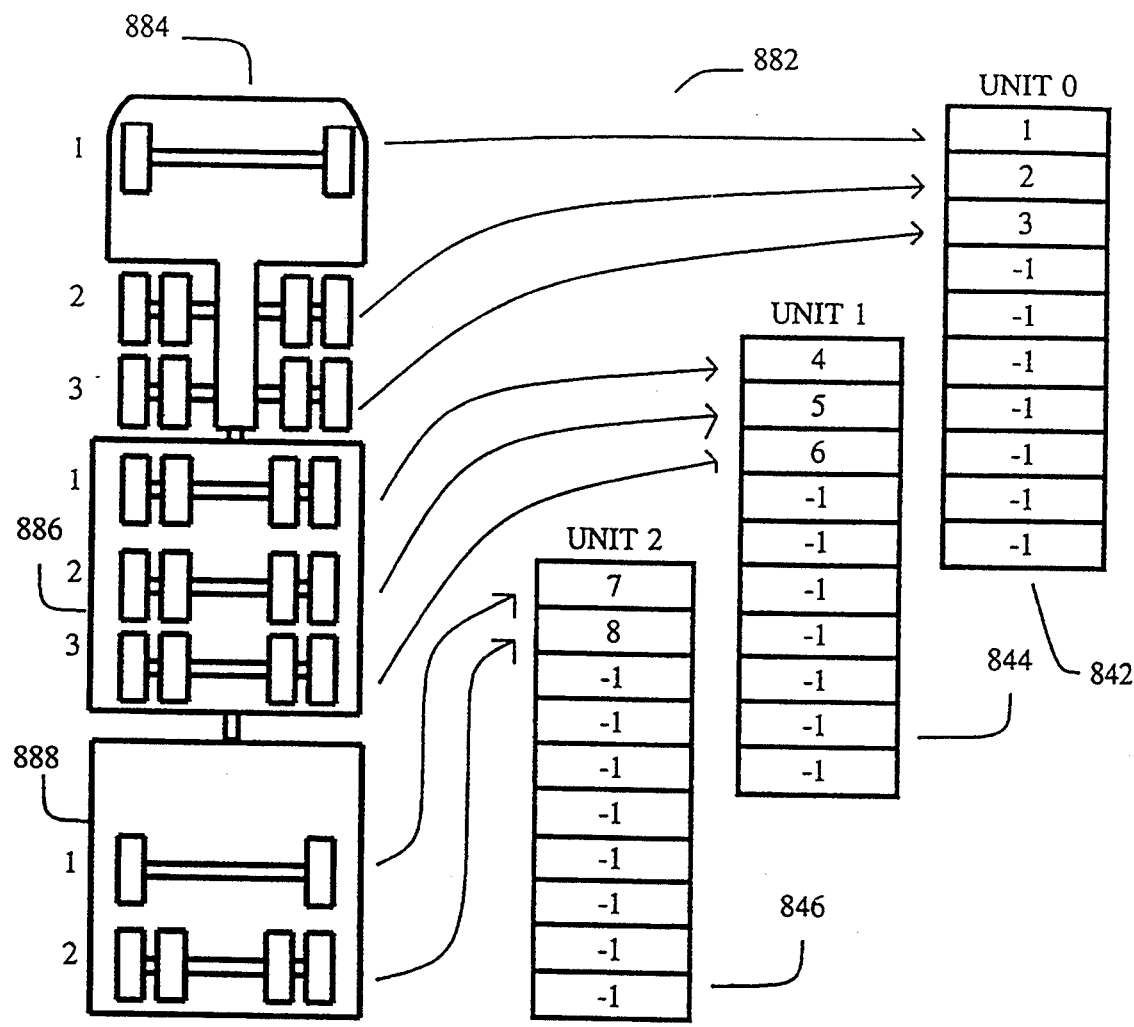
FIG. 35 is a pictorial representation of mapping physical vehicle and trailer axles to numeric representations in an AXLEMAP subtable and a USEDMAP table according to the first embodiment of the invention.

The loading of the AXLEMAP and USEDMAP tables may be easier understood by referring to FIG. 35, wherein the mining truck is illustrated generally at 84, a first trailer connected to the mining truck is illustrated at 886 and a second trailer connected to the first trailer 886 is shown generally at 888. It may be seen that the mining truck 884 has three axles labeled 1, 2 and 3. The first trailer also has three axles labelled 1, 2 and 3, and the second trailer has two axles labelled 1 and 2. The first axle of the mining truck has two wheels while the second and third axles have four wheels each. All three axles on the first trailer have four wheels and the first axle of the second trailer has two wheels while the second axle of the second trailer has four wheels.

Following the codes routine described in FIG. 34, the mining truck 884 is associated with the unit zero AXLEMAP sub table 842, the first trailer is associated with the unit one AXLEMAP sub table 844 and the second trailer is associated with the unit two AXLEMAP sub table 846. If the first axle on the mining truck is to be represented by the first axle on the display, the unit zero AXLEMAP table 842 has a first location loaded with a 1, the 1 representing the axle on the display. The second axle of the mining truck would be represented by the second axle on the display and therefore the unit zero AXLEMAP sub table 842 would have a second location loaded with a 2. Similarly, the third location would be loaded with a 3. The remaining locations four through ten would be loaded with −1 to indicate that there are no other axles on the unit. In a similar manner, the first axle on the first trailer 886 is represented by axle number 4 on the display and therefore a 4 is entered into the first location of the unit one sub table 844. The second axle of the first trailer is represented by axle 5 on the display and therefore the second location of the unit one sub table 844 is loaded with a 5. Similarly, a 6 is loaded in the third location of the unit one sub table 844 to represent the third axle of the first trailer 886. The remaining locations of the unit one sub table 844 are loaded with the value −1.

The first axle of the second trailer 888 is represented by axle number 7 on the display and therefore the unit two sub table 846 has a first location containing the value 7. Similarly, the second axle on the second trailer 888 is represented by the eighth axle on the display and therefore the second location of the unit two sub table 846 contains the value 8. The remaining locations of the unit two sub table 846 are loaded with the value −1.

In accordance with the above example, the codes routine shown in FIG. 34 loads the USEDMAP table with the number of wheels to be represented on each display axle. Thus, the first location of the USEDMAP table 840 contains the value 2 to represent the two wheels on the first axle of the mining truck 884. The second and third locations both contain the value 4 to represent the four wheels on axles two and three of the mining truck 884. The fourth, fifth and sixth locations each contain the value 4 to represent the number of wheels on axles one, two and three of the first trailer 886. Similarly, locations seven and eight contain the values 2 and 4 respectively to represent the number of wheels on axles one and two of the second trailer 888. No other trailers are connected to the second trailer and therefore locations nine and ten of the USEDMAP table contain the value 0.

limits routine

Figure 36:
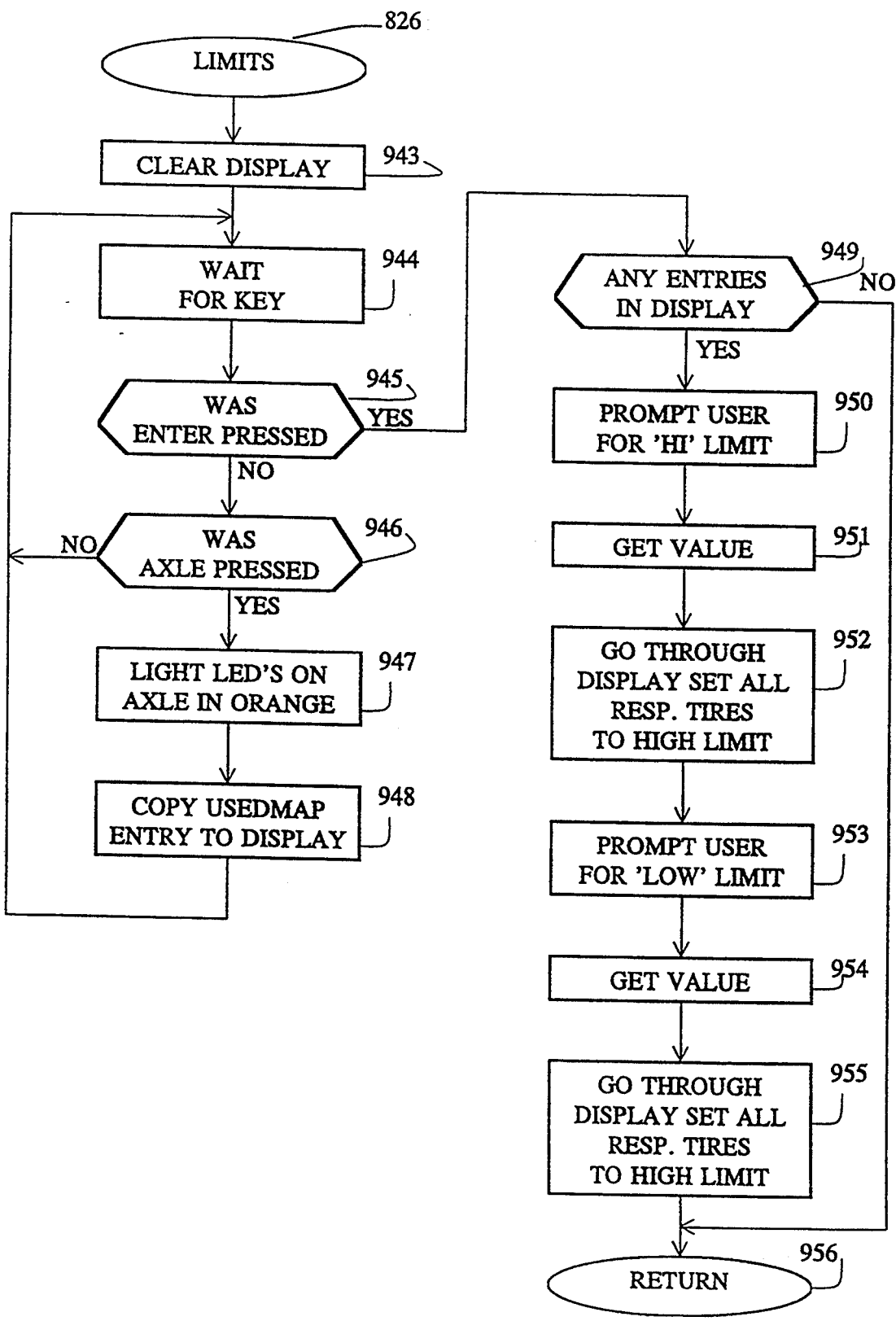
FIG. 36 is a limits routine executed by the second microcontroller.

Referring to FIG. 36, the limits routine is shown generally at 826. The routine is invoked by the user pressing the limits key 906 on the keyboard/display unit shown in FIG. 30. The routine loads high and low pressure limits into the HIGH_P and LOW_P tables 854 and 856 of FIG. 32 for later comparison to pressure values transmitted by the transmitters.

The routine begins by waiting 944 for the user to press an axle key to indicate an axle having wheels for which pressure limits are to be set or for the user to press the enter key.

If an axle key is pressed, step 945 causes program flow to proceed with step 946. Step 946 checks to verify that the key pressed is, in fact, an axle key. If the key pressed is not an axle key, program flow continues at step 944, waiting for a further key press.

If the axle key has, in fact, been pressed, program flow continues with step 947 which lights the tire LED's for the axle selected in orange. Program flow then continues with step 948 which copies the contents of the USEDMAP table location corresponding to the selected axle to the corresponding display table location. Program flow then continues with step 944 whereupon further key presses are awaited.

Assuming an axle key was pressed first, subsequent pressing of the enter key is recognized by step 45 which diverts program flow to step 949. Step 949 checks to see whether or not there are any entries in the display table. If there are entries, these entries would be the result of executing step 948 previously. If there are no entries in the display, the user has pressed the enter key without entering any axles and therefore the limits routine is aborted and program flow continues with other portions of the keyboard checking routine as indicated at 956.

Assuming there are valid entries in the display table location corresponding to the selected axle, step 949 directs program flow to step 950 which prompts the user for a high limit value. The user enters the high limit value using the numeric key pad 902 of FIG. 30, as indicated at step 951 in FIG. 36. At step 952, the limits routine multiplies the axle number by four to determine a base address of four contiguous locations in the HIGH_P table corresponding to the four LED's on the display axle associated with the axle. The high pressure value entered by the user is loaded into each of the four locations in the HIGH_P table. Thus, it may be seen that the high pressure limit is set on an axle basis.

In a similar manner, the user is prompted for a low pressure limit as indicated at 953. The user enters the low pressure limit using the numeric key pad as indicated at 954. Locations in the LOW_P table are located by multiplying the axle number by four to determine the base address of the four contiguous locations corresponding to the four LED's associated with the axle. The value entered by the user at step 954 is loaded into these four locations in the LOW_P table. Upon entry of the low limit, the limits routine 826 is completed and program flow continues with the keyboard checking routine as indicated at 956.

mode routine

The mode routine waits for the user to enter a numeric code representing a pre-determined function. In the embodiment described one pre-determined function dims the LEDs for use of the apparatus at night and a second predetermined function selects whether temperature or pressure readings are displayed when in the axle routine described below.

axle and alarm routines

A discussion of the axle and alarm routines is deferred until after the data receiving routine has been described to permit full appreciation of the interaction between these routines and the data received from the subcontroller.

data transfer sub-routine

Figure 37:
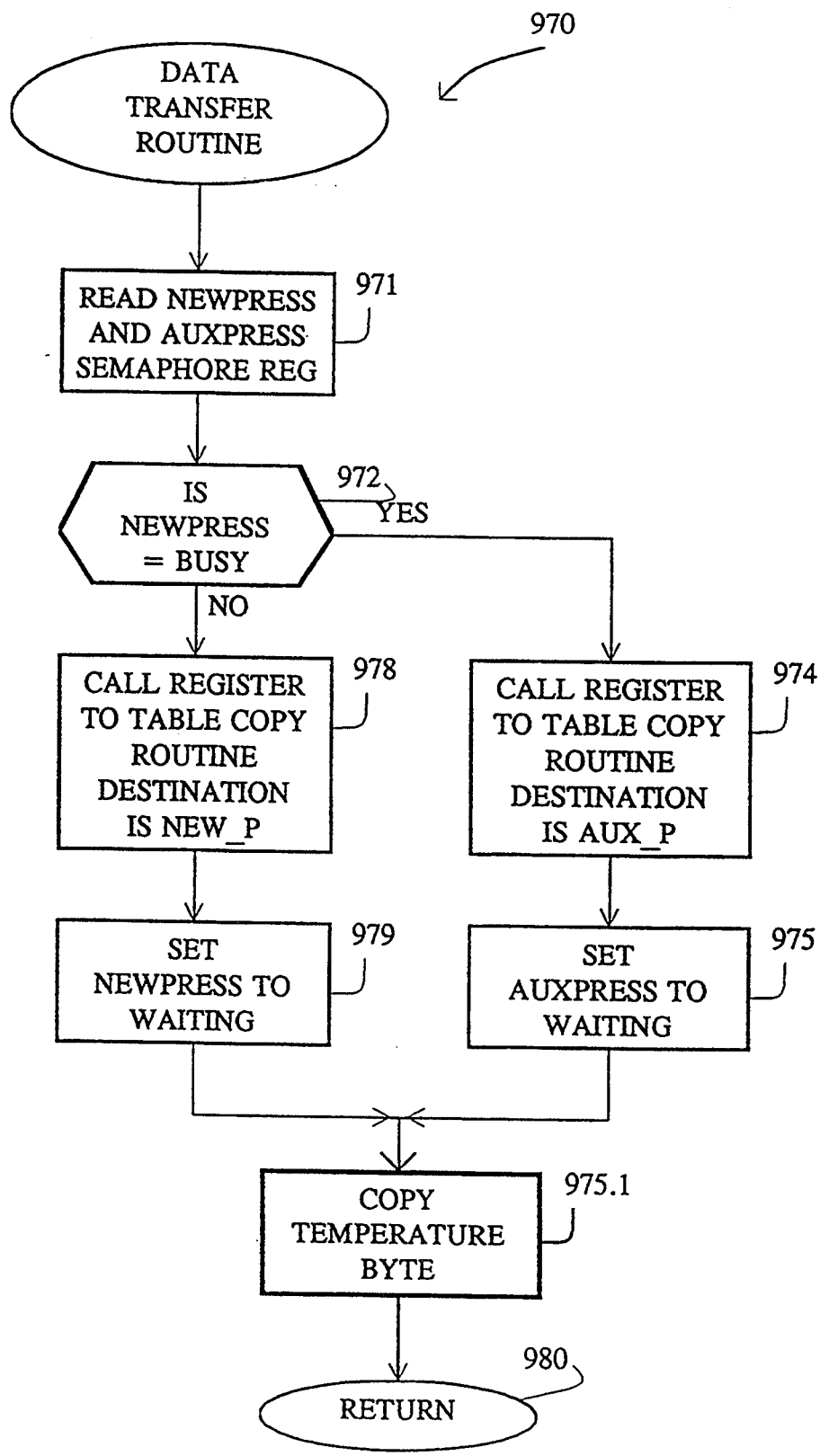
FIG. 37 is a flow diagram of a data transfer routine executed by the second microcontroller.

Referring to FIG. 37 the data transfer subroutine is shown generally at 970. The routine interacts with the NEW_P and AUX_P tables 858 and 860 of FIG. 32 and associated semaphore registers (not shown) identified as NEWPRESS and AUXPRESS designated 971.1 and 971.2 respectively. The NEWPRESS and AUXPRESS semaphore registers are loaded with status codes identified as NONEW, WAITING, and BUSY and having definitions as follows:

NONEW: indicates that no new data has been received in the associated table;

WAITING: indicates that the associated table has just received data and is ready to be copied; and BUSY: indicates that the associated table was being copied before being interrupted by the occurrence of the data transfer routine.

Referring to FIG. 37 the data transfer sub-routine begins by reading 971 the NEWPRESS and AUXPRESS semaphore registers 971.1 and 971.2. The status of the NEWPRESS semaphore register is then tested 972 to determine the status of the contents of the NEW_P table 858 of FIG. 32.

Referring to FIG. 37 if the status of the NEWPRESS semaphore register 971.1 is "BUSY" the sub-routine calls 974 a register-to-table copy routine in which the pressure byte of the second presstemp register 778 of FIG. 27 is copied into a location of the AUX_P table 860 of FIG. 32 and the AUXPRESS semaphore register 971.2 of FIG. 37 is loaded 975 with the WAITING status code.

Referring to FIG. 37 if the status of the NEWPRESS semaphore register 971.1 is not BUSY, the pressure byte of the second pressure register is copied into a location of the NEW_P table 858 of FIG. 32 as indicated at 978 in FIG. 37.

The NEWPRESS semaphore register 971.1 is then loaded 979 with the WAITING status code and the data transfer of pressure data is completed.

The data transfer routine then copies 975.1 the temperature byte of the second presstemp register of FIG. 27 into a location of the AUX_T or NEW_T table. Steps similar to those recited above are performed using NEWTEMP and AUXTEMP semaphore registers (not shown) to determine which table, AUX_T or NEW_T, is to receive the temperature byte. Processing then returns 980 to the location in the main loop of FIG. 31 where processing was interrupted upon entry of the data transfer routine.

register-to-table copy routine

Figure 38:
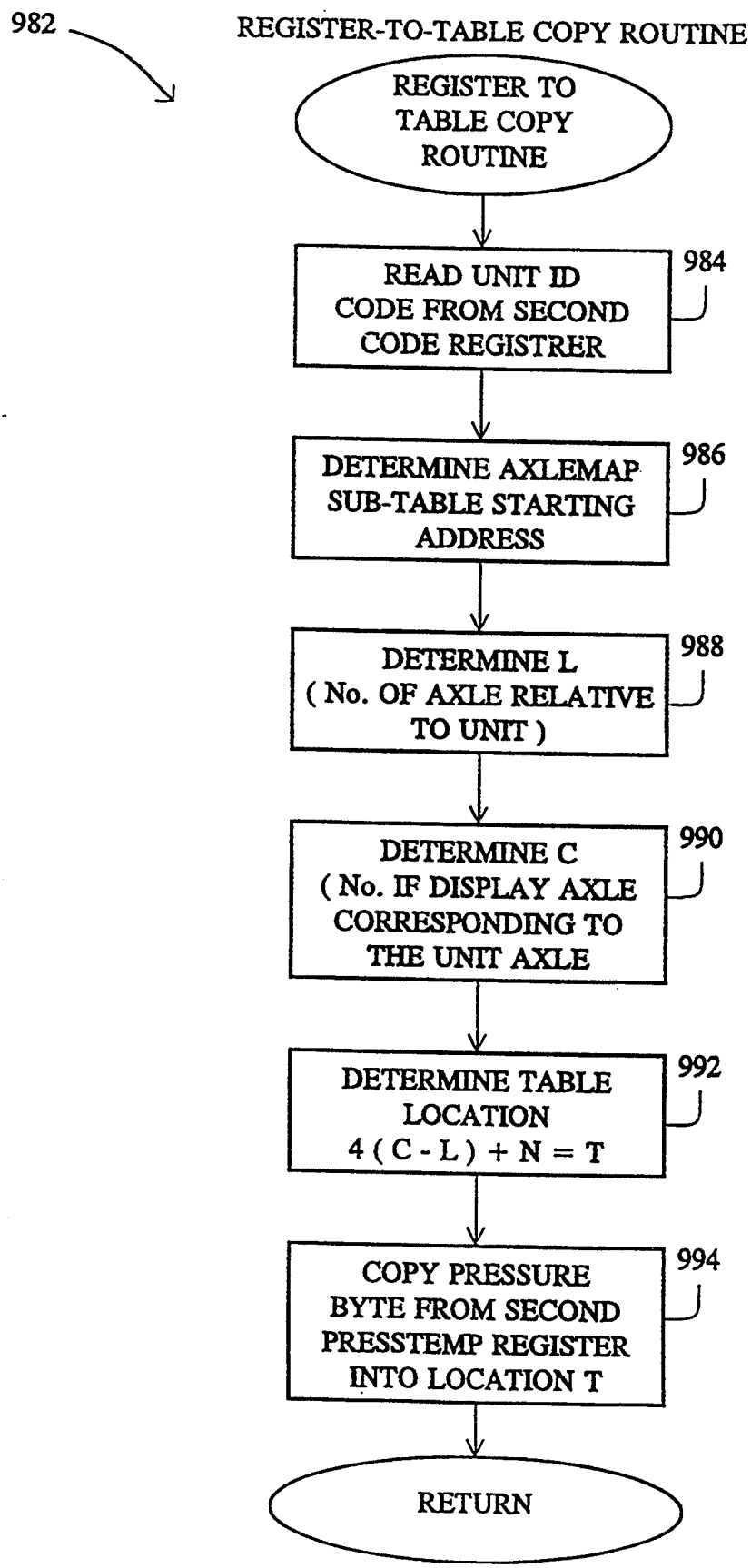
FIG. 38 is a flow diagram of a register-to-table copy routine executed by the second microcontroller.

The register-to-table copy routine executed by the data transfer sub-routine is shown generally at 982 in FIG. 38.

determination of NEW_P or AUX_P location

In the process of loading the NEW_P or AUX_P tables 858 and 860 of FIG. 32 the unit ID number and the tire number found in the second code register 776 of FIG. 27 are used to determine the location in the respective table in which the pressure or temperature value is to be stored.

Referring to FIG. 38 the register-to-table copy routine begins by reading 984 the unit ID code from the second code register.

The routine then determines 986 the starting address of the AXLEMAP sub-table corresponding to the ID code. For example, if the transmission was from a wheel of the tractor depicted in FIG. 35, the ID code would establish that AXLEMAP sub-table 0 (item 842 in FIG. 32) is the relevant sub-table and would determine its starting address.

The routine then determines 988 the number of the axle on the unit, on which the wheel, associated with the received transmission, is mounted. This is done by dividing by four, the tire number (N) contained in the second code register 776 of FIG. 27 to determine a number L representing the number of the axle on the unit on which the tire is located.

The routine then determines 990 the address of the location in the AXLEMAP table which contains the number of the axle on the display corresponding to the unit axle. This is done by adding the number of the axle on the unit (i.e. L) to the starting address of the AXLEMAP sub-table 842. The number of the display axle which will be referred to as the variable "C" is obtained by reading the calculated location of the AXLEMAP sub-table 842.

The location of the sub-table into which the pressure byte should be stored is then determined 992 by substituting the values L, C and N, into the following equation:

$$4(C-L)+N=T$$

where

L is a number 1, 2, 3 etc. corresponding to the axle number of the axle relative to the unit;

C is a number 1, 2, 3, etc. stored in location L of the AXLEMAP sub-table for the given unit, the number indicating the axle on the display which corresponds to the axle on the unit;

N is the tire number of the tire relative to the unit (N may be any number from 1–40);

T is the DISPLAY table location (1–40) corresponding to the tire identified by the unit number and tire number.

Having determined the location, the pressure byte from the second presstemp register is then copied 994 into the NEW_P or AUX_P table location specified by "T" and the register-to-table copy routine is completed.

pressure checking routine general

Figure 39:
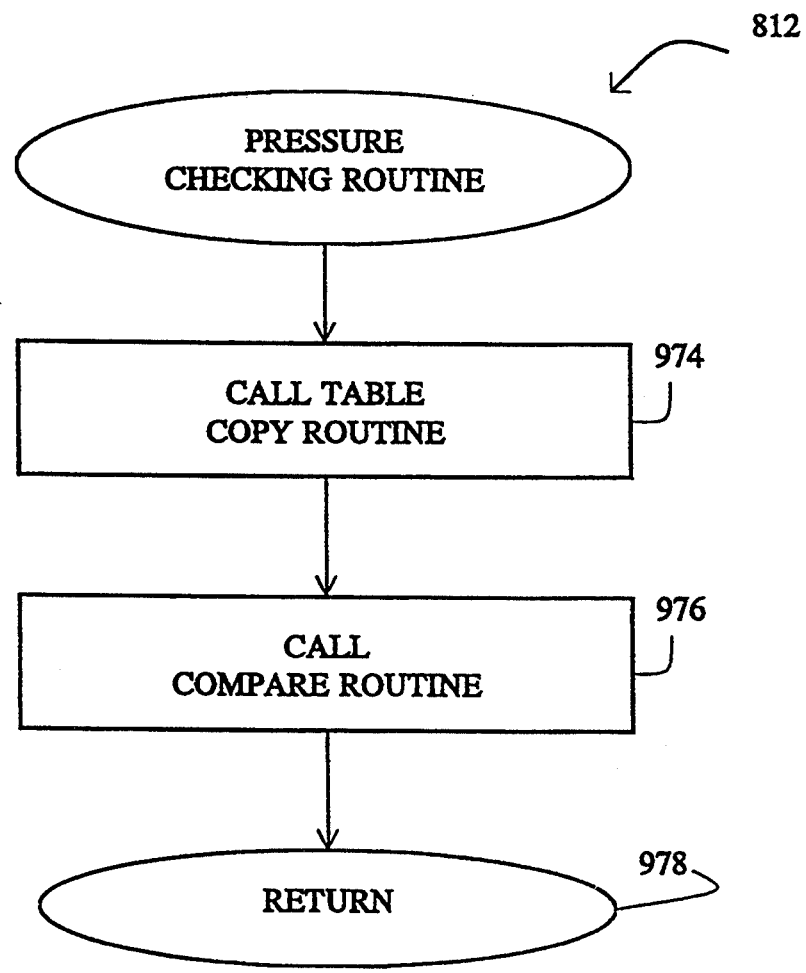
FIG. 39 is a flow diagram of a pressure checking routine executed by the second microcontroller.

Referring to FIG. 31, the pressure checking routine 812 is executed upon completion of the keyboard checking routine 810. Referring to FIG. 39, the pressure checking routine is shown generally at 812. The routine begins by executing a table copy routine 974 and then executing a comparing routine 976. Upon completion of the comparing routine, the pressure checking routine is completed and program flow continues with the temperature checking routine 814 of FIG. 31.

table copy routine

Figure 40:
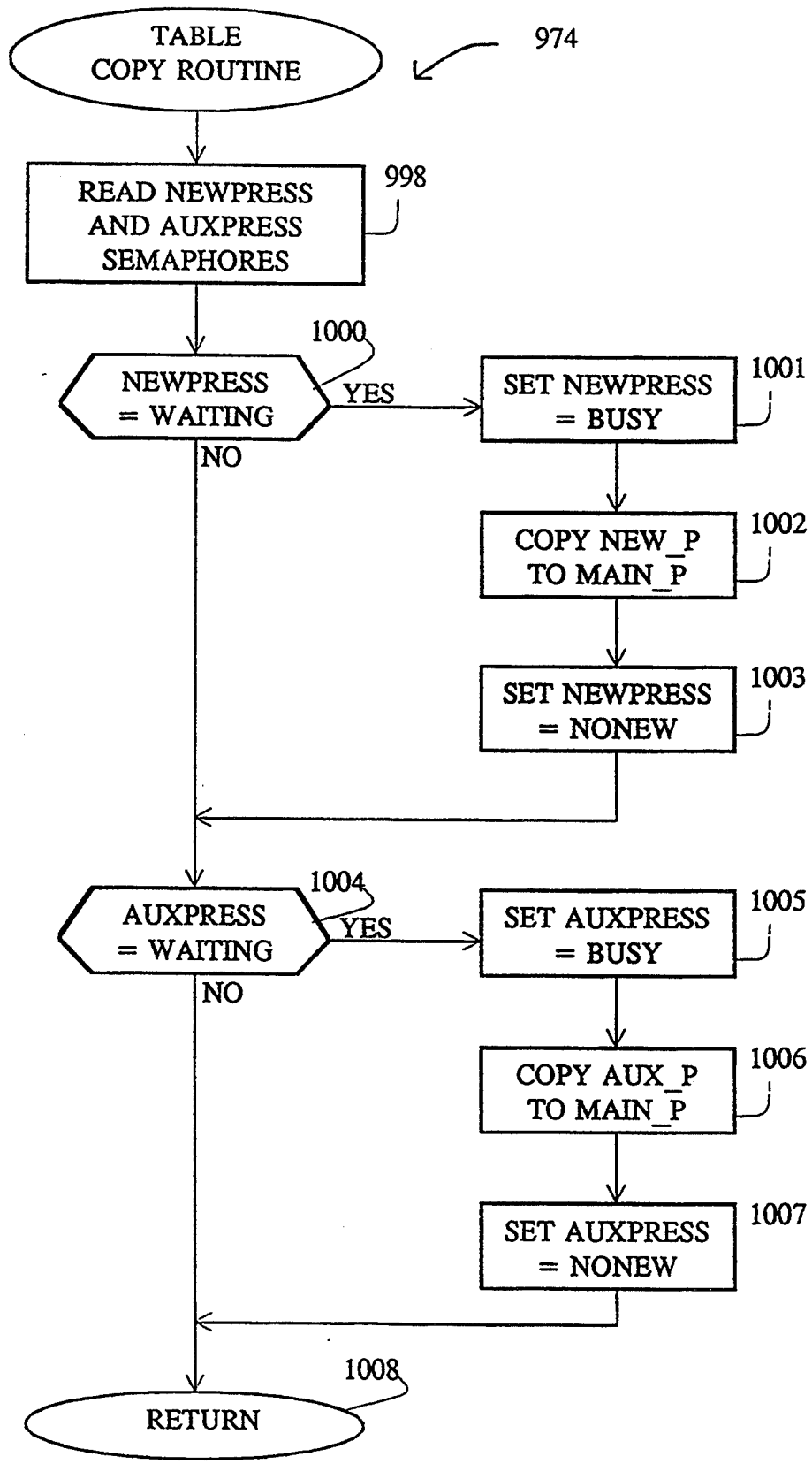
FIG. 40 is a table copy routine executed by the second microcontroller.

The table copy routine is shown generally at 974 in FIG. 40. The routine begins by reading 998 the NEWPRESS and AUXPRESS semaphore registers 971.1 and 971.2 of FIG. 37. A test is then made 1000 to determine whether or not the NEWPRESS register has WAITING status. If so, then the contents of the NEW_P table 858 of FIG. 32 are copied 1002 into corresponding locations of the MAIN_P table 862 of FIG. 32. After the copy is finished the NEWPRESS semaphore register 971.1 is set 1003 to NONEW. The AUXPRESS semaphore register 971.2 is then tested 1004 to determine whether or not the AUXPRESS register has WAITING status. If so, the AUXPRESS semaphore register is set 1005 to BUSY and the contents of the AUX_P table 860 of FIG. 32 are copied 1006 into corresponding locations of the MAIN_P table 862. Upon completion of the copy, the AUXPRESS semaphore register 971.2 is set 1007 to NONEW.

If neither the NEWPRESS or AUXPRESS registers 971.1 or 971.2 contain waiting status, the table copy routine is completed and processing returns 1008 to the pressure checking routine 812 of FIG. 39 and continues with the compare routine 976.

Upon completion of the table copy routine, the MAIN_P table 862 of FIG. 32 contains the latest pressure values for all tires and processing returns 1008 to the pressure checking routine 812 of FIG. 39, whereupon the compare routine 976 is executed.

compare routine 976

Figure 41A:
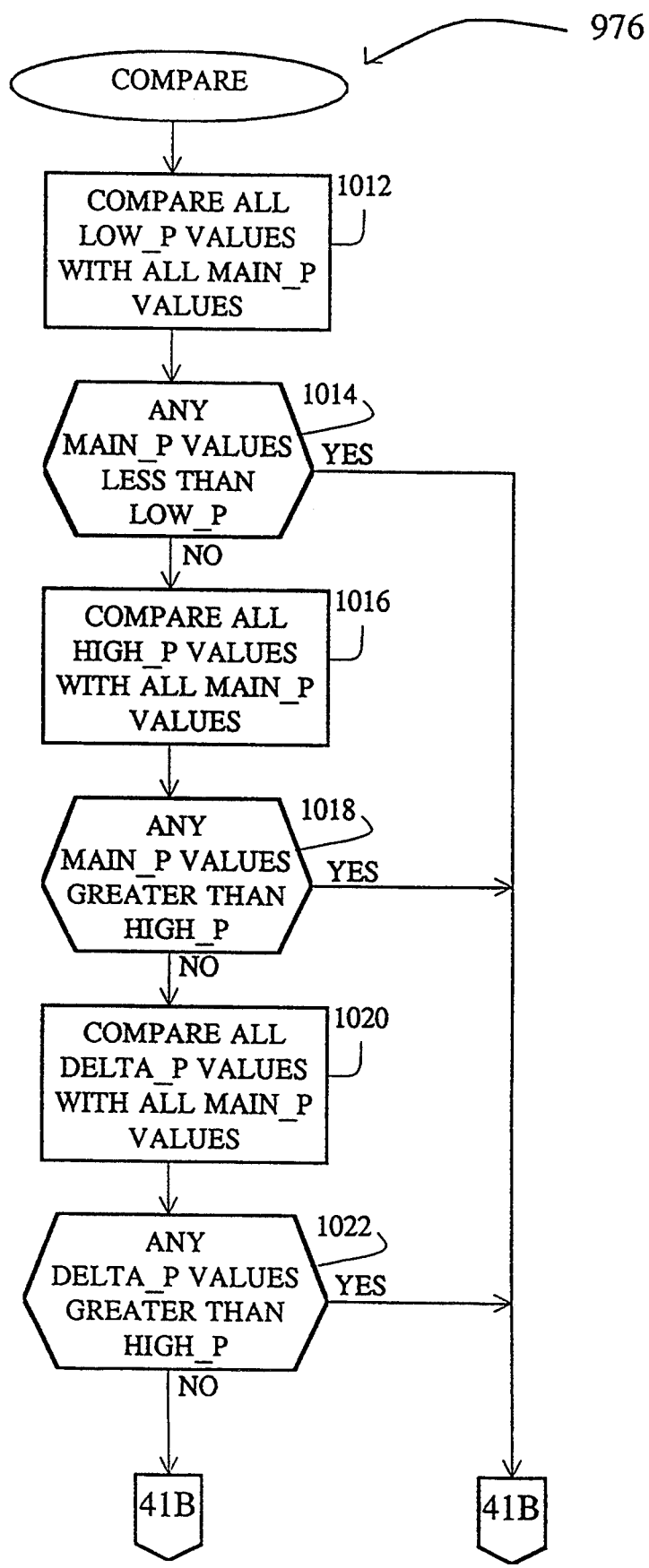
FIGS. 41A and 41B are first and second portions respectively of a flow diagram according to a comparing routine executed by the second microcontroller.
Figure 41B:
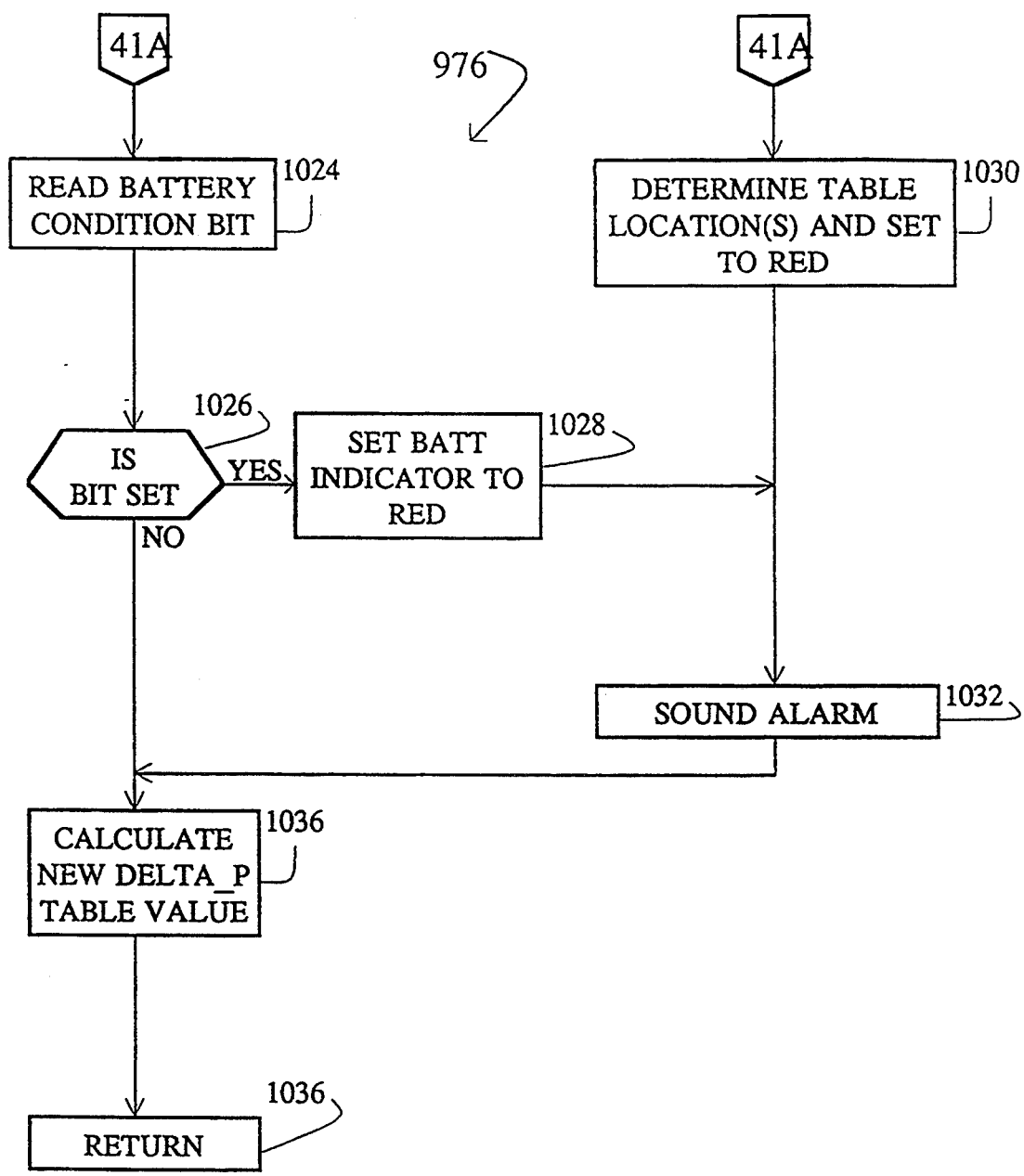

The compare routine is shown generally at 976 in FIGS. 41a and 41b. Referring to FIG. 41a, the compare routine begins by comparing 1012 all entries in the MAIN_P table 862 of FIG. 32 with corresponding entries in the LOW_P table 856.

A test 1014 is performed to determine whether or not any of the MAIN_P table entries is less than its corresponding entry in the LOW_P table.

If none of the MAIN_P table entries is lower than its corresponding LOW_P table entry, the routine then compares 1016 all entries of the MAIN_P table with corresponding entries of the HIGH_P table.

A test 1018 is then performed to determine whether or not any of the MAIN_P table entries is greater than its corresponding entry in the HIGH_P table 854.

If none of the MAIN_P table entries is greater than its corresponding entry in the LOW_P table, the routine compares 1020 all entries of the MAIN_P table with corresponding entries of the DELTA_P table.

A test 1022 is then performed to determine whether or not the pressure values in the MAIN_P table 862 of FIG. 32 have changed more than values stored in corresponding locations in the DELTA_P table 864 of FIG. 32.

If a pressure value has not changed more than the allowable value, the routine then reads 1024 the battery condition bit from the battery register as indicated in FIG. 41b.

A test 1026 is made to determine whether or not the battery condition bit is set and if set, the battery status indicator 922 on the display of FIG. 30 is set 1028 to red.

Referring to FIGS. 41a and 41b, if any of the tests 1014, 1018 or 1022 indicates that the pressure value is abnormal, the pressure indicator 922 on the display is set to red, and the five LEDs corresponding to the offending MAIN_P table locations are light 1030 RED.

Referring to FIG. 41b, upon setting the battery indicator to RED or setting the DISPLAY table locations to RED, an audible alarm is sounded 1032 to alert the operator of an abnormal condition. The operator can determine the condition causing the alarm by observing the status indicators 922. Furthermore, the operator can determine which specific wheel is in the abnormal condition by observing RED wheel LEDs on the display.

Upon sounding the audible alarm or upon the successful completion of each of the tests 1014, 1018, 1022, and 1026 new DELTA_P table 864 values are calculated 1034 by using the last ten pressure values received to calculate an estimated rate of change of pressure, the new values replacing old values in the DELTA_P table. The compare routine is thus completed and processing returns 1036 to the pressure checking routine 812 of FIG. 39.

Referring to FIG. 39, upon completion of the compare routine 976, the pressure checking routine 812 is completed and processing returns 978 to the main loop 808 of FIG. 31.

temperature checking routine 814

Referring back to FIG. 31, upon completion of the pressure checking routine 812, the main loop 808 executes the temperature checking routine 814. The temperature checking routine is similar to the pressure checking routine shown in FIG. 39 and therefore may be easily described by referring to its differences from the pressure checking routine. The temperature checking routine 814 is similar to the pressure checking routine 812 with the following exceptions:

1) the data transfer routine cooperates with semaphore registers NEWTEMP and AUXTEMP which are used to indicate the status of the NEW_T and AUX_T tables;
2) the copy routine copies temperature values from the NEW_T or AUX_T tables into corresponding locations of the MAIN_T table; and
3) the compare routine only compares temperature values in the MAIN_T table to a value representing an average value calculated by taking an average of all values in the table.

Upon completion of the temperature routine 814, the main loop is completed and processing returns to the keyboard checking routine 810 of the main loop 808.

deferred discussion of axle and alarm routines axle routine

Figure 42:
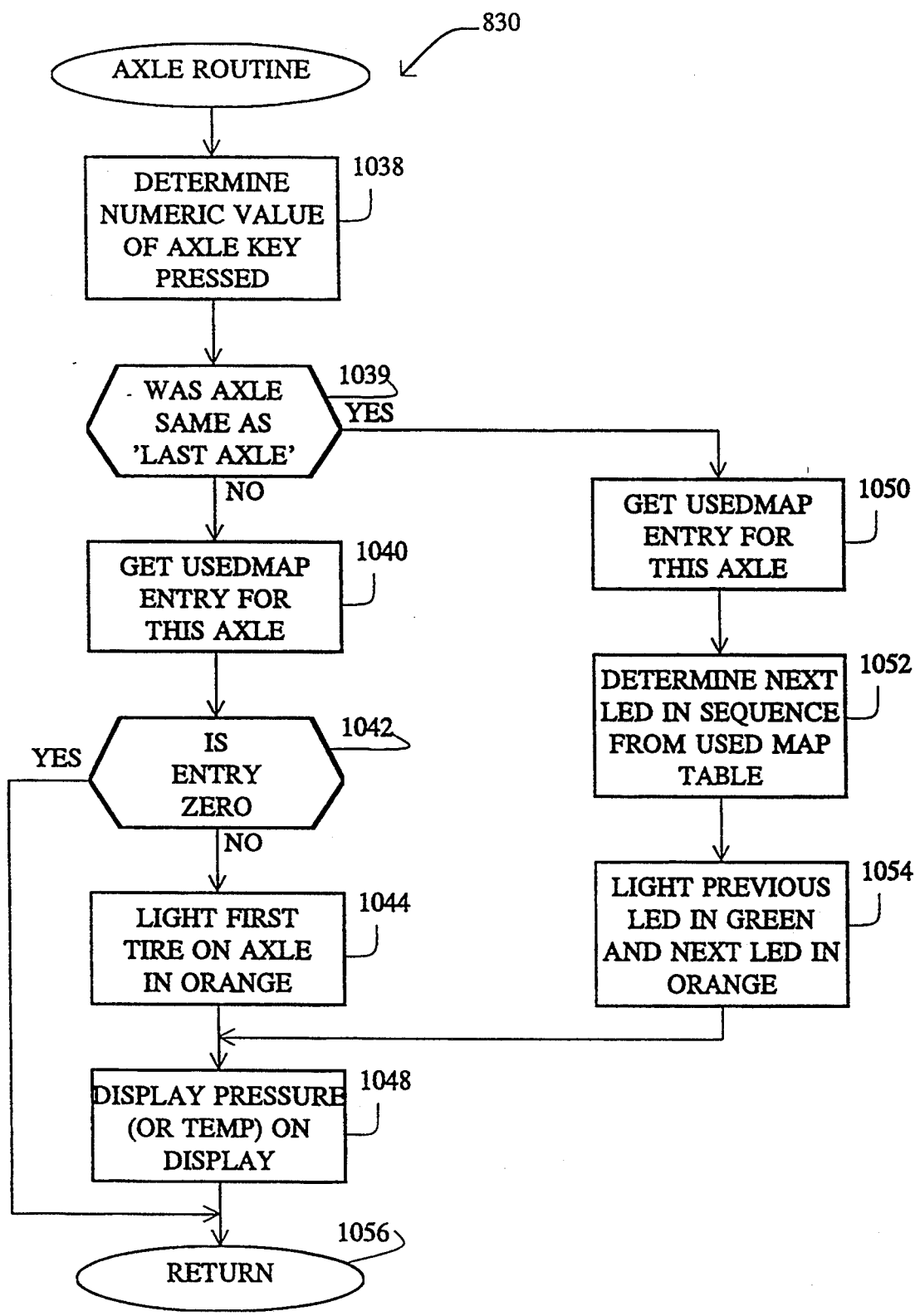
FIG. 42 is a flow diagram of an axle routine executed by the second microcontroller.

Referring to FIGS. 30 and 42 the axle routine 830 is invoked upon the user pressing an axle key 918 without pressing one of the control keys 904 first.

Referring to FIG. 42 upon pressing an axle key, the axle routine determines 1038 the numeric value (i.e. 1-10) of the axle key pressed.

The routine then checks 1039 to see whether or not an axle key was previously pressed in this routine. If this is the first press of the axle key in this routine, the contents of the USEDMAP table 840 of FIG. 32 location specified by time axle key pressed are obtained 1040. A test 1042 is made and if the contents are zero the routine is aborted and program flow continues back at the check keyboard routine 810 of FIG. 31.

If the contents of the USEDMAP location specified by the axle key are greater than zero, the LED indicating the first tire on the axle is lighted in orange as indicated at 1044. Next, the contents of the MAIN_P table location corresponding to the lighted LED are read and displayed 1048 on the seven segment display portion 924 of the keyboard display shown in FIG. 30. The axle routine is then completed and program flow return 1056 to the check keyboard routine 810 of FIG. 31.

After completing the above steps, a subsequent press of the same axle key will cause step 1039 to divert program flow to step 1050 which retrieves the contents of the USEDFLAP location specified by the axle key pressed. Using the contents of the USEDMAP location, step 1052 determines the next LED representing the next wheel on the axle. For instance, if the contents of the USEDMAP location corresponding to the selected axle is 2, the first tire on the axle to be lighted by step 1044 would be the tire on the uppermost portion of the display for the selected axle. Upon completion of step 1052, the lowermost LED for the selected axle would be lighted as there are only two tires on the selected axle. Similarly, if the selected axle has four tires, the next LED in the sequence as determined by step 1052 would be the LED immediately below the uppermost LED on the axle. Subsequent presses of the same axle key will light the third and fourth LED's on the axle accordingly.

Upon selecting a subsequent wheel on a given axle, all LED's representing tires on the axle are lighted in green with the exception of whichever LED represents the tire selected. Such LED is lighted in orange to indicate the wheel selected.

Referring to FIG. 30, the mode key 912 is used to select between pressure and temperature values being displayed on the seven segment display 924 of FIG. 30. Initially, upon entry of the axle routine, pressure values are displayed on the seven segment display. Pressing the mode key 832 causes step 1048 to recall the contents of the MAIN_T table location corresponding to the selected wheel. A subsequent press of the mode key causes step 1048 to revert back to reading the MAIN_P table location corresponding to the selected wheel.

alarm routine

Referring to FIG. 33, the alarm routine 828 is entered by the user pressing the alarm key. The alarm routine merely serves to permit the user to acknowledge that an alarm has occurred. The alarm routine shuts off the audible alarm and changes the pressure, temperature, or battery indicator status and associated tire indicator (depending on which parameter caused the alarm) to solid red from flashing red caused by the alarm condition.

OPERATION

To use the apparatus, a user acquires a plurality of pre-programed tire units such as shown at 4.1 and 44.2 in FIG. 2, such that a single tire unit may be connected to each tire of the vehicle. In the case of the mining tractor 32 of FIG. 1, the vehicle has six wheels and therefore six tire units are required. The user also requires a cab unit 42, the antenna 602 of which is mounted on top of the cab of the tractor 32. The user thus has a plurality of measurement and transmission circuits and a receiver for receiving a received transmission from each of the measurement and transmission circuits.

The tire units acquired by the user are pre-programed with values stored in the registers shown generally at 376 in FIG. 16. In the present example, each tire unit has a unit function register 434 programed with the value 00000 to indicate that the unit measures pressure and temperature. Similarly, the unit ID registers 436 and 438 are pre-programmed with eight and two zeros respectively to indicate that the tire unit is to be mounted on the zeroth unit. Unit type register 440 is pre-programed with the value zero to indicate that the unit on which the tire unit is to be mounted will be a tractor. The tire number register 442 of each tire unit is programed with a different tire number. In the embodiment shown, the tire number registers 442 are programed with numbers representing tire positions on the tractor. Each tire unit will bear a label indicating the contents of the registers 434 through 442.

By looking at the labels on the tire units, the user can match tire units with tires on the vehicle. Referring to FIGS. 30 and 35, the tire positions on the tractor are identified as follows. When viewing the tractor from above, the right front tire is tire number one, tires two and three are null or void tire positions, and tire 4 is the left front tire. Referring to FIG. 1, the tractor depicted therein has only a single rear axle and therefore referring back to FIG. 30, tire positions 5, 6, 7 and 8 are null or void positions, and tire positions 9 and 10 are used to identify outside and inside right rear tires respectively whereas tire positions 11 and 12 are used to identify the inside and outside left rear tires respectively. With the tire positions identified in this way, tire unit number 1 is installed on the tire in position 1. Similarly, tire unit number 4 is installed on the tire in position 4 and similarly for the rear wheels.

With the tire units installed on their respective tires, referring to FIG. 4, the end cap 78 may be unscrewed and a battery such as indicated at 94 may be inserted into the second chamber 95 and connected to the first printed wiring board as shown. The end cap 78 may then be re-installed, after which the tire units are rendered ready to measure and transmit air temperature and pressure.

After each tire unit has received a battery, it becomes operational. The tire units then operate independently to measure air temperature and pressure of their respective tire. Each tire unit thus transmits a frequency shift keyed electromagnetic signal in accordance with the transmit protocol depicted in FIG. 18 every 10 minutes.

After having installed all of the tire units, the user enters the cab of the vehicle and programs the cab unit 42 of FIG. 1 to respond to the transmissions produced by each tire unit.

Referring to FIG. 30, the user presses the on/off key 639 to activate the second micro-controller and place it in the active mode. The user then presses the codes key 908 to invoke the codes subroutine 824 depicted in FIG. 34. Referring back to FIG. 30, the user presses axle key number 1 whereupon the contents of the first location in the USEDMAP table of FIG. 32 are retrieved. Upon initial start-up of the device, the USEDMAP table location contains the value 0. This value is set to 4 and is loaded into the first DISPLAY table location which causes the indicators 920, corresponding to tire positions 1, 2, 3 and 4 to be lighted in orange. A further press of axle key number 1 causes the contents of time DISPLAY table location corresponding to axle number 1 to change to the value 2 whereupon indicators 920 corresponding to tire positions 1 and 4 are lighted. As this is time configuration which accurately represents the two tires on the front of the tractor, the user then presses the enter key 916. Pressing the enter key causes the letters I.D. to appear on the display 924. This serves as a prompt requesting the user to enter the ID number printed on the label of the tire unit. This prompting step is depicted at step 935 in FIG. 34.

The ID was previously mentioned to be 00 00000000. The user would thus enter 0 using the numeric keys 902 and the microcontroller would enter 00 00000000 into the first location of the unit codes table. Referring to FIG. 32, the appropriate AXLEMAP 841 and unit codes table 851 are automatically changed to reflect the ID code entered. The AXLEMAP table 842 corresponding to unit zero has a first location loaded with the value 1 and the unit codes table 851 of FIG. 32 has a first location loaded with the value 00 00000000. The USEDFLAP table 840 of FIG. 32 then has its first location loaded with the number 2 to indicate that there are two tires on the first axle. Referring to FIG. 30 the indicators 920 in positions 1 and 4 are then changed from orange to green, the DISPLAY table 852 of FIG. 3 is erased and the unit code table address register is incremented to point to the second location in the unit code table.

A similar procedure is used to enter the ID numbers of tire units 9, 10, 11 and 12. Using the above procedure, the third location in the AXLEMAP table 842 of FIG. 32 is loaded with the value 3 to indicate that the third axle on the tractor is represented by the third axle on the display. In addition USEDMAP table location number 3 is loaded with the value 4 indicating that 4 tires are mounted on the third axle. Indicators 920 corresponding to tire positions 9, 10, 11 and 12, are then changed frown orange to green, the DISPLAY table is erased and the code table address register is incremented. At this point, the identification of each tire has been entered and therefore the user presses the enter key at 916 which causes the codes routine to return to the keyboard checking routine as indicated at 942 in FIG. 34.

Next, the user enters the pressure limits for the tires on each axle. Referring to FIG. 30, the user presses the limits key 906 which invokes the limits routine 826 of FIG. 36.

Upon invoking the limits routine, the user presses the first axle key to select high and low pressure limits for tires on the first axle. Upon pressing the first axle key, the indicator in tire positions 1 and 4 are lighted in orange which indicates that the tires on axle number 1 have been selected for limit setting. After selecting axle number 1, the enter key 916 is pressed. The user is then prompted on the numeric display at 924 to enter the high limit. The high limit is entered by using the numeric keys 902 on the keypad. After entering the high limit, the user presses the enter key 916 which causes the pressure value just entered by the user to be loaded into the HIGH_P table 854 of FIG. 32 such that locations 1 and 4 contain the value entered by the user.

Similarly, the user is prompted on the numeric display 924 to enter the low pressure limit. The user enters the low pressure limit using the numeric keys 902, followed by the enter key 916. Locations 1 and 4 of the LOW_P table 856 of FIG. 32 are then loaded with the low pressure value entered by the user. It will be appreciated that each tire on a given axle has the same high and low pressure limits.

After entering the low pressure limit, the limits routine is exited and program flow continues with the keyboard checking routine. The receiver unit is thus programmed and ready to receive transmissions from each of the six tire units.

Referring to FIG. 6, each tire unit normally takes a pressure and a temperature measurement each 20 seconds. As it is impossible to start each of the tire units at the same time, it will be appreciated that each tire unit is started at a different time and therefore measurements of pressure and temperature are taken at different times. Similarly, each tire unit transmits to the receiver each 10 minutes, such transmissions occurring at different times. Consequently, to the receiver, transmissions appear to come at random and sometimes transmissions from two different units may occur simultaneously. To alleviate this problem, the transmissions are kept very short as indicated by the transmit protocol shown in FIG. 18. As the transmissions are short and the time between transmissions is long, statistically the chances of two transmissions overlapping is rather small.

Referring back to FIG. 6, the first micro-controller in tire unit number 1, will enter the active mode every 2.5 seconds. Upon each entry into the active mode, the first and second interrupt counter registers of FIG. 7 will be incremented to record each entry into the active mode. Under normal conditions, upon the expiry of 20 seconds, an analog to digital conversion of the air pressure in the tire, air temperature in the tire, and battery voltage of the battery 94 of FIG. 4 is performed. The result of the analog to digital conversion is used in a comparison to determine whether or not the pressure, temperature and battery voltage are within predetermined ranges. The presently acquired values are then stored, the first and second interrupt counters are reset and the processor is returned to the low power mode.

If the result of the comparison indicates that the pressure or temperature values are outside a predetermined range, the rate of sampling and hence the occurrences of analog to digital conversion are increased by setting appropriate flags in the comparison routine.

Regardless of the sampling rate, the later acquired temperature and pressure values fare transmitted to the receiver at 10 minute intervals. If it is found that the pressure or temperature values are increasing at a rate greater than a specified limit, the pressure and temperature values are transmitted to the receiver three successive times at 2.5 second intervals. Thus the occurrence of transmissions from a given tire unit is increased when a pressure or temperature is changing at a rate greater than a pre-defined rate. The occurrence of transmissions is increased in order to increase the statistical likelihood that the transmission will be received by the receiver.

Referring to FIG. 20, signals received by the antenna 602 at the receiver are amplified by amplifier 604 and applied to the FM demodulator circuit 608. The FM demodulator circuit converts the received electromagnetic signal into a bit stream appearing on output 616. The bit stream is received by the subcontroller which at this point is executing the zero sequence detector subroutine depicted in FIG. 24.

The zero sequence detector subroutine counts the number of successively occurring zeros in the bit stream and if the number of successive zeros is greater than a predetermined value, it is assumed that a valid signal is being received. The subcontroller then executes the 010 sequence handling subroutine which locates the leading and trailing edges of the "1" of the 010 sequence in the transmission and sets a counter to a zero position corresponding to the centre of the "1" bit in the sequence.

In accordance with the data handling subroutine of FIGS. 26A and 26B, successive bits in the bit stream are sampled at 30%, 50% and 70% bit times. If each of these three samples of each bit are consistent with each other, the value of the bit is stored in the appropriate bit position of the appropriate register of FIG. 27. In the event that a bit is corrupted by noise or by simultaneous reception of a transmission from another tire unit, the three successive samples taken during each bit time will not be consistent and the data handling routine will be aborted. In such an event, the registers of FIG. 27 are cleared until reloaded by the data handling subroutine upon receipt of the next transmitted signal from any unit. Thus, it will be appreciated that a transmission from a given unit must be received accurately in its entirety before the received transmission will be considered valid.

Each packet of data in the transmission is eight bits long and therefore the data handling routine will continue to receive valid bits in the packet until all eight bits have been received. When all eight bits have been received, the data handling routine returns program flow to the 010 sequence handling routine to permit the receiver to re-synchronize to the next 010 sequence. This process is repeated until all packets and hence all bits of the transmission have been received. Thus the 010 sequence handling routine acts as re-synchronizing means for re-synchronizing to the transmission upon receiving each re-synchronizing code in said received transmission, the re-synchronizating means searching the transmission for a bit sequence of the form 0-1-0 appearing before the identifier, after the identifier, before the code and after the code. The 010 sequence handling routine and the data handling routine act to implement sampling means for sampling the received transmission at regular intervals in time to determine the occurrence of the "1" in the 0-1-0 re-synchronizer code, a sample counter which is reset and started at a time corresponding to an approximate mid-bit position of the "1", incrementing means for incrementing the sample counter at regular intervals in time, and sampling means for sampling the received transmissions at said regular intervals in time to determine the code and the identifier.

Upon receiving an entire transmission, the registers depicted in FIG. 27 will contain bits representing codes sent by a given tire unit. The cyclic redundag check information is then checked. The subcontroller 632 of FIG. 20 will then interrupt the second microcontroller 658 whereupon the contents of the registers shown in FIG. 27 are copied into similar registers existing in the RAM 798 shown in FIG. 5.

Referring to FIG. 37, the second microcontroller enters the data transfer routine, shown generally at 970 in FIG. 37. The second microcontroller then determines whether the pressure and temperature values are to be loaded into the NEW_P or AUX_P and NEW_T and AUX_T tables 858, 860, 866 and 868 respectively. The semaphore registers 971.1 and 971.2 are used to determine which table is to receive the pressure values and similar semaphore registers are used to determine which table is to receive the temperature values. Upon determining which table is to receive which values, the register-to-table copy routine depicted in FIG. 38 is executed.

The register-to-table copy routine reads the unit ID code from the second code register 776 of FIG. 27 and determines the AXLEMAP subtable 841 corresponding to the unit ID code. In this example, the unit ID code is 00 00000000. This value is compared to the contents of the unit codes table 851 of FIG. 32 to determine the tarring address of the AXLEMAP subtable corresponding to the unit.

In this example, the AXLEMAP subtable corresponding to the unit ID code is table number zero, identified as 842 in FIG. 32. The tire number is then read from the codes register 776 of FIG. 27 to determine the axle number on which the tire having the tire unit is mounted. In the example given, the tire unit from which transmissions are being received is mounted in tire position number 1 and therefore the axle number is 1. Next, the address of the location in the AXLEMAP table which contains the number of the axle on the DISPLAY corresponding to the unit axle is determined. The NEW_P, AUX_P, NEW_T or AUX_T table location into which the pressure or temperature byte shown in FIG. 27 is to be copied is determined by substitution into the equation:

$$4(C-L)+N=T$$

where
- L is a number 1, 2, 3 etc. corresponding to the axle number of the axle relative to the unit;
- C is a number 1, 2, 3, etc. stored in location L of the AXLEMAP sub-table for the given unit, the number indicating the axle on the DISPLAY which corresponds to the axle on the unit;
- N is the tire number of the tire relative to the unit (N may be any number from 1–40);
- T is the DISPLAY table location (1–40) corresponding to the tire identified by the unit number and tire number.

The pressure or temperature byte is then copied into the corresponding location T in the appropriate table. The data transfer routine is thus completed and the second microcontroller enters the pressure checking routine.

The pressure checking routine copies the contents of the AUX_P or NEW_P 858 tables into the MAIN_P table 862. Each entry in the MAIN_P table is then tested against corresponding contents of the HIGH_P and LOW_P tables 854 and 856 to determine whether the pressure value in the MAIN_P table is within the limits specified by the HIGH_P and LOW_P table locations. The contents of the MAIN P table are then compared to the contents of corresponding locations in the DELTA_P table 864 to determine whether the pressure has changed by more than a predetermined amount. If the pressure value is outside the ranges provided by the HIGH_P and LOW_P tables 854 and 856, or if the pressure change is greater than that permitted by the DELTA_P table, the alarm routine is entered.

In the alarm routine the display indicator corresponding to the tire, for example tire number 1, is flashed in red and an audible buzzer is sounded. The user acknowledges that an alarm has occurred by pressing the alarm key 910 on the display shown in FIG. 30. Pressing the alarm key stops the buzzer and changes the indicator status from flashing red to solid red. If, however, the pressure values are within the specified limits and have not changed by more than the allowable value, no alarm is sounded and the pressure checking routine is exited. A similar procedure is performed in the temperature checking routine to deal with temperature values.

It will be appreciated that at the receiver, the MAIN_P table 862 of FIG. 32 contains up-to-date pressure values representing the air pressure in each of the tires of the vehicle. Similarly, the MAIN_T table 870 holds temperature values corresponding to air temperature in each of the tires on the vehicle. Specific locations in the MAIN_P table and MAIN_T table are updated each time a valid transmission is received. Thus, the MAIN_P table and MAIN_T table each contain an up-to-date list of pressures and temperatures in each of the tires on the vehicle.

Should the user so desire, a numerical indication of the pressure or temperature of air in a given tire can be observed by pressing an axle key 918 shown in FIG. 30, whereupon the axle routine depicted in FIG. 42 is entered. Pressing an axle key causes the first indicator 920 corresponding to the selected axle to be lighted in orange. For example, if axle key 1 is pressed, the indicator corresponding to tire position number 1 i.e. the right front tire of the tractor is lighted in orange. Upon lighting the appropriate indicator, the contents of the corresponding location in the MAIN_P table are retrieved and displayed on the numeric display 924. Pressing the mode key 912 causes the contents of the correspond location in the MAIN_T table to be retrieved and displayed on the display 924 to view the air temperature in the tire instead of pressure. A further press of the first axle key changes the colour of the indicator representing tire position number 1 to green and changes the colour of the indicator representing tire position number 4 to orange. The contents of the MAIN_P or MAIN_T table are then retrieved and displayed on the DISPLAY 924 to represent the pressure or temperature in the tire in the fourth position, i.e. the left front tire of the vehicle. Similarly, the user may select axle number to observe the pressures and temperatures of each of the tires on the third axle (rear axle) of the vehicle.

ALTERNATIVES

It will be appreciated that the above system is not limited for use strictly with mining vehicles. The apparatus may effectively be used on logging trucks, semi-trailers, conventional passenger vehicles, or virtually any pneumatic tired vehicle.

It will be appreciated that the analog-to-digital conversion implemented by the comparators, first microcontroller and analog-to-digital conversion algorithm provides a convenient way of providing the analog-to-digital conversion function using a small number of components and therefore requiring only a small amount of space and consuming a small amount of power. If space occupation and power consumption are not particularly important to a skilled worker attempting to use the apparatus and methods disclosed herein, then the analog-to-digital conversion function can be implemented using conventional methods such as employing an analog multiplex, a sample and hold circuit and a conventional analog-to-digital converter circuit.

It will also be appreciated that the antenna shown in FIG. 4 need not necessarily include the straight portion 91. The straight portion is included in the embodiment shown to illustrate a method of transmitting a relatively strong electromagnetic signal to the receiver. Alternatively, however, where the distance between the transmitter and the receiver is short, the straight portion is not required and the antenna may include only the coiled portion 89, the coiled portion permitting a sufficiently strong electromagnetic signal to be produced. In an embodiment using only the coiled portion 89, the cap 78 may be entirely sealed and moisture ingress virtually eliminated.

Referring to FIG. 4, a specific way of mounting the tire unit to the wheel was described. Such a mounting method is acceptable where the distance between the tire and the outer portion of the flexible pipe is relatively short and hence the air in the flexible pipe and, more particularly, the air in the first chamber is at approximately the same temperature as air in the tire. Furthermore, when this distance is short, the time lag between changes in air temperature in the tire and changes in air temperature in the chamber is negligible. For uses of the apparatus where the flexible pipes are relatively long or where greater convenience of mounting is required, the mounting method shown in FIG. 43 may be employed.

Figure 43:
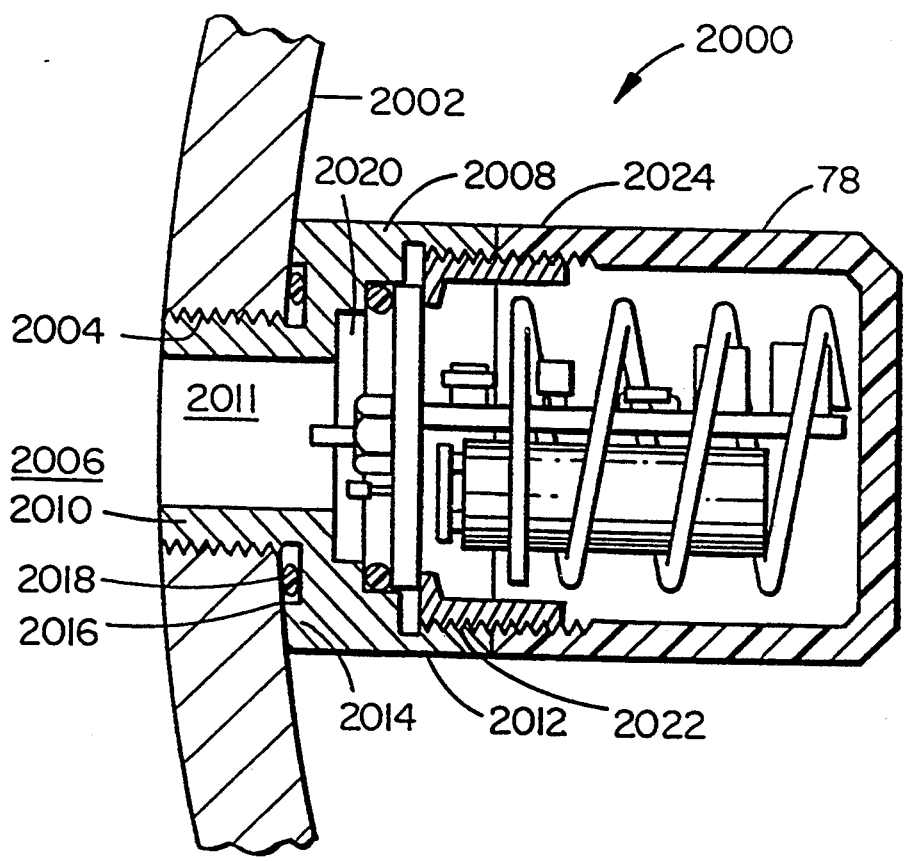

Referring to FIG. 43, an alternative method of mounting the tire unit to the wheel is shown generally at 2000. In this alternative method, a rim 2002 on which a tire is mounted is provided with a threaded opening 2004 in communication with an inside space 2006 between the rim and the tire. Also, in this alternative method, the housing portion 53 is replaced with a cylindrical adaptor 2008 having a threaded male portion 2010 which mates with the threaded opening 2004 in the rim, and a receptacle portion shown generally at 2012. The receptacle portion 2012 has a shoulder portion 2014 having an O-ring groove 2016 for receiving an O-ring 2018 to provide an airtight seal between the cylindrical adaptor 2008 and the rim 2002.

The threaded male portion 2010 has a relatively large conduit 2011 which leads from the inside space of the tire to a receptacle 2020 formed within a threaded circular wall portion 2022 of the receptacle portion 2012. The threaded circular wall portion 2022 is similar to the circular wall portion 72 shown in FIG. 4.

In the embodiment shown in FIG. 43, the generally circular cap 78 of FIG. 4 is fastened to the threaded circular wall portion 2022 of FIG. 43 by a threaded circular collar 2024 similar to the circular collar 80 shown in FIG. 4. It will be appreciated that the embodiment shown in FIG. 43 includes circuit boards and an antenna coil which are mounted in the receptacle and cap respectively in manners similar to that shown in FIG. 4 and therefore are not repeated here.

It will be appreciated that the relatively large conduit 2011 in such close proximity to the inside space of the tire permits temperature changes in air in the inside space to be relatively quickly transmitted to the temperature sensor mounted on the circuit board. In the embodiment shown, the thickness of the rim is approximately 0.75 inches which permits the temperature sensor to be within 0.75 inches of the inside space of the tire and thus air in the vicinity of the temperature sensor is generally at the same temperature as air in the inside space of the tire.

What is claimed is:

1. A method of measuring and monitoring a plurality of remotely located devices at a central location, the method comprising the steps of:
   (a) providing a plurality of measurement and transmission circuits, each circuit:
      (i) developing a signal in response to a respective physical quantity, property or condition;
      (ii) sampling said signal to produce an instantaneous signal value;
      (iii) assigning a first code to said instantaneous signal value;
      (iv) transmitting a transmission including the code and an identifier unique to the circuit;
   (b) receiving a received transmission from each of said measurement and transmission circuits;
   (c) extracting and storing said identifier and said code from said received transmission;
   (d) determining which identifier has been received; and
   (d) displaying a representation of said received code while providing an identification of the received code.

2. A method as claimed in claim 1, wherein the step of transmitting includes transmitting said code as part of a transmit protocol having a plurality of receiver re-synchronization codes therein.

3. A method as claimed in claim 2, wherein the step of transmitting includes producing a re-synchronization code in said transmit protocol.

4. A method as claimed in claim 3, wherein the step of producing includes producing a re-synchronization code sequence of the form 0-1-0 before said identifier, after said identifier, before said code and after said code.

5. A method as claimed in claim 3, wherein the step of receiving a received transmission includes the step of re-synchronizing upon receiving each re-synchronizing code in said received transmission.

6. A method as claimed in claim 5, wherein the step of re-synchronizing includes the steps of:
   (a) sampling the received transmission at regular intervals in time to determine the occurrence of the "1" in the 0-1-0 re-synchronizer code;
   (b) re-setting and starting a sample counter at a time corresponding to an approximate mid-bit position of the "1";
   (c) incrementing the sample counter at regular intervals in time; and
   (d) sampling said received transmissions at said regular intervals in time to determine said code and said identifier.

7. A method as claimed in claim 1, further including the step of sounding an alarm when said received code is outside of a pre-determined range of codes.

8. A method as claimed in claim 1, wherein the step of receiving includes:
   (a) producing an analog signal in response to said received transmission, said analog signal having DC component;
   (b) attenuating high frequency components of the analog signal to produce a filtered analog signal, the high frequency components having frequencies more than ten times the baud rate of the received transmission;
   (c) further attenuating said filtered analog signal to produce a reference signal proportional to said DC component; and
   (d) switching a comparator in response to said filtered analog signal to produce a digital signal, the comparator using said reference signal as a switching reference.

9. An apparatus for measuring and monitoring a plurality of remotely located devices at a central location, the apparatus comprising:
   (a) a plurality of measurement and transmission circuits, each circuit having:
      (i) a transducer for developing a signal in response to a respective physical quantity, property or condition;
      (ii) sampling means for sampling said signal to produce an instantaneous signal value;

(iii) assigning means for assigning a first code to said instantaneous signal value;
(iv) transmitting means for transmitting a transmission including the code and an identifier unique to the circuit;

(b) a receiver for receiving a received transmission from each of said measurement and transmission circuits, said receiver including:
(i) extracting and storing means for extracting and storing said identifier and said code from said received transmission;
(ii) determining means for determining which identifier has been received; and
(iii) display means for displaying a representation of said received code while providing an identification of the received code.

10. An apparatus as claimed in claim 9, wherein the receiving means includes re-synchronizing means for re-synchronizing to the transmission upon receiving each re-synchronizing code in said received transmission.

11. An apparatus as claimed in claim 10, wherein the re-synchronization means includes a re-synchronization code in said transmit protocol.

12. An apparatus as claimed in claim 11, wherein the re-synchronizing means is for searching the transmission for a bit sequence of the form 0-1-0 appearing before said identifier, after said identifier, before said code and after said code.

13. An apparatus as claimed in claim 12, wherein the re-synchronizing means includes:

(a) sampling means for sampling the received transmission at regular intervals in time to determine the occurrence of the "1" in the 0-1-0 re-synchronizer code;
(b) a sample counter which is reset and started at a time corresponding to an approximate mid-bit position of the "1";
(c) incrementing means for incrementing the sample counter at regular intervals in time; and
(d) sampling means for sampling said received transmissions at said regular intervals in time to determine said code and said identifier.

14. An apparatus as claimed in claim 9, further including an alarm which is sounded when said received code is outside a pre-determined range of codes.

15. An apparatus as claimed in claim 9, wherein the receiving means includes:

(a) producing means for producing an analog signal in response to said received transmission, said analog signal having DC component;
(b) first attenuating means for attenuating high frequency components of the analog signal to produce a filtered analog signal, the high frequency components having frequencies more than ten times the baud rate of the received transmission;
(c) second attenuating means for further attenuating said filtered analog signal to produce a reference signal proportional to said DC component; and
(d) a comparator which is switched in response to said filtered analog signal to produce a digital signal, the comparator using said reference signal as a switching reference.

* * * * *